US012469337B2

(12) United States Patent
Alfaro Suzan et al.

(10) Patent No.: US 12,469,337 B2
(45) Date of Patent: *Nov. 11, 2025

(54) SYSTEM AND METHOD FOR VESSEL IDENTIFICATION

(71) Applicant: Global Spatial Technology Solutions Inc., Dartmouth (CA)

(72) Inventors: Ana Luisa Alfaro Suzan, North York (CA); Robert Michael Marshy, Ottawa (CA); Joshua Rabalao, Kanata (CA); Kasra Azizbaigi, Toronto (CA); Colin John Robertson, Gabriola Island (CA); Ramin Heydarlaki, Kelowna (CA)

(73) Assignee: Global Spatial Technology Solutions Inc., Dartmouth (CA)

( * ) Notice: Subject to any disclaimer, the term of this patent is extended or adjusted under 35 U.S.C. 154(b) by 142 days.

This patent is subject to a terminal disclaimer.

(21) Appl. No.: 18/322,710

(22) Filed: May 24, 2023

(65) Prior Publication Data

US 2024/0395076 A1  Nov. 28, 2024

(51) Int. Cl.
*G07C 5/00* (2006.01)
*G06N 3/044* (2023.01)
(Continued)

(52) U.S. Cl.
CPC .......... *G07C 5/008* (2013.01); *G06N 3/0464* (2023.01)

(58) Field of Classification Search
CPC ...... G07C 5/008; G06N 3/0464; G06N 3/044; G06N 3/045; G06N 3/08
(Continued)

(56) References Cited

U.S. PATENT DOCUMENTS 11,151,169 B2   10/2021  Wroblewski
2019/0120928 A1*  4/2019  O'Shea ............... G01S 1/04
(Continued)

FOREIGN PATENT DOCUMENTS

CN   113316792 A   8/2021
CN   115063676 A   9/2022
(Continued)

OTHER PUBLICATIONS

Marine Traffic: Global Ship Tracking, accessed Dec. 14, 2022 <https://web.archive.org/web/20221214143913/ https://www.marinetraffic.com/en/ais/home/centerx:-12.0/centery:25.0/zoom:4> (1 page).

(Continued)

*Primary Examiner* — Tyler D Paige
(74) *Attorney, Agent, or Firm* — SMART & BIGGAR LP; Isis E. Caulder

(57) ABSTRACT

Computer implemented methods, systems, and computer-readable media for predicting a vessel identifier are provided. These include providing, at a memory, a vessel identification model, receiving, at a processor in communication with the memory, vessel data from one or more sources, determining, at the processor, a plurality of periodograms from the vessel data, the plurality of periodograms determined for a candidate vessel corresponding to candidate vessel data in the vessel data, determining, at the processor, a spectrogram based on the plurality of periodograms; and predicting, at the processor, a vessel identifier output of the candidate vessel based on the spectrogram and the vessel identification model.

26 Claims, 31 Drawing Sheets

(51) Int. Cl.
G06N 3/045 (2023.01)
G06N 3/0464 (2023.01)

(58) Field of Classification Search
USPC .......................................................... 701/21
See application file for complete search history.

(56) References Cited

U.S. PATENT DOCUMENTS

| | | | |
|---|---|---|---|
| 2020/0025958 A1* | 1/2020 | Kamil Amin | G01V 1/362 |
| 2021/0387706 A1* | 12/2021 | Siganos | G06V 10/82 |
| 2021/0390279 A1* | 12/2021 | Siganos | G06F 18/214 |
| 2024/0394568 A1* | 11/2024 | Alfaro Suzan | B63B 71/00 |
| 2024/0395076 A1* | 11/2024 | Alfaro Suzan | G06N 3/08 |

FOREIGN PATENT DOCUMENTS

| | | |
|---|---|---|
| EP | 3029487 | 6/2016 |
| WO | 2021221854 A1 | 11/2021 |

OTHER PUBLICATIONS

Vessel Finder, accessed Dec. 15, 2022 <https://web.archive.org/web/20221209180941/https://www.vesselfinder.com/> (3 pages).
Zhou et al., "Ship classification based on ship behavior clustering from AIS data" Ocean Engineering 175 (2019) p. 176-187 (12 pages).
Amariei et al, "Grand Challenge : Cell Grid Architecture for Maritime Route Prediction on AIS Data Streams" 2018, p. 1-3 (3 pages).
Fossen, A survey on Nonlinear Ship Control: from Theory to Practice, (2000) IFAC Proceedings Volumes, vol. 33, Issue 21 (16 pages).
Greidanus H., A. M. (2013). Basin-Wide Maritime Awareness From Multi-Source Ship Reporting Data. TransNav, the International Journal on Marine Navigation and Safety of Sea Transportation, vol. 7, No. 2, doi:10.12716/1001.07.02.04, pp. 185-192 (8 pages).
Harati-Mokhtari, A. W. (2007). Automatic Identification System (AIS): Data Reliability and Human Error Implications. Journal of Navigation, 60(3), pp. 373-389. doi:10.1017/S0373463307004298 (17 pages).
Liu, Z. (2017). Ship Adaptive Course Keeping Control With Nonlinear Disturbance Observer. IEEE Access, vol. 5, pp. 17567-17575, 2017. doi: 10.1109/Access.2017.2742001 (10 pages).
NASA Jet Propulsion Lab. (Apr. 25, 2007). MODIS Sea Surface Temperature (SST) Products. Retrieved from Physical Oceanography Distributed Active Archive Centre <https://web.archive.org/web/20201019213754/https://podaac-tools.jpl.nasa.gov/drive/files/allData/modis/L3/docs/modis_sst.html> (7 pages).
Fossen & Perez (2009). Kalman Filtering for Positioning and Heading Control of Ships and Offshore Rigs. Estimating the Effects of Waves, Wind, and Current. IEEE Control System Magazine (15 pages).
Tomera, M. (2010). Nonlinear controller design of a ship autopilot. Applied Mathematics and Computer Science. 20. 271-280. 10.2478/v10006-010-0020-8 (11 pages).
Union, I. T. (2014). M.1371: Technical characteristics for an automatic identification system using time-division multiple access in the VHF maritime mobile band https://www.itu.int/rec/R-REC-M.1371-5-201402-I/en (148 pages).
Westerdijk (2019). Classifying vessel types based on AIS data. Vrije Universiteit Amsterdam, Master Thesis. Business Analytics (86 pages).
S.-L. Hsieh, "Design Ensemble Machine Learning Model for Breast Cancer Diagnosis," Springer Science, Aug. 3, 2011 (7 pages).
D. Optitz, "Popular Ensemble Methods: An Empirical Study," Journal of Artificial Intelligence Research, pp. 169-198, Aug. 1999 (31 pages).
J. S. D. Opitz, "Generating Accurate and Diverse Members of a Neural-Network Ensemble," Advances in Neural Information Processing Systems, (1996) MIT Press, pp. 535-543 (7 pages).
J. T. Vanderplas, "Understanding the Lomb-Scargle Periodogram," The Astrophysical Journal Supplement Series, vol. 236, No. 1, May 11, 2018 (28 pages).
E. Cheever, "Introduction to the Fourier Transform," Linear Physical Systems Analysis Swathmore College, 2005 [Online]. Available: https://lpsa.swarthmore.edu/Fourier/Xforms/FXformIntro.html (3 pages).
Press et al., "Numerical Recipes in C: The Art of Scientific Computing," Oct. 1992 (1018 pages).
Rehfeld et al., "Comparison of correlation analysis techniques for irregularly sampled time series," Apr. 5, 2011 (16 pages).
Lu &. Weng, "A survey of image classification methods and techniques for improving classification performance," vol. 28:5, No. 823-870, 2007 (50 pages).
Shorten & Khoshgoftaar, "A survey on Image Data Augmentation for Deep Learning," J Big Data, vol. 6, p. 60, 2019 (49 pages).
Zhang et al,, "Audio Recognition using Mel Spectrograms and Convolution Neural Networks.," (2019) Dept. of Electrical and Computer Engineering, University of California (5 pages).
Aslan et al., "Automatic detection of schizophrenia by applying deep learning over spectrogram images of EEG signals," Traitement du Signal, vol. 37, pp. 235-244, 2020 (11 pages).
He (2016) Deep residual learning for image recognition. IEEE Conference on Computer Vision and Pattern Recognition (9 pages).
Kolen and Kremer, ""Gradient Flow in Recurrent Nets: The Difficulty of Learning LongTerm Dependencies," in A Field Guide to Dynamical Recurrent Networks," IEEE, pp. 237-243, 2001 (15 pages).
Dive Into Deep Learning, 8.6. Residual Networks (ResNet) and ResNeXt [Online], Dec. 2022 (11 pages) Available: https://d2l.ai/chapter_convolutional-modern/resnet.html (11 pages).
Xie et al., "Aggregated Residual Transformations for Deep Neural Networks," (2017) arXiv:1611.05431 (10 pages).
Szegedy et al., "Going Deeper with Convolutions," (2014) arXiv:1409.4842 (12 pages).
Hu et al., "Squeeze-and-Excitation Networks," (2019) arXiv:1709.01507 (13 pages).
Opitz and Maclin, "Popular Ensemble Methods: An Empirical Study," Journal of Artificial Intelligence Research (1999) pp. 169-198 (30 pages).
S. Learn, "Scikit learn documentation," (2011) [Online], Available: <https://scikit-learn.org/stable/modules/tree.html> (6 pages).
IBM, "What is a random forest IBM," 2023. [Online] <https://www.ibm.com/topics/random-forest> (6 pages).
Tama & Rhee, "An extensive empirical evaluation of classifier ensembles for intrusion detection task," Computer Systems Science and Engineering, 32(2):149-158, Mar. 2017 (11 pages).
Li et al., "VC-GAN: Classifying Vessel Types by Maritime Trajectories using Generative Adversarial Networks" 2020 IEEE 32nd International Conference on Tools with Artificial Intelligence (ICTAI) p. 923-928 (6 pages).
Cumming et al., (1999). The Lick Planet Search: Detectability and Mass Thresholds. The Astrophysical Journal, 890-915 (26 pages).
Duhamel (1999). Fast Fourier Transforms: A Tutorial Review and a State of the Art. Digital Signal Processing Handbook. Ed. Vijay K. Madisetti and Douglas B. WilliamsBoca Raton: CRC Press LLC (51 pages).
Gatys (2016). Image Style Transfer Using Convolutional Neural Networks. Proceedings of the IEEE Conference on Computer Vision and Pattern Recognition (10 pages).
Lomb (1976). Least-squares frequency analysis of unequally spaced data. Astrophysics and Space Science, 447-462 (16 pages).
Ester (1996), A density-based algorithm for discovering clusters a density-based algorithm for discovering clusters in large spatial databases with noise. Portland, Oregon: Proceedings of the Second International Conference on Knowledge Discovery and Data Mining (6 pages).
Scargle (1982). Studies in astronomical time series analysis. II—Statistical aspects of spectral analysis of unevenly spaced data. The Astrophysical Journal, 835-853 (19 pages).

(56) References Cited

OTHER PUBLICATIONS

Verma (2018). Neural Style Transfer for Audio Spectograms, arXiv:1801.01589 (3 pages).
Jing (2020). Neural Style Transfer: A Review. IEEE Transactions on Visualization and Computer Graphics, 26(11):3365-3385 (26 pages).

* cited by examiner

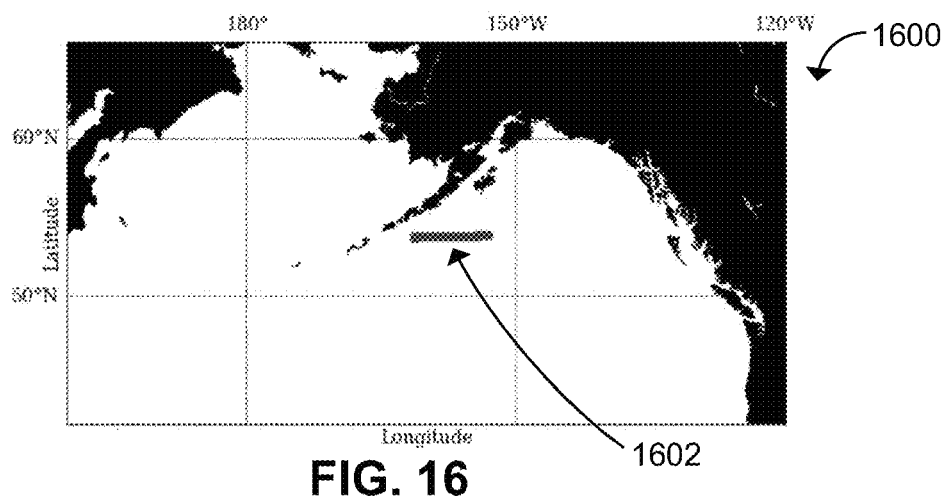
FIG. 16
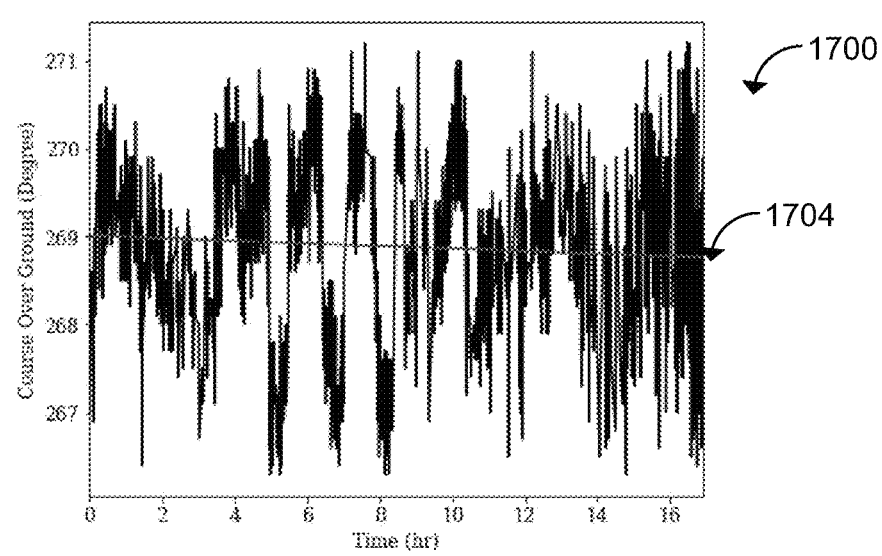
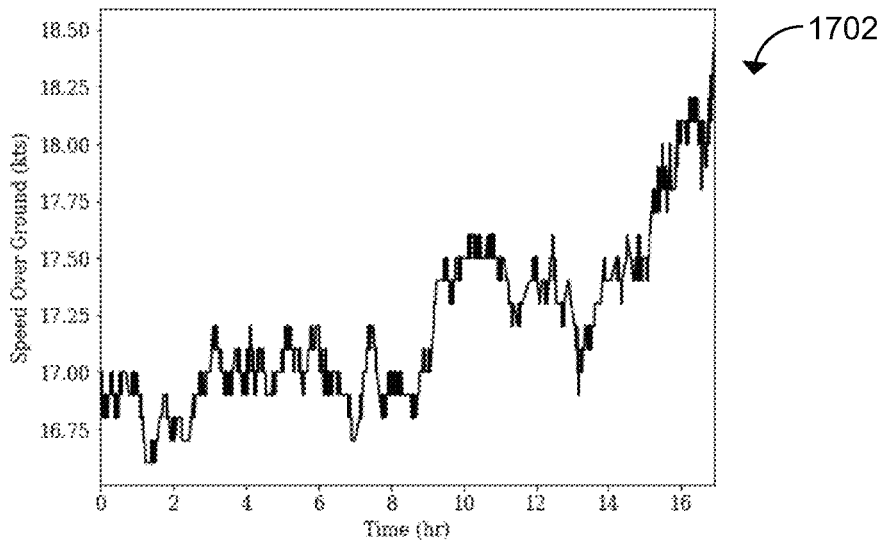
FIG. 17

(a) Inception module, naïve version　　(b) Inception module with dimension reductions

| | 224 × 224 | | 320 × 320 / 299 × 299 | |
|---|---|---|---|---|
| | top-1 err. | top-5 err. | top-1 err. | top-5 err. |
| ResNet-152 [ ] | 23.0 | 6.7 | 21.3 | 5.5 |
| ResNet-200 [ ] | 21.7 | 5.8 | 20.1 | 4.8 |
| Inception-v3 [ ] | - | - | 21.2 | 5.6 |
| Inception-v4 [ ] | - | - | 20.0 | 5.0 |
| Inception-ResNet-v2 [ ] | - | - | 19.9 | 4.9 |
| ResNeXt-101 (64 × 4d) [ ] | 20.4 | 5.3 | 19.1 | 4.4 |
| DenseNet-264 [ ] | 22.15 | 6.12 | - | - |
| Attention-92 [ ] | - | - | 19.5 | 4.8 |
| Very Deep PolyNet [ ] † | - | - | 18.71 | 4.25 |
| PyramidNet-200 [ ] | 20.1 | 5.4 | 19.2 | 4.7 |
| DPN-131 [ ] | 19.93 | 5.12 | 18.55 | 4.16 |
| SENet-154 | 18.68 | 4.47 | 17.28 | 3.79 |
| NASNet-A (6@4032) [ ] † | - | - | 17.3‡ | 3.8‡ |
| SENet-154 (post-challenge) | - | - | 16.88‡ | 3.58‡ |

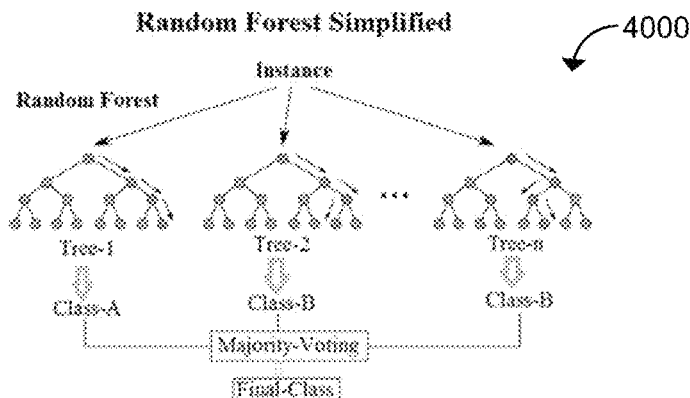
FIG. 40
| X variable | | | | | | | Y variable |
|---|---|---|---|---|---|---|---|
| Spectrogram classification output | Feature #1 classification output | Feature #2 classification output | Vessel speed | Reporting hazardous goods | Vessel country | Vessel type | Predicted vessel identity. |
| ↖4102 | ↖4104 | ↖4106 | 4108↗ | ↖4110 | ↖4112 | ↖4114 | 4116 |
FIG. 41
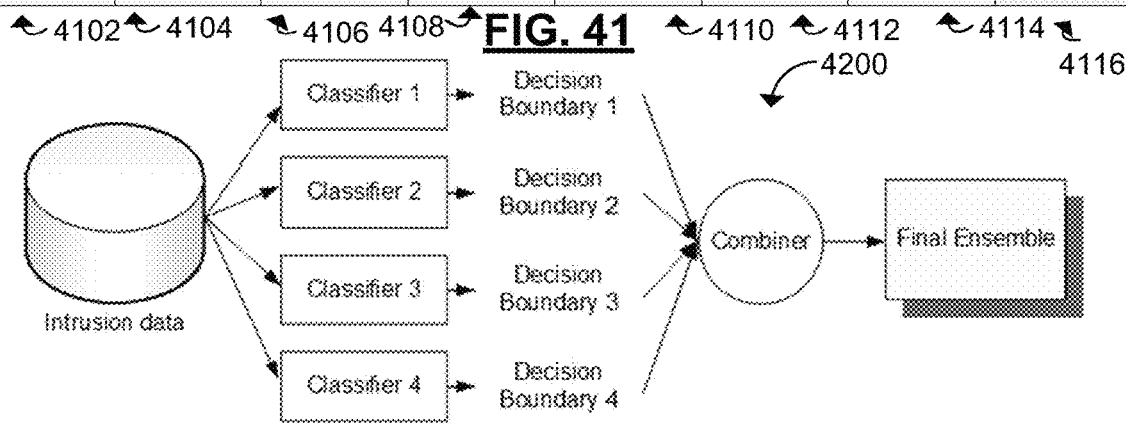
FIG. 42
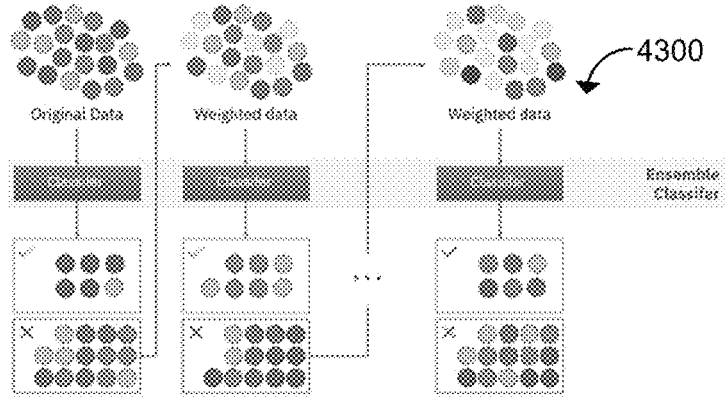
FIG. 43

| MMSI | Name | Vessel Type | Gross Tonnage |
|---|---|---|---|
| 338199855 | PB AHUA POINT | Pilot | 30 |
| 503025040 | BERKELEY PILOT BOAT | Pilot | 60 |
| 735023416 | DAPHNE | Dry Cargo/Passenger (Cruise) Ship | 147 |
| 369970966 | 9SSC1203 | Military Ops | 150 |
| 735023419 | ESTRELLA DEL MAR | Pilot/High Speed Craft | 150 |
| 735058752 | CRUCEROS HUMBOLDT | Dry Cargo/Passenger (Cruise) Ship | 169 |
| 224049530 | O COVELO | Fishing | 186 |
| 735023408 | GOLONDRINA | Pilot/High Speed Craft | 250 |
| 416075990 | MAN FU TSAI NO 9 | Fishing | 300 |
| 431702850 | SHOUN MARU No. 51 | Fishing | 319 |
| 368932970 | STACEY FOSS | Tug | 364 |
| 440045800 | ORYONG NO. 317 | Fishing | 380 |
| 416802825 | MAN FU TSAI NO. | Fishing | 400 |
| 368477000 | KAPENA RAYMOND ALAPA | Tug | 400 |
| 503516000 | SVITZER | Tug | 400 |
| 512005663 | TOIA | Tug | 400 |
| 735059938 | TIP TOP V | Dry Cargo/Passenger (Cruise) Ship | 412 |
| 303275000 | JUSTINE FOSS | Tug | 424 |
| 432914800 | KOTOSHIRO MARU NO. 58 | Fishing | 436 |
| 412420898 | ZHOU YUAN YU 2801 | Fishing | 455 |
| 440854000 | HONG JIN NO. 707 | Fishing | 469 |
| 431539000 | RYOFUKU MARU NO. 35 | Fishing | 499 |
| 512002681 | AMALTAL MARINER | Fishing | 555 |
| 412270301 | JIN SHENG NO. 3 | Fishing | 602 |
| 725001133 | TREHUACO | Dry Cargo/Ro-Ro Cargo | 605 |
| 725002945 | CRUZ DEL SUR III | Dry Cargo/Ro-Ro Cargo | 756 |
| 512228000 | DONG WON NO. 519 | Fishing | 861 |
| 725000890 | CORSARIO I | Fishing | 1933 |
| 512000122 | SAN ENTERPRISE | Fishing | 1899 |
| 512000125 | SAN DISCOVERY | Fishing | 1899 |
| 512000103 | REHUA | Fishing | 2483 |
| 512435800 | SAN GRANIT | Fishing | 2487 |
| 372081800 | ANGEL 102 | Tankers/Oil | 3434 |
| 258871000 | RONJA HUON | Dry Cargo | 3582 |
| 372417000 | ARAGO | Tankers/Liquefied Gas | 4256 |
| 331746000 | REGINA C | Fishing | 4709 |
| 725011980 | UNIONSUR | Fishing | 4991 |
| 564738800 | CAP PAPATELE | Dry Cargo/Container Ship | 9954 |
| 370178000 | HAI GONG YOU 306 | Tankers/Oil | 11375 |
| 503000039 | SEAROAD TAMAR | Dry Cargo/Ro-Ro Cargo | 13965 |
| 512071800 | ARATERE | Dry Cargo/Ro-Ro Cargo | 17816 |
| 636092906 | HANSA OFFENBURG | Dry Cargo/Container Ship | 18358 |
| 367003380 | JEAN ANNE | Dry Cargo/Ro-Ro Cargo | 37548 |
| 229136000 | CARNIVAL SPIRIT | Dry Cargo/Passenger (Cruise) Ship | 85920 |
| 310327000 | GRAND PRINCESS | Dry Cargo/Passenger (Cruise) Ship | 107517 |

SYSTEM AND METHOD FOR VESSEL IDENTIFICATION

FIELD

The described embodiments relate to predicting vessel identifiers, and specifically to analyzing vessel tracking data in order to determine/predict a unique identifier of the vessel that is resistant to covert changes of the vessel tracking transceiver of the vessel associated with the vessel tracking data.

BACKGROUND

Shipping vessels are tracked using vessel tracking devices such as Automatic Identification Systems (AIS) that include vessel-based transceiver systems. Each vessel transmits data including unique identification, position, course, and speed, amongst other things. The vessel may receive and display this information on an electronic chart display and information system (ECDIS). Shore-based tracking can include AIS base stations, and vessel traffic services (VTS) that may be provided at a harbor or port which provide functionality similar to air traffic control systems for aircraft.

AIS transceivers have been mandatory since the International Maritime Organization's (IMO) International Convention for the Safety of Life at Sea (SOLAS) for international voyaging ships with 300 or more gross tonnage (GT), and all passenger ships regardless of size. AIS has been implemented first as a terrestrial-based system (T-AIS) and later as a satellite-based system (S-AIS).

A primary challenge of using Automatic Identification System (SAIS) data is the quality of the data itself. Many of the SAIS data quality challenges are related to the identification messages. AIS data may be used to track vessels, and provide identification using the Maritime Mobile Service Identity (MMSI) field in the AIS data. AIS itself however, does not provide for reliable vessel identification and AIS data does not provide protection for vessels which disable, spoof, or otherwise make malicious use of the transmitted data.

The inventors have previously worked on a series of AIS Data Quality Analysis reports. A key finding was that no single field within messages can be used to identify the presence of other errors. Also, most errors in messages are not due to the processing method; they are likely attributable to human action. Additionally, the accuracy of MMSIs and IMOs limits the ability to use a secondary database to supplement the information within the AIS message itself.

In another example, Greidanus (2013) studied vessel AIS data off the Horn of Africa. Only 5122 distinct MMSI values were identified, yet 5235 unique ships were detected. While some may have been intentionally misconfigured to mask vessel identity, erroneous MMSIs may also be unintentional. These values are entered manually by the user and the AIS transponder devices may not be configured correctly, or the AIS messages may contain bit errors when received by the satellites, which operate in dense signal environments.

Incorrect MMSI values pose a major obstacle to the tracking of ocean-going vessels because this identifier is the only common field in both position (messages 1, 2 and 3) and static AIS messages (message 5, which contains information about the vessel type and dimensions). Consequently, if multiple vessels are reporting the same MMSI, it is difficult to confidently link static and position messages, which are transmitted by vessels at different intervals. The ambiguities in AIS data underscore the need for further methods of identification.

Errors in static AIS data are not restricted to MMSI values. A study by Harati-Mokhtari (2007) saw major inconsistencies in reported vessel type, with an error rate of 74% of ships either not reporting or incorrectly reporting their vessel type. These errors appear to have decreased over time: Westerdijk (2019) reported that 17.9% of unique MMSIs in the study region had either a missing or incorrect vessel type. Nevertheless, whether ship type is unintentionally or willfully misstated, it proves problematic when seeking to identify and track ocean vessels.

These AIS data issues may be caused by, for example, a vessel tracking transceiver being shut off by vessel crew. This may be done intentionally in order to hide the vessel cargo in cases where its export is from a sanctioned country (for example, oil exports from Iran) or where the transport of the vessel cargo is forbidden (for example, nuclear material through the waters of a nuclear free nation), where the vessel is hijacked, or unintentionally as a result of operator error. In a second example, a vessel tracking transceiver may have its unique identifier changed or spoofed in order to assign false vessel information. This allows for the vessel to masquerade as a friendly vessel and enter ports, harbors, or national waters where they are unwelcome. In both of these examples, the MMSI field in the AIS data lacks the ability to uniquely and reliably identify a vessel.

Vessel dynamics are extensively influenced by external forces and moments caused by environmental disturbances. These include winds, waves and ocean currents, with waves playing an especially important role (Liu, 2017). Thus, environmental disturbances can cause vessels to continually deviate from their desired course (Perez, 2009). The purpose of a vessel's autopilot control system is to maintain the captain's desired course, or set point, in the presence of external forces by constantly adjusting and correcting the vessel's heading (see FIG. 1). Oscillations in a vessel's trajectory are manifestations of the control system responding to environmental perturbations and can be observed as fluctuations in the vessel's course over ground (COG) over time. In the absence of external forces, a vessel would not deviate from its desired course and, consequently, a control system would not need to change its heading to achieve its desired course. In actuality, though, a vessel's control system continuously responds to environmental perturbations resulting in persistent variations in COG over time.

SUMMARY

When a vessel is at sea and underway, its autopilot (or vessel's control) system is usually used to ensure safe sailing and maintain the vessel on the desired course. Vessel dynamics are extensively influenced by external forces and moments caused by environmental disturbances. These include winds, waves and ocean currents, with waves playing an especially important role (Liu, 2017). Thus, environmental disturbances can cause vessels to continually deviate from their desired course (Perez, 2009). The purpose of a vessel's autopilot control system is to maintain the captain's desired course, or set point, in the presence of external forces by constantly adjusting and correcting the vessel's heading.

Oscillations in a vessel's trajectory are manifestations of the control system responding to environmental perturbations and can be observed as fluctuations in the vessel's course over ground (COG) over time. In the absence of external forces, a vessel would not deviate from its desired course and, consequently, a control system would not need to change its heading to achieve its desired course. In actuality, though, a vessel's control system continuously responds to environmental perturbations resulting in persistent variations in COG over time A vessel's constant course deviations caused by environmentally induced forces and the corrections applied by the control system cause the vessel trajectory to vary back and forth across the ideal trajectory that would have been achieved in the absence of such external forces (i.e., it causes induced oscillatory motions). The characteristics of the induced motion in frequency and amplitude differ depending on the vessel's control system, its unique hydrodynamic (hull shape, bow shape) and kinematic properties (e.g., speed, turning radius, maneuverability) and the environmental conditions encountered.

Marine vessels' control systems are formalized by mathematical models (e.g., dynamics model, disturbance model and steering model) that are derived from the vessel profile (e.g., vessel size, overall length, rudders dynamics) and consider (nonlinear) environmental disturbance that could affect the control process (Tomera, 2010) (Fossen, 2000). In this project, it is hypothesized that every vessel (profile type) tends to respond differently in response to environmental conditions. Vessel-specific attributes (i.e., autopilot control system, hydrodynamic and kinematic properties) can be revealed when the vessel's trajectory oscillations are interpreted in the context of the environment in which it was observed. These vessel-specific attributes can then be used to identify the vessel.

Likewise, a vessel's trajectory could change due to manual inputs or changes in the vessel itself, such as load adjustments. These are transient disturbances which are infrequent and episodic. These are essentially stepwise changes. Consider, for example, a captain changing the heading set point of her vessel from 80° to 85° or the uptake or release of ballast water.

Here, systems and methods are provided to generate and use a machine learning model that can identify and make inferences based on continuous fluctuations in trajectory produced by control systems which constantly correct vessels' headings in response to persistent environmental forces, as these oscillations are idiosyncratic and can thus be used to characterize and identify a vessel.

The potential for powerful algorithms, combined with challenges regarding data quality, provide the impetus for developing methods of vessel classification and identification independent of user-specified data that can identify a vessel from its behaviour alone.

The proposed vessel classification may combines at least two different data analysis techniques: signal analysis and deep learning (a subarea in Artificial Intelligence). This approach may use promising signal analysis methods and the best-performance AI models for (signal) classification. In particular, the inventors have used floating-mean Lomb-Scargle periodograms (Cumming, Marcy, & Butler, 1999) to determine the characteristic frequencies of a vessel over a time-interval. Then, the time series of periodograms may be translated into two-dimensional images called spectrograms. A spectrogram image is a visual representation of the spectrum of frequencies of the signal as they vary with time.

At last, spectrogram images may undergo classification using a type of CNN called Residual network (ResNet) (Kaiming He, 2016). The decision to use CNN for spectrogram classification was based on the success reported in the literature (Gatys, 2016) (Verma, 2018) (Y. Jing, 2019). Three classifiers may be used for vessel type, size and identity respectively. The classifiers may be trained on a subset of data and validated using the remaining data.

In a first aspect there is provided a computer implemented method for predicting a vessel identifier, the method comprising: providing, at a memory, a vessel identification model; receiving, at a processor in communication with the memory, vessel data from one or more sources; determining, at the processor, a plurality of periodograms from the vessel data, the plurality of periodograms determined for a candidate vessel corresponding to candidate vessel data in the vessel data; determining, at the processor, a spectrogram based on the plurality of periodograms; and predicting, at the processor, a vessel identifier output of the candidate vessel based on the spectrogram and the vessel identification model.

In one or more embodiments, each of the plurality of periodograms may be determined for the candidate vessel using a sliding window passed over the candidate vessel data.

In one or more embodiments, the plurality of periodograms may be determined for the candidate vessel based on a time-domain to frequency-domain transformation applied to the candidate vessel data.

In one or more embodiments, the time-domain to frequency-domain transformation may comprise a floating-mean Lomb-Scargle periodogram (FMLSP) algorithm.

In one or more embodiments, the spectrogram may comprise a two-dimensional bitmap, the two dimensional bitmap comprising a time axis and a frequency axis.

In one or more embodiments, each pixel of the two-dimensional bitmap may comprise a magnitude of the corresponding periodogram for that time and frequency.

In one or more embodiments, the two-dimensional bitmap may comprise a color depth of 1 bit per pixel, 2 bits per pixel, 4 bits per pixel, 8 bits or 32 bits per pixel.

In one or more embodiments, the vessel data may comprise at least one selected from the group of satellite AIS data from a satellite AIS data source, and vessel information data from a vessel information source.

In one or more embodiments, the vessel data may comprise at least one selected from the group of course-over-ground data, time of transmission data, magnitude of transmission power data, and phase of transmission power data.

In one or more embodiments, the method may further comprise: receiving, at the processor, environmental data from the one or more sources; and wherein the vessel identifier output of the candidate vessel may be predicted based on the environmental data, the spectrogram and the vessel identification model.

In one or more embodiments, the environmental data may comprise at least one selected from the group of: wind speed, wind direction, wave height, wave frequency, ocean current and sea surface temperature.

In one or more embodiments, the method may further comprise: associating the environmental data with the vessel data using a spatial-temporal join.

In one or more embodiments, the environmental data may comprise at least one selected from the group of satellite-mounted moderate resolution imaging spectroradiometers (MODIS) data and Marine Environment Monitoring Service, and satellite data.

In one or more embodiments, the vessel identification model may comprise a convolutional neural network.

In one or more embodiments, the vessel identification model may comprise a vessel type classifier, a vessel size classifier, and a vessel identity classifier.

In one or more embodiments, the method may further comprise predicting, at the processor, a vessel type output of the candidate vessel from based on the spectrogram and the vessel identification model.

In one or more embodiments, the vessel type output may be one of: a cargo ship class, a fishing vessel class, a high-speed craft class, a tanker class and tug class.

In one or more embodiments, the method may further comprise predicting, at the processor, a vessel size output of the candidate vessel from based on the spectrogram and the vessel identification model.

In one or more embodiments, the vessel size output may be one of: a volume below 300 gross tonnage (GT) class, a vessel volume between 301 GT and 900 GT class, a vessel volume between 901 GT and 10000 GT class, a vessel volume between 10001 GT and 40000 GT class, and a vessel of volume above 40000 GT.

In one or more embodiments, the predicting, at the processor, a vessel identifier output of the candidate vessel may comprise: predicting, at the processor, a plurality of candidate vessel identifiers of the candidate vessel; and selecting, at the processor, the vessel identifier output from the plurality of candidate vessel identifiers based on a voting classifier, the voting classifier electing the vessel identifier output based on vessel data.

In a second aspect, there is provided a computer implemented system for predicting a vessel identifier, the system comprising a memory and a processor, the memory and the processor configured to execute the methods identified herein.

In a third aspect, there is provided a computer readable media for predicting a vessel identifier, the computer readable media configuring a system comprising a memory and a processor to execute the methods identified herein.

In a fourth aspect, there is provided a computer-implemented method for generating a vessel identification model, the method comprising: providing a historical vessel tracking database comprising historical vessel tracking data for a plurality of vessels; determining, at a processor in communication with the historical database, a plurality of periodograms from the historical vessel tracking data, the plurality of periodograms determined for the plurality of vessels in the historical database; determining, at the processor, a plurality of spectrograms based on the plurality of periodograms; and generating, at the processor, a vessel identification model based on the plurality of spectrograms.

In one or more embodiments, an environmental database may be provided comprising environmental data corresponding to the historical vessel tracking data of the plurality of vessels; and wherein the generating the vessel identification model may further comprise generating the vessel identification model based on the historical vessel tracking data and the environmental data.

In one or more embodiments, the environmental database may comprise at least one selected from the group of: wind speed data, wind direction data, current speed data, current direction data, sea surface temperature data and significant wave height data; and wherein the method may further comprise performing a spatial-temporal join of the environmental data and the historical vessel tracking data.

In one or more embodiments, a historical vessel metadata database may be provided comprising vessel metadata corresponding to the plurality of vessels in the historical vessel tracking database; and wherein the generating the vessel identification model may further comprise generating the vessel identification model based on the historical vessel tracking data and the vessel metadata.

In one or more embodiments, the generating the vessel identification model may comprise: generating, at the processor, a vessel type model; generating, at the processor, a vessel size model; and generating, at the processor, a vessel identity model.

In one or more embodiments, the determining the plurality of periodograms from the historical vessel tracking data may comprise selecting the historical vessel tracking data based on one or more vessel tracking data filters.

In one or more embodiments, the determining the plurality of periodograms from the historical vessel tracking data may comprise: identifying one or more vessel passes for each of the plurality of vessels in the historical vessel tracking data; splitting each vessel pass into a plurality of subsections; and wherein the plurality of periodograms may be determined for each of the plurality of subsections for each of the plurality of vessels.

In one or more embodiments, the determining each of the plurality of periodograms may be determined using a Lomb-Scargle (LS) algorithm.

In one or more embodiments, each vessel pass may be split into five subsections.

DRAWINGS

FIG. 16 shows a mapping diagram in accordance with one or more embodiments.

FIG. 17 shows another analysis diagram in accordance with one or more embodiments.

FIG. 40 shows a random forest method diagram in accordance with one or more embodiments.

FIG. 41 shows an input/output table diagram in accordance with one or more embodiments.

FIG. 42 shows another method diagram in accordance with one or more embodiments.

FIG. 43 shows an ensemble method diagram in accordance with one or more embodiments.

FIG. 48 shows a brief summary of the vessels described in Example 1 in accordance with one or more embodiments.

DESCRIPTION OF VARIOUS EMBODIMENTS

Figure 1:
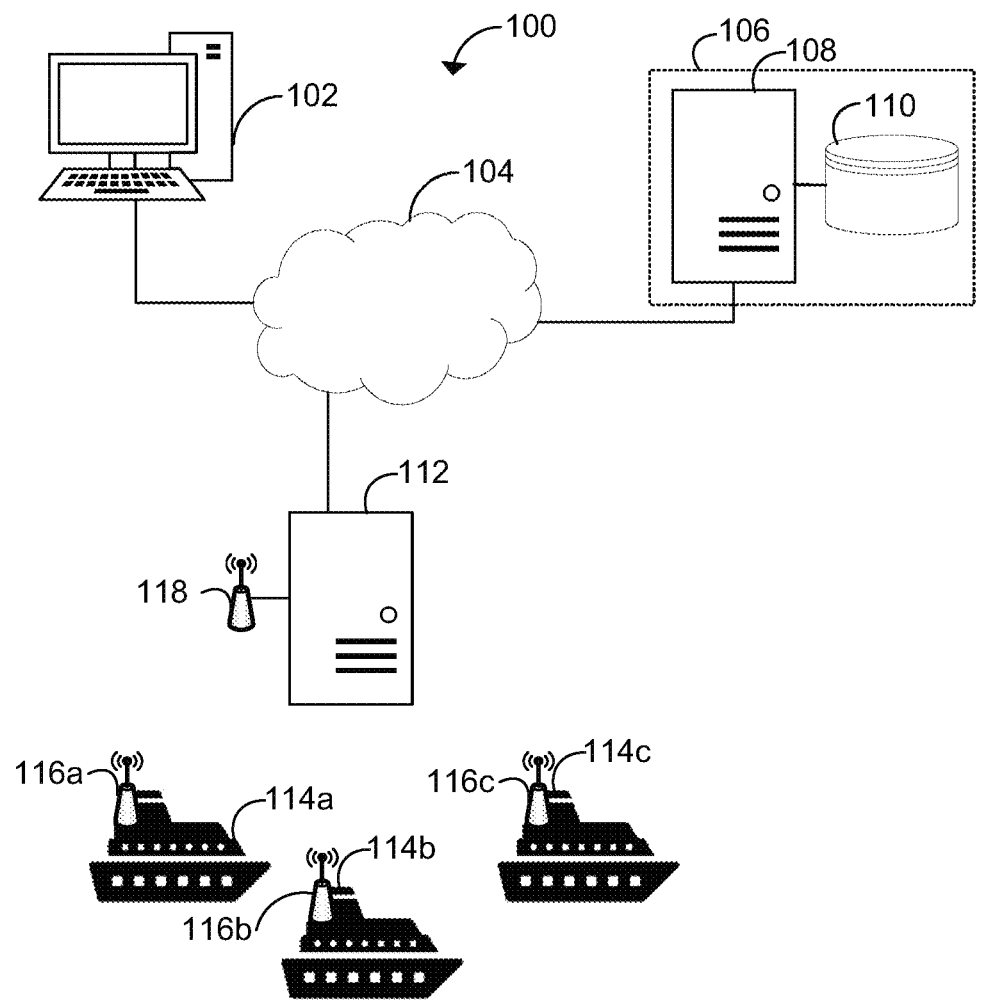
FIG. 1 shows a system diagram of a system for vessel identification in accordance with one or more embodiments.

Various apparatuses or methods will be described below to provide an example of the claimed subject matter. No example described below limits any claimed subject matter and any claimed subject matter may cover methods or apparatuses that differ from those described below. The claimed subject matter is not limited to apparatuses or methods having all of the features of any one apparatus or methods described below or to features common to multiple or all of the apparatuses or methods described below. It is possible that an apparatus or methods described below is not an example that is recited in any claimed subject matter. Any subject matter disclosed in an apparatus or methods described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It should also be noted that the terms "coupled", or "coupling" as used herein can have several different meanings depending on the context in which these terms are used. For example, the terms "coupled", or "coupling" can have a mechanical, electrical or communicative connotation. For example, as used herein, the terms "coupled", or "coupling" can indicate that two elements or devices can be directly connected to one another or connected to one another through one or more intermediate elements or devices via an electrical element, electrical signal or a mechanical element depending on the particular context. Furthermore, the term "communicative coupling" indicates that an element or device can electrically, optically, or wirelessly send data to another element or device as well as receive data from another element or device.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Some elements herein may be identified by a part number, which is composed of a base number followed by an alphabetical or subscript-numerical suffix (e.g., 112$a$, or 112$_1$). Multiple elements herein may be identified by part numbers that share a base number in common and that differ by their suffixes (e.g., 112$_1$, 112$_2$, and 112$_3$). All elements with a common base number may be referred to collectively or generically using the base number without a suffix (e.g., 112).

The example systems and methods described herein may be implemented in hardware or software, or a combination of both. In some cases, the examples described herein may be implemented, at least in part, by using one or more computer programs, executing on one or more programmable devices comprising at least one processing element, a data storage element (including volatile and non-volatile memory and/or storage elements), and at least one communication interface. These devices may also have at least one input device (e.g., a keyboard, a mouse, a touchscreen, and the like), and at least one output device (e.g. a display screen, a printer, a wireless radio, and the like) depending on the nature of the device. For example, and without limitation, the programmable devices (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some examples, the communication interface may be a network communication interface. In examples in which elements are combined, the communication interface may be a software communication interface, such as those for inter-process communication (IPC). In still other examples, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high-level procedural, declarative, functional or object-oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g., ROM, magnetic disk, optical disc) readable by a general or special purpose programmable computer, for configuring and operating the computer when the storage media or device is read by the computer to perform the procedures described herein. Examples of the system may also be considered to be implemented as a non-transitory computer-readable storage medium, configured with a computer program, where the storage medium so configured causes a computer to operate in a specific and predefined manner to perform the functions described herein.

Furthermore, the example system, processes and methods are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various examples of systems, methods and computer programs products are described herein. Modifications and variations may be made to these examples without departing from the scope of the invention, which is limited only by the appended claims. Also, in the various user interfaces illustrated in the figures, it will be understood that the illustrated user interface text and controls are provided as examples only and are not meant to be limiting. Other suitable user interface elements may be used with alternative implementations of the systems and methods described herein.

As recited herein, vessel tracking systems may include Automatic Identification Systems (AIS), and other such vessel tracking systems whether terrestrial-based or satellite-based.

Reference is first made to FIG. 1, showing a system drawing 100 of a system for vessel identification. The system 100 has a user device 102, a network 104, an identification service 106 having a server 108 and a database 110, at least one vessel tracking provider server 112 having a vessel tracking transceiver 118, and at least one vessel 114 having a vessel tracking transceiver 116.

User devices 102 may be used by an end-user to access an application (not shown) running on identification service 106. For example, the application may be a web application, or a client/server application. The user devices 102 may be a desktop computer, mobile device, or laptop computer. The user devices 102 may be in network communication with identification service 106 via network 104. The user devices 102 may display the application, and may allow a user to request a vessel identification of at least one of the vessels 114. The vessel identification service 106 may function as part of an Application Programming Interface (API) to enable other software applications to uniquely identify vessels. The end user may be from a government agency such as the Coast Guard, a defense organization such as the Navy, a corporate organization such as an international shipping company, or another interested party.

Network 104 may be a communication network such as the Internet, a Wide-Area Network (WAN), a Local-Area Network (LAN), or another type of network. Network 104 may include a point-to-point connection, or another communications connection between two nodes.

Identification service 106 includes one or more servers 108 and one or more databases 110. Identification service 106 may provide software services to the user device 102 and may communicate with at least one vessel tracking provider server 112 to receive vessel tracking data. The identification service 106 may further communicate with other data providers (not shown), including $3^{rd}$ party data providers for vessel incident information, vessel information, regional boundary information, and environmental information.

Identification service 106 may provide a web application that is accessible by the user devices 102. The web application may provide user authentication functionality as known, so that a user may create an account and/or log into the web application in order to request or receive vessel identification. The identification service 106 may provide the vessel identification functionality to a user as described herein.

Identification service 106 may implement an Application Programming Interface (API) to receive requests from the user devices 102, or from a third party (not shown). The identification service 106 may reply to the API requests with API responses, and the API responses may provide the functionality of the web application provided by identification service 106. The API may receive requests and send responses in a variety of formats, such as JavaScript Object Notation (JSON) or extensible Markup Language (XML).

The identification service API may receive requests from an application running on the user devices 102. The application running on the user devices 102 may be downloaded from the web application provided at identification service 106, or may be downloaded from the Google® Play Store or the Apple® App Store.

Server 108 is connected to network 104 and database 110, and may provide functionality as described herein. The server may implement one or more external APIs, as described above. The server 108 may be a physical server, may be the same server device as the device running the database 110, or may be provided by a cloud provider such as Amazon® Web Services (AWS).

Server 108 may have a web server provided thereon for providing web-based access to the software application providing the API and/or the software application providing the web application. The web server may be one such as Apache®, Microsoft® IIS®, etc. The software application providing the API and the web application may be Apache® Tomcat, Ruby on Rails, or another web application framework as known.

The database 110 is connected to network 104 and may store historical data for a number of vessels, including regional boundaries (including data received from an external data source, and data determined or generated by the identification service itself), vessel tracking data (for example, including AIS data received from an AIS data vendor), vessel data (including vessel data received by a vessel data vendor), vessel incident data (including vessel incident data from a vessel incident data vendor), and environmental data.

The database 110 may further store historical vessel information including historical vessel Maritime Mobile Service Identity (MMSI) information, historical vessel name information, historical vessel port visit information, historical vessel trip information, historical vessel visit information, historical vessel trip information, historical vessel trip movement information, historical vessel trip speed information, historical vessel tracking transmission information, historical vessel trip position accordance information, historical vessel trip sea route information, historical vessel trip crew size information, historical vessel incident information, and historical vessel rendezvous information. The database 110 may store other historical information such as historical vessel behavior tracking information, and historical vessel abnormal behavior information.

The database 110 may further store generated profiles determined by the identification service. The generated profiles include statistical information for vessels, including statistical information such as vessel Maritime Mobile Service Identity (MMSI) profiles, vessel name profiles, vessel destination profiles, vessel visit duration profiles, vessel trip duration profiles, vessel movement profiles, vessel speed profiles, vessel tracking transmission profiles, vessel tracking position accordance profiles, vessel sea route profiles, vessel crew size profiles, vessel incident profiles, and vessel rendezvous profiles. The statistical information in the generated profiles may be determined for each vessel, for a type of vessel (including size, or manufacturer), or a combination of these factors. The database 110 may be a Structured Query Language (SQL) such as PostgreSQL or MySQL or a not only SQL (NoSQL) database such as MongoDB. For example, vessel profiles may include historical behavior change frequency distribution information as described herein.

Vessel tracking provider server 112 may be a first party server which is within the same organization as the identification server 106, for example, a shore-based or satellite-based AIS receiver. Alternatively, the vessel tracking provider server 112 may be a third party provider, such as exactEarth®, ORBCOMM®, Spacequest®, or Spire®. The identification service 106 may receive vessel tracking data from multiple different vessel tracking provider servers 112.

The vessel tracking provider server 112 may have a vessel tracking transceiver 118 that receives vessel tracking transmissions of the at least one vessel 114. The vessel tracking transmissions may include a plurality of data as described herein about each vessel and its location. The vessel tracking provider may provide an API for the identification service 106 to request periodic vessel tracking transmission data to be transferred. The vessel tracking provider may alternatively push vessel tracking transmission data to an API at the identification service 106. While three vessels 114 are shown, it is understood that there may be many more vessels, hundreds, thousands, tens of thousands, or hundreds of thousands.

The vessel tracking provider server 112 may provide vessel tracking data in a plurality of formats and standards. In an exemplary embodiment, the vessel tracking provider server 112 may provide AIS data according to the International Maritime Organization (IMO) International Convention for the Safety of Life at Sea (SOLAS) treaty. The vessel tracking provider server 112 may perform pre-processing of vessel tracking data that is received by the vessel tracking transceiver 118.

As disclosed herein, vessel tracking data may allow ships and shore-based stations to view marine traffic in a geographical area. For example, the vessel tracking data may be displayed on a chartplotter. Alternatively, vessel tracking transceiver signals for a geographical area may be viewed via a computer using one of several computer applications such as ShipPlotter and Gnuais.

Vessel tracking transceiver 118 may demodulate the signal from a modified marine VHF radiotelephone tuned to the vessel tracking frequencies and convert into a digital format that the vessel tracking provider server 112 can read, store in memory, transmit over network 104, or display (not shown). The vessel tracking data received by vessel tracking transceiver 118 and vessel tracking provider server 112 may then be shared via network 104 using TCP or UDP protocols as are known.

The vessel tracking transceiver 118 may be limited to the collective range of the radio receivers used in the network as the vessel tracking provider system. In one embodiment, the vessel tracking provider system may have a network of shore-based vessel tracking transceivers to provide broader geographical coverage. In another embodiment, the vessel tracking provider system may have a network of satellite-based vessel tracking transceivers that may be used to receive vessel tracking transmissions from earth orbit.

Vessel tracking transceiver 118 may be a satellite receiver, or a dedicated VHF vessel tracking transceiver. The vessel tracking transceiver may receive AIS signals from local traffic for viewing on an AIS enabled chartplotter, or using an AIS compatible computer system. Port authorities or other shore-based facilities may be equipped with transceivers. Vessel tracking transceiver 118 may transmit in the Very High Frequency (VHF) range, with a transmission distance of about 10-20 nautical miles.

In the exemplary example of an AIS vessel tracking system, transceiver 118 may use the globally allocated Marine Band channels 87 and 88. AIS transceiver 118 may use the high side of the duplex from two VHF radio "channels" (87B) and (88B). For example, the AIS transceiver may use channel A 161.975 MHZ (87B) and channel B 162.025 MHz (88B).

Vessel tracking transceiver 118 may provide information such as a vessel's identity, vessel type, vessel position, vessel course, vessel speed, vessel navigational status and other vessel safety-related information automatically to appropriately equipped shore stations, other ships and aircraft. Vessel tracking transceiver 118 may receive automatically such information from similarly fitted ships, may monitor and track ships; and may exchange data with shore-based facilities.

At least one vessel 114 may carry an AIS transceiver according to SOLAS regulation V/19-Carriage requirements for shipborne navigational systems and equipment. This regulation requires that AIS transceivers be fitted aboard all ships of 300 gross tonnage and upwards engaged on international voyages, cargo ships of 500 gross tonnage and upwards not engaged on international voyages and all passenger ships irrespective of size. The vessels 114 may be a variety of different types of vessels, including sailboats, shipping vessels, motorboats, yachts, passenger vessels, ferries, etc. There may be some vessels not required under SOLAS regulation who elect to fit AIS transceivers anyways. While three vessels 114 are shown, it is understood that many more vessels 114 may transmit and receive information using vessel tracking transceivers 116. This may include hundreds, thousands, tens of thousands, hundreds of thousands, or millions of vessels 114. The number of vessels 114 may fluctuate as vessels 114 are brought into service or taken out of service.

Vessel tracking transceivers 116 aboard vessels 114 may function the same as vessel tracking transceiver 118, but may be designed for operation on a vessel (i.e. sizing, electrical power requirements, etc.). Further, each vessel 114 may transmit its location using its corresponding vessel tracking transceiver 116. This may allow vessels to provide their location to other vessels to ensure awareness and visibility of their vessel.

Figure 2:
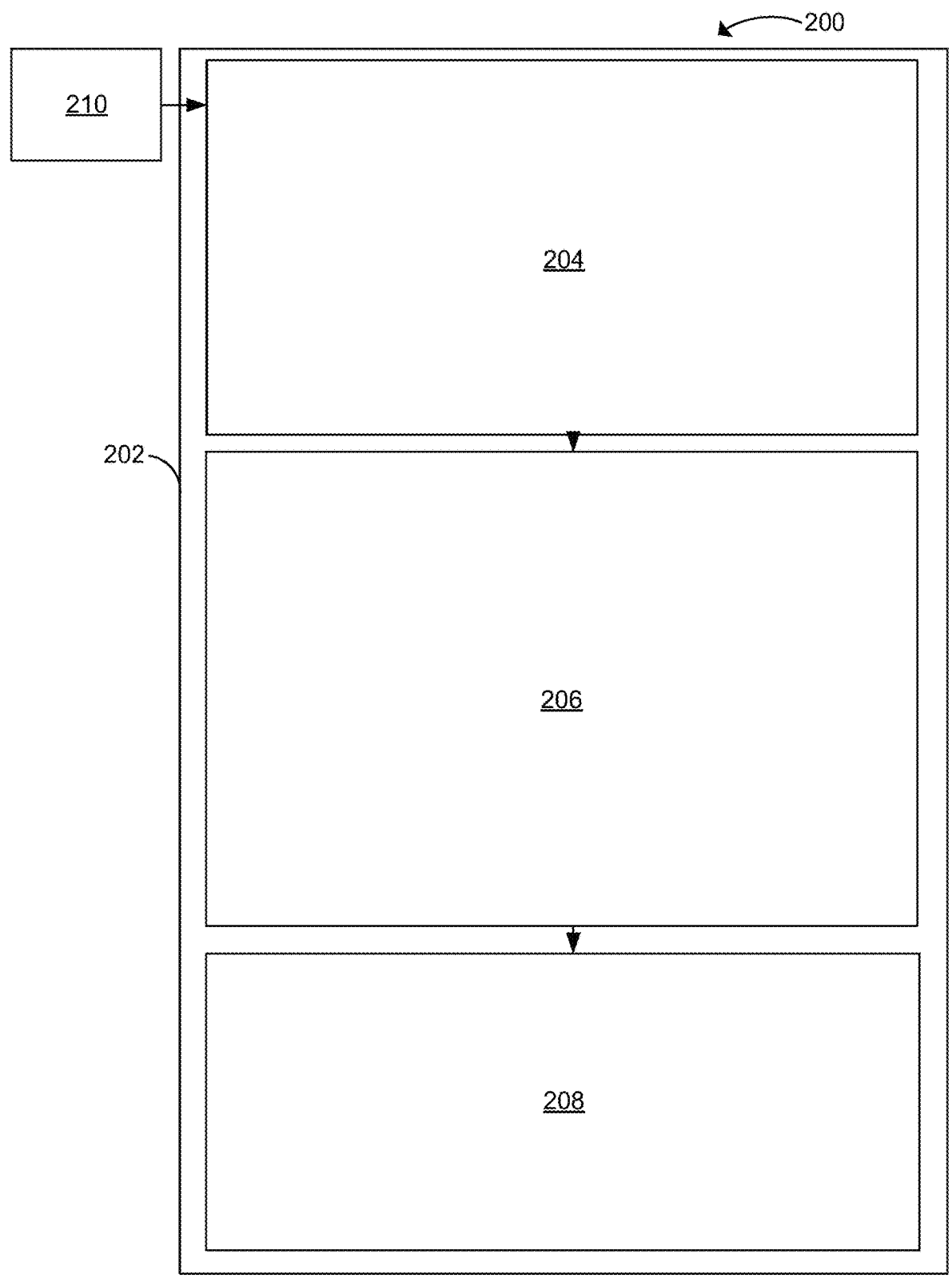
FIG. 2 shows a method diagram for identifying vessels in accordance with one or more embodiments.

Referring next to FIG. 2, there is shown a method 200 for determining a vessel identification in accordance with one or more embodiments. Method 200 may be a high-level method that is described in further detail herein. Method 200 may be performed by server 202, having data ingestion 204, vessel data processing 206, and vessel identification 208.

One or more data sources 210 may be provided as input to the identification server 202. These one or more data sources may include one or more vessel tracking data providers, one or more vessel information providers, one or more mapping providers, one or more regional boundary providers, one or more vessel incident providers, one or more environmental data providers, etc.

The data from the one or more data sources 210 is received by a data ingestion 204. The data ingestion process is described in further detail in FIG. 3. The ingested data is received by vessel data processing 206, which is described in further detail in FIGS. 4 and 5. The processed data is received by vessel identification 208, which is described in more detail in FIGS. 7, 19, 20, 24, 25, 28, 30, 31, 32, 34, 35, 38, 39, 40, 42 and 43.

Figure 3:
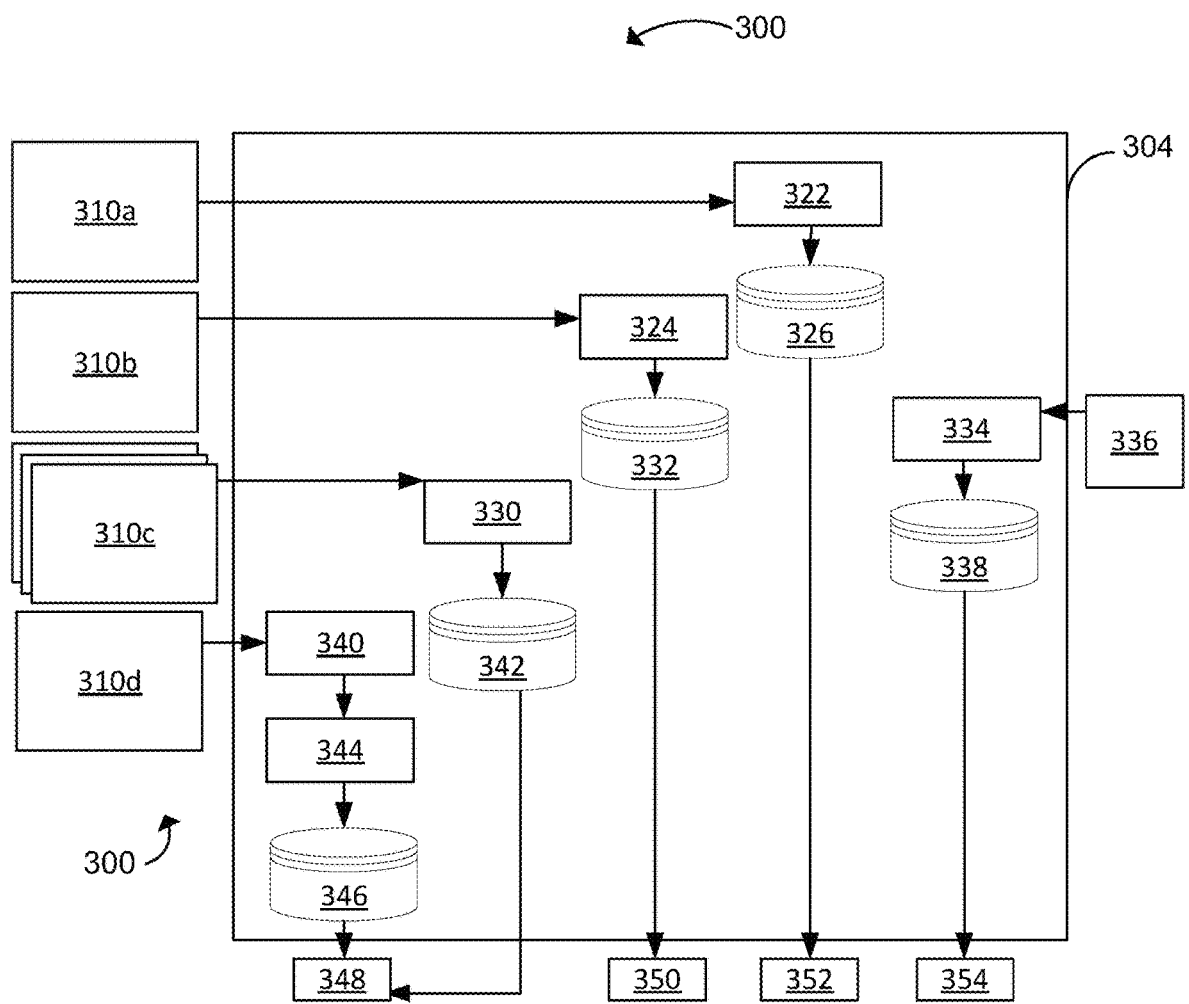
FIG. 3 shows a method diagram for ingesting data in accordance with one or more embodiments.

FIG. 3 shows a data ingestion method 300 provided by identification server 304 in accordance with one or more embodiments. The data ingestion method may receive data from one or more data sources, including one or more vessel incident data providers 310a, one or more vessel information data providers 310b, one or more vessel tracking data providers 310c, one or more region boundary data providers 310d, and an environmental data provider 334. Data ingestion may occur periodically, i.e. daily, weekly, monthly, or may occur generally in real-time.

Data ingestion 300 may be performed to receive data into data lakes, and may use a data streaming service such as Amazon® Web Services (AWS®) Firehose Kinesis®. Data may be ingested in near real-time, or using a periodic polling process.

Vessel incident data is received from the one or more vessel incident data providers 310a at vessel incident data ingestion 322. The vessel incident data may be processed by vessel incident data ingestion 322, and may include pre-processing the incident data. The vessel incident data may include incidents of piracy, attempted piracy, collisions at sea between vessels, near misses at sea between vessels, destabilizing military equipment, dual use goods and narcotics-related transfers, untaxed or smuggled commodity transfers such as tobacco, oil and timber. Other activities that may be provided in the vessel incident data provided by the vessel incident provider 310a may include illegal, unreported and undocumented fishing as well as the movement of undocumented migrants in vessels that constitute a safety risk to their passengers. For example, the vessel incident data may be the Vessel and Maritime Incident Database from the Stockholm International Peace Research Initiative, the Transportation Safety Board of Canada Marine transportation safety investigations and reports database, the International Maritime Organization Maritime Facts and Figures Database, Confidential Human Factors Incident Reporting Program/Confidential Hazardous Incident Reporting Program (CHIRP) Reference Library Database, or another similar database.

The vessel incident data records provided by the vessel incident data providers 310a may also include geographical location information about each incident, timestamps and/or the duration of the incidents, vessel information from the incidents, etc. The vessel incident records, may include for example, Maritime Ship Security Advisories (for example, SHIP SECURITY ADVISORY NO. 12-20 from the Maritime Administrator of the Republic of the Marshall Islands, warning of piracy in the Gulf of Guinea).

Once the vessel incident data is ingested, it may be stored in a vessel incident database 326. The vessel incident database 326 may be stored at database 110 (see FIG. 1). The vessel incident database 326 may provide vessel incident data 352 to the vessel data processor and the identification engine.

Vessel information data is received from the one or more vessel information data providers 310b at vessel data ingestion 324. The vessel information data providers may be a database such as the National Maritime Information Database (NMID) from the Canadian Government, the Information Handling Services (IHS) vessel database, the Spectrum Direct Database provided by Industry Canada/ITU. The vessel information data may include vessel name information, vessel crew information (including but not limited to, changes in vessel crew manifests, crew member nationality, etc.), vessel general classification information, vessel individual classification information (including classification history), a vessel station group MMSI, a vessel gross tonnage, vessel passenger capacity information, vessel length, vessel MMSI number, vessel registration information including applicant information of the vessel registration, vessel ownership information (for example, the corporation of legal entity e.g. Groenewald & Germishuys C C, Tangming Co Ltd), etc. The vessel information data, once processed by vessel data ingestion 324, may be stored in vessel database 332. The vessel database 332 may be stored at database 110 (see FIG. 1). The vessel database 332 may provide vessel data 350 to the vessel data processor and the identification engine.

Vessel tracking data is received from the one or more vessel tracking data providers 310c for vessel tracking data ingestion 330. This may include satellite-based or terrestrial based tracking data.

In an exemplary embodiment, AIS data is received from the one or more AIS data providers 310c at AIS data ingestion 330. As described above, the AIS data may include Satellite AIS data (SAIS) and Terrestrial AIS data (TAIS). The AIS data may be stored as point data, corresponding to the periodic transmissions of an AIS equipped vessel.

Vessel tracking data may be processed by vessel tracking data ingestion 330, and may be decoded from a raw format. The processed vessel tracking data may be stored in the AIS database 342.

In an exemplary embodiment, AIS data may be processed by AIS data ingestion 330 and may be decoded from the AIS National Marine Electronics Association (NMEA) 0183 or NMEA 2000 data formats. The decoding may further include decoding AIS sentences such as AIVDM sentences. Decoding of AIS messages may further include decoding based on ITU Recommendation M.1371 (including revisions), IALA Technical Clarifications on Recommendation ITU-R M.1371-1, and IEC-PAS 61162-100. An AIVDM sentence may describe the vessel position and vessel information of a vessel, or other pieces of information as described in the AIS specifications. The processed AIS data may be stored in the AIS database 342.

The vessel tracking data ingestion 330 may determine variables from each vessel tracking data point or segment of vessel tracking data for a vessel.

The vessel tracking data ingestion 330 may further match vessels identified in the vessel tracking data with vessels found in the vessel database 332 or vessel incident database 326.

Regardless of the type of vessel, navigation may be affected by environmental factors external to the ship, such as wave height, wave frequency, wind speed and wind direction. A vessel's control system is responsible for maintaining the vessel's setpoint in the presence of external forces by constantly adjusting the heading. Course adjustments are responses to environmental conditions and they may depend on the direction and magnitude of environmental forces encountered, which vary in space and time and their impact on that vessel. To understand the control system adjustments observed, it is necessary to quantify and characterize the environmental conditions experienced by the vessel.

Here, vessels on a set course were considered and their trajectory oscillations were examined over time. These oscillations are produced by a vessel's control system in response to environmental perturbations.

In the absence of external forces, a vessel's control system would maintain a steady course without deviations. Preliminary analysis suggests intervals of 2 to 3 hours of steady transit are often observed in our area of interest.

The vessel tracking database 342 may be stored at database 110 (see FIG. 1). The vessel tracking data from vessel tracking database 342 may be provided with the region boundary data from region boundary database 346 as vessel tracking data and boundary data 348 to the vessel processing and the identification engine.

Regional boundary data is received from the one or more region boundary data providers 310d at region boundary data ingestion 340. The region boundary ingestion 340 may involve pre-processing of the region boundary data. Region boundary data curation 344 may be performed automatically, or manually, in order to connect disparate region boundaries in the region boundary data. The region boundary data may include a plurality of connected points, where each point has latitude and longitude data. The points may further be connected using the geometric location of ports, marine regions, and locations of Exclusive Economic Zones (EEZ). The region boundaries may be encoded in a shapefile. A shapefile may be a simple, nontopological format for storing the geometric location and attribute information of geographic features. Geographic features in a shapefile may be represented by points, lines, or polygons (areas).

Marine regions and EEZs may be provided as shapefiles. The marine region and EEZ shapefiles may be, for example, those produced by Flander Marine Institute which maintains a database of international borders in open waters. At 344, the shapefiles may be altered or curated. For example, an EEZ may be altered further to improve data processing times by reducing the size of the shapefile. The curation 344 may be performed by generating a one-way buffer in land for the EEZ. This may simplify the geometry around the coastline and allow joining of vessel tracking messages that may be at the land-sea boundary. The buffering of only 1 side may prevent an increasing of the extent of a countries EEZ.

The port shapefiles may be determined using the World Port Index ports. The ports may be converted into points, and then buffered to generate port zone shapefiles.

After the regional boundary data curation 344 is complete, the curated regional boundary data may be stored in region boundary database 346. The region boundary database 346 may be provided by database 110 (see FIG. 1). The region boundary database 346 may provide the curated region boundary data 348 to the vessel data processor and the identification engine.

Environmental data is received from the one or more environmental data providers 336 at environmental data ingestion 334. Environmental data may include sea surface temperature data, ocean current data, surface wind velocity data and significant wave height data, etc.

The environmental data may be stored in environmental database 338. The environmental database 338 may be provided by the database 110 (see FIG. 1). The environmental database 338 may provide environmental data 354 to the vessel data processor and the vessel identification engine.

These environmental data sets may differ in terms of their spatial and temporal resolution, and may exhibit variability on a wide range of temporal and spatial scales. To improve utility, it's desirable for the resolution of these data sets to be sufficient so that the data provides an accurate depiction of the conditions experienced by the vessel when SAIS messages were sent. Discrepancies may arise for two reasons: temporal steps that are too large and spatial resolution that is too coarse, relative to the variability of the conditions.

The temporal resolution of a data set should be commensurate with the time scale of the variable considered. The data sets analyzed herein may have fixed temporal steps over time and range from observations taken every 3 hours (significant wave height) to 5 days (ocean current). An exception may be surface wind speed and direction, which varies based on the sampling rate of the satellites and extent to which swathes overlap. To evaluate the variability of data sets in the context of their temporal resolution, the maximum changes for each variable between consecutive time steps have been analyzed. Sharp, step-like changes suggest that the temporal resolution is inadequate to characterize the variability of the attribute considered.

It is desirable that the spatial resolution of the environmental data be sufficiently high to capture the spatial variability of oceanographic and meteorological conditions. The spatial resolution of the data sets may range from 5 km (sea surface temperature) to 30 km (ocean current). The lower the spatial resolution, the less likely an accurate measurement of the particular conditions present at the spatial point from which the SAIS position message was sent.

Furthermore, environmental data may show different transmission latency. The latency of the environmental data—the time between the data being harvested and provided to users—may be a potential problem if the approach is to be used near real-time analysis of SAIS data. The latency for the data ranged from 2 hours (wind speed) to 120 hours (ocean current). When the data latency is greater than a few hours, it becomes more challenging as an accurate measure for near real-time weather conditions that could be affecting a vessel.

Sea-surface temperature (SST) data may be patchy in terms of availability but may have relatively high spatial resolution and low variability relative to average values, which means they are still useful for our analysis. Significant wave height (SWH) data may have high temporal and spatial resolution together with complete availability. While there are occasionally large changes in magnitude between consecutive time steps likely associated with very dynamic conditions (e.g., storms), changes may be gradual from the perspective of a vessel. Surface winds may be highly variable, exhibiting rapid changes in both time and space. In spite of this variability, good data availability in concert with relatively high resolution may provide the ability to discern trends in both speed and direction when considered in the context of a vessel's trajectory. Ocean current data may have complete coverage and availability, but coarse temporal and spatial resolution. As a result, it may not possible to resolve finer features; however, trends such as gradual shifts in current direction may be evident over the duration of a vessel's journey.

Referring next to FIG. 16, an analysis diagram 1600 is shown for a particular Area of Interest (AOI) in accordance with one or more embodiments. To aid in the discussion of the analysis and incorporation of environment data into the vessel identification system and method, this example transit of the vessel Maple Gas will be used. To visualize issues relating to spatial variability and resolution in the context of an ocean-going vessel, a time series of environmental parameters was examined over the duration of a typical vessel's passage through and Area of Interest (AOI). The AOI in the following data analysis generally covers the Pacific Ocean off the western Canadian coast, and covers the vessel Maple Gas and her transit 1602 (see e.g. FIG. 16) from the Port of Prince Rupert, Canada, toward a final destination of Port of Imari, Japan. These time series demonstrated changes in conditions as the vessel transitioned between cells upon which data were defined. Like for the temporal case, sharp, step-like changes may be indicative of a resolution that inadequately characterizes the variability of the attribute considered.

While examples of environmental data are shown for the particular AOI in FIGS. 10, 11, 12, 13, 14 and 15, it is understood that the environmental data may be provided for another AOI located elsewhere. The environmental data received may include environmental data such as these examples, or there may be other types of environmental data. The environmental data received may include environmental data across the entire world, and is not limited to only the AOI shown in these examples. The environmental data of each environmental data set received may be organized into "cells" or geographic grids that describe the conditions at a particular resolution relative to the earth. For example, the "cells" may be 1 m, 2 m, 10 m, 100 m, 1 km, 5 km, etc. squares. Other sizes of cells may be used and may vary based on the environmental data set provider.

Figure 10:
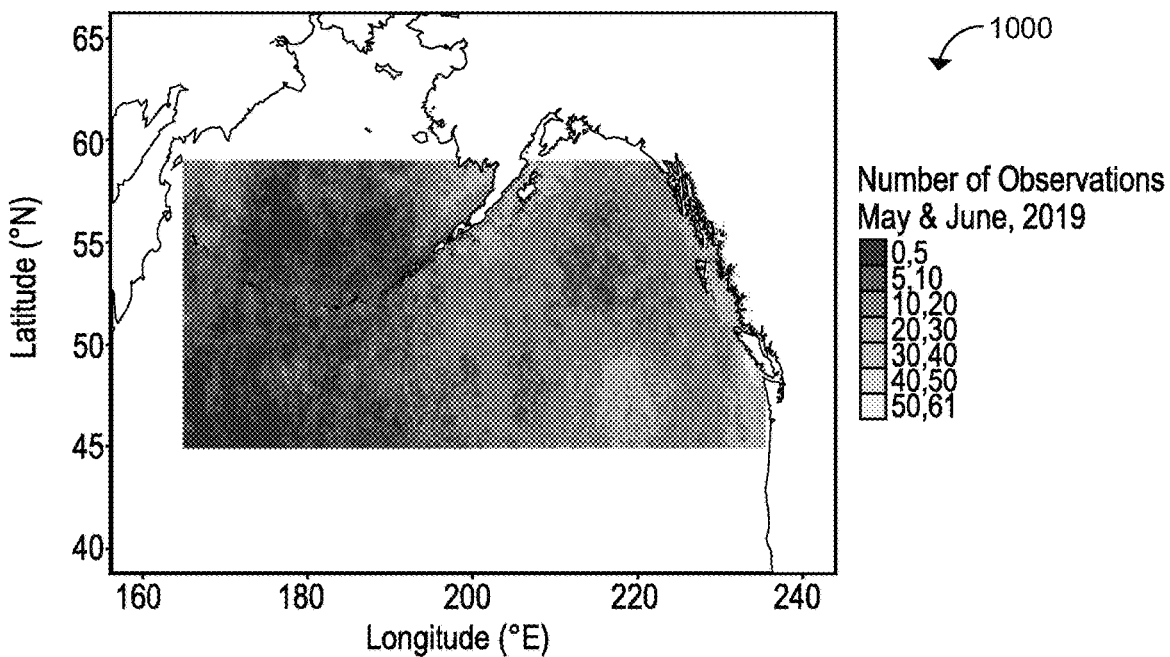
FIG. 10 shows an environment analysis diagram in accordance with one or more embodiments.
Figure 11:
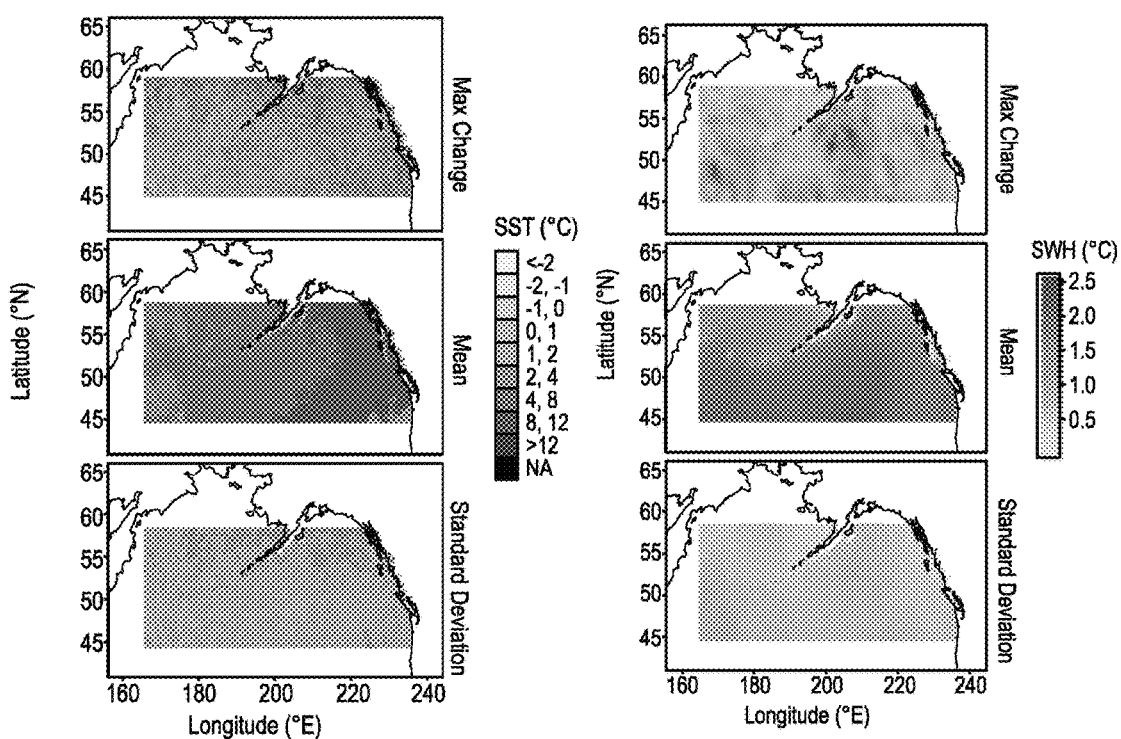
FIG. 11 shows another environment analysis diagram in accordance with one or more embodiments.

Referring next to FIGS. 10 and 11 together, there is shown an environmental data analysis diagram 1000 and additional environmental analysis diagrams 1100 and 1140 of the AOI related to the transit of the vessel Maple Gas (see e.g. FIG. 16). Environmental analysis diagram 1000 shows a temporal resolution of 24 hours, a spatial resolution of 0.041 degrees× 0.041 degrees, and a data latency of 12 hours. As shown, the geographic representation of the number of observations is shown.

Environmental data analysis diagram 1000 includes sea-surface temperature (SST) data, which may be provided in NetCDF files for each calendar day from environmental data providers such as satellite-mounted Moderate Resolution Imaging Spectroradiometers (MODIS). While Terra and Aqua satellites that host MODIS may cover the Earth daily, data may be patchy, meaning that temporal resolution may be typically less than daily. As spatial resolution of MODIS data is high (0.041°), a vessel may use data from neighboring spatial-geographic cells without a major impact on data quality.

Data-poor regions may occur in large patches, which may limits the utility of drawing on neighboring cells in practice. For example, environmental data analysis 1000 shows that SST data are often unavailable for western regions of the AOI, with some parts having 5 or fewer observations for the entire two-month period.

Referring to environmental analysis 1100, environmental data analysis of sea-surface temperature is provided, including temperate variability maximum (top), mean (middle) and standard deviation (bottom) as indicated. Although data availability may be poor for SST, temporal variability and maximum changes between observations may be small relative to mean values of SST. This suggests that SST may vary fairly slowly and, despite the patchiness of the data at a given time, the data set may still be potentially useful.

Referring to environmental analysis 1140, an analysis of environmental data relating to wave height is provided. In analysis 1140, the temporal variability of significant wave height (SWH) is provided, including maximum change (top), mean (middle) and standard deviation (bottom).

Significant wave height (SWH) data may be derived from satellite altimetry data, which may be compiled and processed into a data product by the Copernicus Marine Environment Monitoring Service (CMEMS). This product may have complete availability over the AOI for the considered time period.

Although temporal variability in general may be relatively small, as evident from the standard deviation relative to the mean SWH, the maximum change between two-time steps at a particular location may be comparable to the magnitude of mean despite a high temporal resolution of 3 hours.

Figure 12:
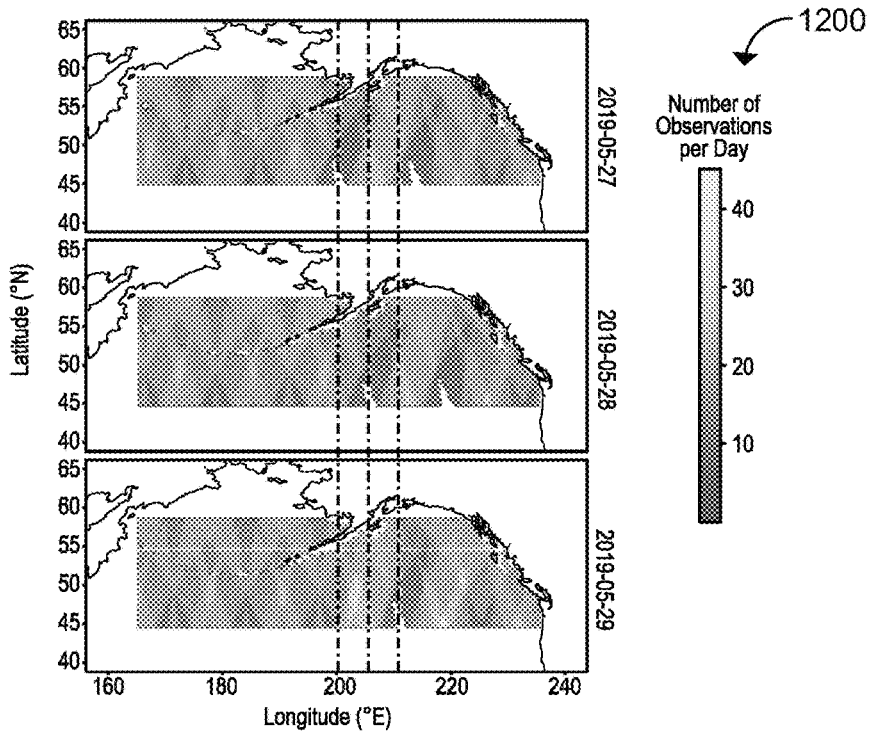
FIG. 12 shows another environment analysis diagram in accordance with one or more embodiments.
Figure 13:
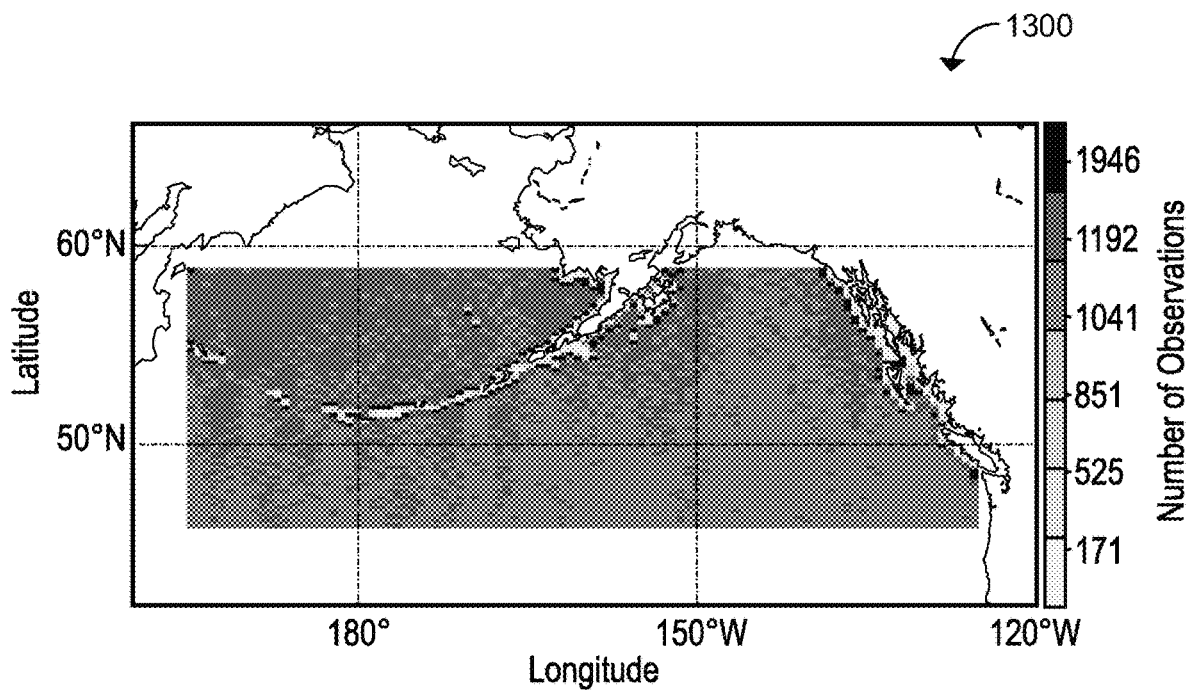
FIG. 13 shows another environment analysis diagram in accordance with one or more embodiments.
Figure 14:
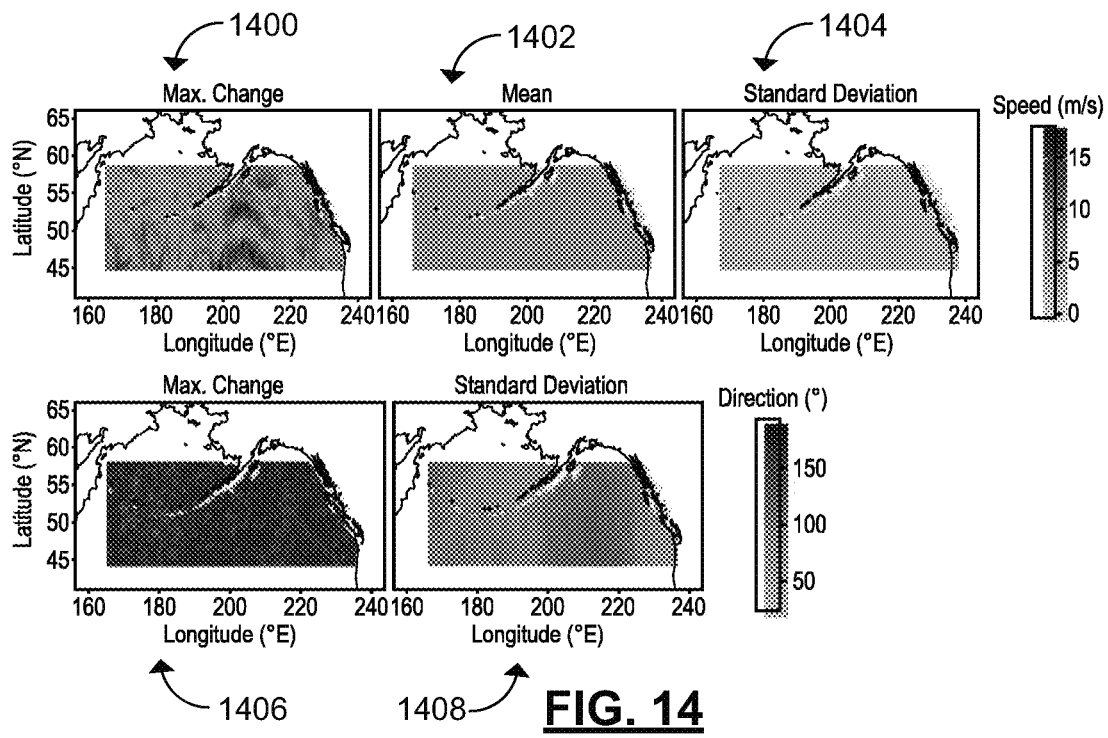
FIG. 14 shows another environment analysis diagram in accordance with one or more embodiments.

Referring next to FIGS. 12, 13 and 14 together, environmental data analysis diagrams 1200, 1300, 1400, 1402, 1404, 1406, and 1408 are provided in accordance with one or more embodiments. These analysis diagrams relate to surface wind and direction environmental data.

Environment data analysis diagram 1200 shows the number of observations of surface wind over three consecutive days. May 27th is shown at the top, May 28th in the middle, and May 29th at the bottom.

Environment data analysis diagram 1300 shows the number of observations of surfaces winds over the months of May and June in 2019.

The environment data analysis diagram in FIG. 14 shows the temporal variability of surface wind speed (analyses 1400, 1402 and 1404) and direction (analyses 1406 and 1408). Max. change shows the maximum absolute change for each cell between two consecutive sampling times, mean shows average values over May and June 2019, and standard deviation.

As satellites pass over a region of ocean, data for wind speed and direction may be harvested in swathes and supplied in NetCDF format. As a result, there may be small parts of the AOI between swathes that do not have coverage; however, the location of these regions may vary daily and, consequently, no region is persistently omitted (see e.g. analysis 1200). In contrast, there may be some regions covered several times a day, providing good temporal resolution in those areas. As a result, data availability may be considered fairly uniform and robust across the AOI (see e.g. analysis 1300).

Unlike the other environmental data sets, the temporal resolution and spatial grid for wind speed and direction data may be irregular. Consequently, the magnitude of changes between observations (in both time and space) may be dependent on the sampling rate and data availability at a given location and time. While mean wind speeds may be somewhat uniform across the AOI—as are standard deviations—maximum changes between time steps in both direction and speed may be substantial, shifting by up to 15 m s−1 and reversing direction completely (see e.g. analysis 1200).

Figure 15:
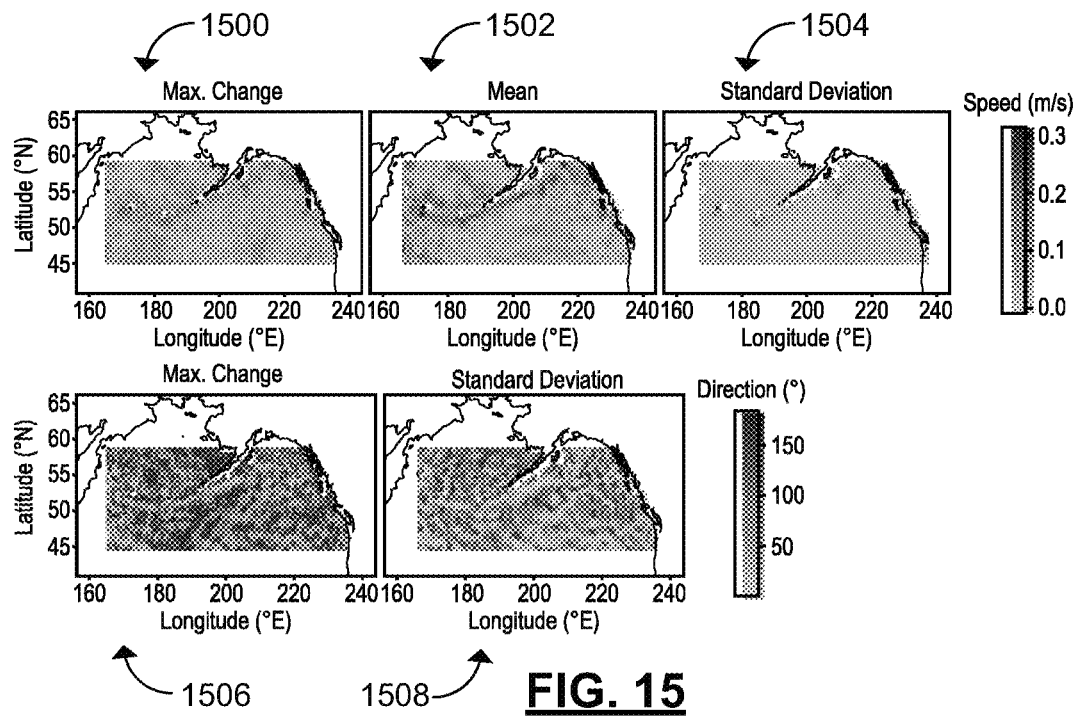
FIG. 15 shows another environment analysis diagram in accordance with one or more embodiments.

Referring next to FIG. 15, additional environmental data analysis diagrams 1500, 1502, 1504, 1506 and 1508 are shown in accordance with one or more embodiments.

Ocean current data may be a modelled data product produced by Earth Space Research. Consequently, it has complete data availability over the AOI, but may have coarse temporal and spatial resolution. As a result, there may be often large changes in current direction between observation times. Dark regions shown in the Max. change panel for current direction (analyses 1506 and 1508) may indicate an almost complete reversal in current direction between two observation times, although there may be less pronounced maximum changes in current speed (analyses 1500, 1502 and 1504).

Figure 4:
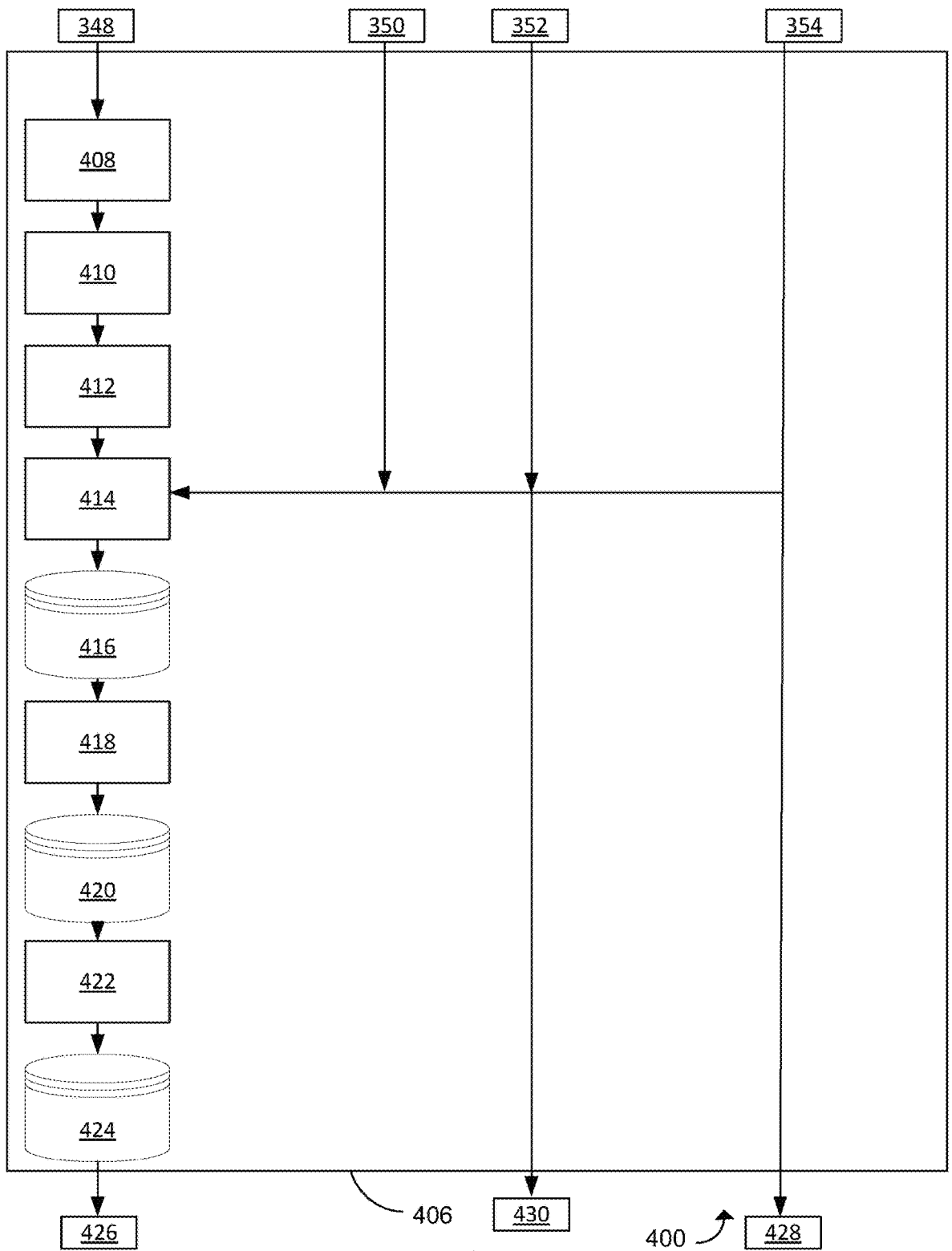
FIG. 4 shows a method diagram for processing vessel data in accordance with one or more embodiments.

Referring next to FIG. 4, there is shown a method 400 for processing vessel data in accordance with one or more embodiments. The method 400 may run at a vessel data processor 406, and may receive vessel tracking data and boundary data 348, vessel data 350, vessel incident data 352, and environmental data 354 from the data ingestion. Vessel incident data 352 may be provided at 430 to the identification engine. Environmental data 354 may be provided at 428 to the vessel identification engine.

At 408, the vessel tracking data 346 is enhanced with boundary data 348. Step 408 may correspond to step 508, and may be described in more detail in FIG. 5. The join operator between the shapefiles and vessel tracking positions may output the corresponding location identification on which each vessel tracking message is being reported in. This information can then be used by later modules for selecting region specific analysis.

The vessel tracking data may be enhanced in order to determine how often a vessel has been inside a particular economic zone, maritime zone, or port. The vessel tracking data may similarly be enhanced to incorporate environmental data collected with the vessel tracking data of a vessel.

This may be performed using the following method.

First, a shapefile (nontopological format for storing geometric location and attribute information of geographic features) is received including geometric location of ports, marine regions, and Exclusive Economic Zones (EEZ). Geographic features in a shapefile can be represented by points, lines, or polygons (areas).

Where environmental data is to be joined, it may be provided in a NetCDF format. NetCDF is a flexible format often used for oceanographic data, as it allows data to be organised into multidimensional structures and can be used to store data from a wide variety of applications, such as satellite data harvested in swathes and model output on a regular two-dimensional grid. Consequently, NetCDF files from different sources may differ in terms of the details of implementation, necessitating different methods for associating these data with vessel tracking data. To avoid this issue, the environmental data sets may be reformatted into a consistent format that would afford rapid collation with vessel tracking data.

For each data set, multiple files may be consolidated and time "bands" may be combined into a single data table for convenience. Packages such as R's data.table may be used to perform rapid joins and require that data are structured in a "tidy" format where columns represent variables and rows represent observations. For this reason, a "tidy" format may be used for vessel tracking data and environmental data. Vessel tracking data may instead be provided in this format and do not require restructuring.

Next, a one-way buffer is determined inland for the EEZ. The buffer may simplify the geometry around the coastline as well as allowing joining of vessel tracking messages that may be on the land boundary.

Next, using the positional information (longitude/latitude) of the vessel tracking data and timestamp of the vessel tracking data and matched to the corresponding environmental data.

Next, a plurality of port points from a plurality of port shapefiles are determined, and buffered.

Next, one or more position points are received and joined with the buffer.

Environmental data may be filtered based on those points within the vessel's longitudinal, latitudinal and temporal ranges (plus a small buffer) to reduce computation time when performing the join.

A non-equi join may then performed to identify the data cell and time interval into which the vessel tracking data message falls. The cell that the vessel tracking message is matched with contains environmental data used to characterize the environmental conditions that took place at the location and time the vessel tracking data message was sent.

Currently, if there is no data available in the environmental data cell, then not-available (NA) may be returned. Nevertheless, the approach is readily extended to take the nearest point in time and space, which would allow for the vessel tracking data to be associated with environmental data in regions where data is sparse.

At 410, one or more vessels may be identified in the vessel tracking data and boundary data. Step 410 may correspond to step 510, and may be described in more detail in FIG. 5. The vessels may be identified using an MMSI number, by detecting and matching a vessel name. This vessel identification, both here and in FIG. 5 may be referred to as "simple identification" and may refer to the identification of the vessel using MMSI information.

At 412, a vessel behavior pattern classification may be performed. Step 412 may correspond to steps 523, 541 and 584, and may be described in more detail in FIG. 5. This may include determining a port visit by joining a vessel tracking data point or segment with a boundary. This enhancement may occur for many segments of a trip for a vessel, for each data point, or for particular portions of the data corresponding to a vessel. This may further include classifying data points based on a vessel movement classification. For example, each data point or segment may be classified as "moving", "port", "anchorage", "hop". The classification of the data points or segments may be used to identify the state of the vessel with respect to its movement. Further, each data point or trip may be classified based on a trip movement classification, including trip stop and go points. For example, stopped or moving. The trip movement classification may be for determining when and where the trip of the vessel starts and ends, including matching the start and the end with the region or port information. For example, the vessel has a very low speed and moves somewhat (approximately ~300 m) then it may be classified as 'at anchor'. Further, if the vessel moved very little (approximately less than ~50 m) then the vessel may be classified as 'berthed'.

In another example, a vessel segment may be classified as a 'hop' which includes small groupings of movement between stop points such as ports. These smaller trip segments ("hops") may be used to segment a vessel trajectory into smaller segments.

The vessel tracking data may be segmented, or grouped, into segments based on a time period, or in an exemplary embodiment the segments may be determined based on the vessel behavior pattern classification.

This segmentation may be based on time periods (for example, each segment may represent one hour of vessel tracking data for a particular vessel).

In an exemplary embodiment, segmentation may be based on movement classification as described herein, for example, a segment may be determined based on one trip point (such as a port) to another trip point (such as another port). Vessel movement classification is described further at 412. The vessel movement classification may further segment trips between ports into smaller segments as required, for example, for a fishing vessel which may take a particular zig-zag pattern while trawling at sea.

The vessel tracking data may be stored as raw vessel tracking data in vessel tracking database 342. The vessel tracking data may be grouped for each vessel into segments, or into individual trips (i.e. port to port). Optionally, each trip may be further segmented into time period segments as described above.

This may include (but is not limited to) determining distance travelled, speed, acceleration, jerk, bearing, and bearing rate.

The individual trip segments may be further augmented by extracting features from the data for each segment including one or more points, known as point features. The point features may include distance travelled, speed, acceleration, jerk, bearing, and bearing rate.

Further, at 412, statistical information about a data point, or a trip segment may be determined as disclosed herein. The statistical information may include average, mean, mode, minimum, maximum values for a data point or segment.

For a segment of vessel tracking data, statistics based on the vessel tracking data points may be determined including maximum, minimum, mean, median, standard deviation, and the 10th, 25th, 75th and 90th percentiles for the vessel tracking reported speed for each vessel and at different ocean regions. The statistics may also be determined for the distance travelled, acceleration, jerk, and bearing rate (or any other determined statistic) in addition to speed.

Steps 414, 416, 418, 420, 422 and 424 may correspond to an anomaly pipeline. More details of anomaly pipelines may be described in FIG. 5. The anomaly pipeline including steps 414, 416, 418, 420, 422, and 424 may include one or more of the anomaly pipelines described in FIG. 5.

At 414, changes in vessel behavior may be determined from the behavior classification in 412, or determined based on other data including vessel data 350, vessel incident data 352, and environmental data 354. The changes in vessel behavior may be described in further detail in each of the pipelines described in FIG. 5. The changes in vessel behavior may be stored in vessel behavior history database 416. The vessel behavior history database 416 may be stored in database 110 (see FIG. 1). For each vessel, changes in behavior may be tracked over time in the vessel behavior history database 416.

The changes in vessel behaviour may augment individual trip segments as point features (as described in 408 above).

For a segment of vessel tracking data, statistics based on the changes in vessel behavior may be determined including maximum, minimum, mean, median, standard deviation, and the 10th, 25th, 75th and 90th percentiles for the vessel tracking reported speed for each vessel and at different ocean regions. The statistics may also be determined for the distance travelled, acceleration, jerk, and bearing rate (or any other determined statistic) in addition to speed.

At 418, a vessel profile including a vessel behavior change frequency distribution may be generated. This may include different frequency distributions for each of several different types of behavior changes, for example, trip movement changes.

At 420, the vessel profile including a vessel behavior change frequency distribution may be stored in the vessel profile database 420. The vessel profile database 420 may be provided at database 110 (See FIG. 1).

At 422, vessel behavior change outlier detection may be performed in order to determine or detect outlier values in the vessel behavior change history, including abnormal behavior event and anomalies. The outlier detection 422 may store abnormal events identified by the outlier detection in vessel behavior abnormal behavior history database 424.

The vessel behavior abnormal behavior history database 424 may record abnormal events detected using outlier detection. The abnormal behavior history may include outliers detected based upon a change in the frequency of abnormal events detected from the vessel tracking. The vessel behavior abnormal behavior history database 424 may be provided by database 110 (see FIG. 1). The vessel behavior abnormal behavior history database 424 may provide abnormal behavior history data 426 to the vessel identification engine.

Figure 5:
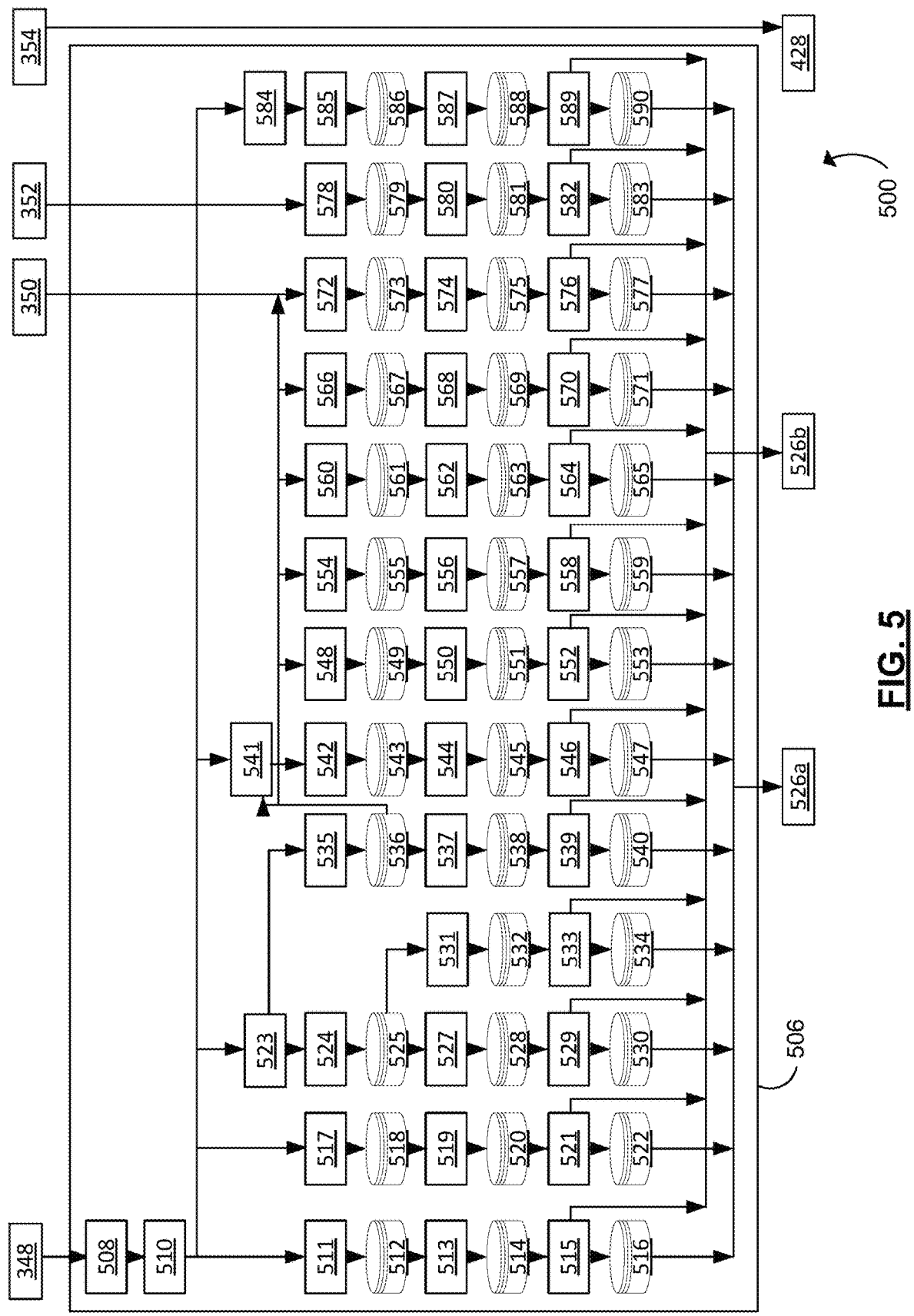
FIG. 5 shows an alternate method diagram for processing vessel data in accordance with one or more embodiments.

Referring next to FIG. 5, there is shown an alternate method 500 for processing vessel data in accordance with one or more embodiments.

The method 500 may run at a vessel data processor 506, and may receive vessel tracking data and boundary data 348, vessel data 350, and vessel incident data 352, and environmental data 354 from the data ingestion (in this embodiment, environmental data 354 may be passed through to the vessel identification engine at 428). Vessel incident data 352 may be provided at 430 to the vessel identification engine. Environmental data 354 may be provided at 428 to the vessel identification engine.

The method 500 may run as the vessel data processor 506 receives data in real-time, including identifying anomaly events. In this manner, the determination of vessel profiles may be performed independently of the real-time data processing as vessel data is received.

In an alternate embodiment, the vessel data processor 506 may run in order to process a set of historical data and to prepare a plurality of vessel profiles.

In another alternate embodiment, as real-time data is received at the vessel data processor 506, the real-time anomaly detection is performed, and the vessel profiles are updated at the same time.

At 508, the vessel tracking data and boundary data 348 is enhanced. The vessel tracking data enhancement is discussed in more detail in FIG. 15. This enhancement may occur for each data point, or for particular portions of the data corresponding to a vessel. The join operator between the shapefiles and vessel tracking positions may output the corresponding location identification on which each vessel tracking message is being reported in. This information can then be used by later modules for selecting region specific analysis. The data enhancement including the location identification may identify whether a particular vessel tracking data point or segment is within a particular boundary defined by the boundary data.

The vessel tracking data may be enhanced in order to determine how often a vessel has been inside a particular economic zone, maritime zone, or port. The vessel tracking data may similarly be enhanced to incorporate environmental data collected with the vessel tracking data of a vessel.

This may be performed using the following method.

First, a shapefile (nontopological format for storing geometric location and attribute information of geographic features) is received including geometric location of ports, marine regions, and Exclusive Economic Zones (EEZ). Geographic features in a shapefile can be represented by points, lines, or polygons (areas).

Where environmental data is to be joined, it may be provided in a NetCDF format. NetCDF is a flexible format often used for oceanographic data, as it allows data to be organised into multidimensional structures and can be used to store data from a wide variety of applications, such as satellite data harvested in swathes and model output on a regular two-dimensional grid. Consequently, NetCDF files from different sources may differ in terms of the details of implementation, necessitating different methods for associating these data with vessel tracking data. To avoid this issue, the environmental data sets may be reformatted into a consistent format that would afford rapid collation with vessel tracking data.

For each data set, multiple files may be consolidated and time "bands" may be combined into a single data table for convenience. Packages such as R's data.table may be used to perform rapid joins and require that data are structured in a "tidy" format where columns represent variables and rows represent observations. For this reason, a "tidy" format may be used for vessel tracking data and environmental data. Vessel tracking data may instead be provided in this format and do not require restructuring.

Next, a one-way buffer is determined inland for the EEZ. The buffer may simplify the geometry around the coastline as well as allowing joining of vessel tracking messages that may be on the land boundary.

Next, using the positional information (longitude/latitude) of the vessel tracking data and timestamp of the vessel tracking data and matched to the corresponding environmental data.

Next, a plurality of port points from a plurality of port shapefiles are determined, and buffered.

Next, one or more position points are received and joined with the buffer.

Environmental data may be filtered based on those points within the vessel's longitudinal, latitudinal and temporal ranges (plus a small buffer) to reduce computation time when performing the join.

A non-equi join may then performed to identify the data cell and time interval into which the vessel tracking data message falls. The cell that the vessel tracking message is matched with contains environmental data used to characterize the environmental conditions that took place at the location and time the vessel tracking data message was sent.

Currently, if there is no data available in the environmental data cell, then not-available (NA) may be returned. Nevertheless, the approach is readily extended to take the nearest point in time and space, which would allow for the vessel tracking data to be associated with environmental data in regions where data is sparse.

At 510, one or more vessels may be identified in the vessel tracking data and boundary data. This may be referred to as "simple identification" and may correspond to an identification of the MMSI identifiers associated with the data. The MMSI number may be determined, or a vessel name may be detected or matched, or by another means of identification as is known. The identification may include assigning a unique vessel identifier to data points or segments, creating a unique vessel identifier to assign to the data points or segments, or updating an existing unique vessel identifier for the data points of segments.

The method 500 describes a plurality of anomalies that may be determined from the data at the vessel data processor 506. This may be performed by transforming the vessel tracking data and boundary data 348, vessel data 350, and vessel incident data 352 to identify a parameter value for each point or segment of the vessel tracking and boundary data provided at 510. A vessel profile corresponding to the parameter may be provided (in the case where it is pre-generated) or generated. An anomaly, (also referred to herein as an abnormal behavior event) may be determined using the data at the vessel data processor 506 and the vessel profiles. The determined abnormal events for each parameter may have a frequency of occurrence for the trip, or the segment which may be determined. Other statistical operations besides determining the frequency may be used, including find an average count, a minimum count, a maximum count of the occurrences of the abnormal event. Other statistical operations may be used as known. The determined frequencies of occurrence may be used in order to determine abnormal events in the segments, and a history of the abnormal events may be stored for each vessel. Examples of a variety of different abnormal event determination methods will now be described as part of the vessel data processor.

Vessel MMSI Anomalies

The vessel MMSI anomaly pipeline is described in FIG. 5, and includes steps 511, 512, 513, 514, 515 and 516.

A Maritime Mobile Service Identity (MMSI) may be an identifier such as a series of nine digits which are sent in digital form over a radio frequency channel in order to identify ship stations, ship earth stations, coast stations, coast earth stations, and group calls. These identities may be formed in such a way that the identity or part thereof can be used by telephone and telex subscribers connected to the general telecommunications network to call ships automatically.

The MMSIs may be provided by a national organization. For example, in the United States, the National Telecommunications Administration (NTIA) provides MMSIs to federal users, and the Federal Communication Commission (FCC) provides MMSIs to everyone else. In Canada, Innovation, Science and Economic Development Canada (ISED) may provide MMSIs.

As part of a vessel tracking transmission, a vessel may include an MMSI identifier. The MMSI identifier for a vessel tracking transceiver may change, for example if the vessel tracking transceiver or vessel is sold. Alternatively, an MMSI identifier may be changed by a nefarious vessel operator in order to hide illegal or risky activities.

As described above, at 510 a unique vessel identifier based on the MMSI information may be assigned to a vessel.

At 511, a vessel tracking MMSI identifier may be identified for the one or more data points received from 510. The MMSI may be decoded from the vessel tracking data based on Recommendation M.585 "Assignment and use of identities in the maritime mobile service" published by the International Telecommunication Union (ITU). The MMSI change may be for legitimate reasons or the MMSI change may be to conceal the true identity of the vessel.

The decoding of MMSI may include determining a series of nine digits. The decoding of MMSI may include determining a ship station identity, a group ship station identity, a coast station identity, a group coast station identity, a Search and Rescue (SAR) aircraft, and navigational aids and craft associated with a parent ship.

The data points corresponding to each vessel identified by the unique vessel identifier determined at 510 may have an MMSI identifier identified in the data received from 510.

The decoded MMSI for each data point for a vessel may be stored in a MMSI history database 512, such that a vessel MMSI history is determined. The MMSI history database 512 may be provided by database 110 (see FIG. 1). The MMSI history in vessel history database 512 may be associated with the unique vessel identifier.

At 513, a vessel MMSI behavior profile may be generated based on the vessel MMSI history received from MMSI history database 512. The profile may be a statistical model, such as a distribution related to the changing of MMSI identifier. The profile may include statistics such as the maximum, minimum, mean, median, standard deviation, and the 10th, 25th, 75th and 90th percentiles for the MMSI changes for each vessel. The profile may further include an upper limit, lower limit, upper quartile and lower quartile related to the MMSI identifier. The vessel profile may include upper limit, lower limit, upper quartile and lower quartile related to changes of the MMSI identifier, for example, an upper limit threshold may be 2 changes of the MMSI identifier for a vessel and the lower limit threshold may be 0 changes of the MMSI identifier for a vessel. MMSI changes may occur often (e.g. seasonally) for some vessels in order to comply with shipping regulations. The MMSI behavior profile may capture the expected number of changes for a vessel. Using the profile, if a vessel MMSI is changing more or less often than expected, then that may be determined as a MMSI anomaly. The percentiles indicated above may help to define a "normal" range of MMSI changes per vessel.

For example, the vessel MMSI behavior profile may define an expected number of MMSI changes calculated using the equation:

$$\text{Expected MMSI changes} = \left[(2*\text{Interquartile range } (IQR)^6) + 75\text{th Percentile}\right]$$

The determined vessel MMSI behavior profile may be stored in vessel MMSI profile database 514. The vessel MMSI profile database 514 may be provided by database 110 (see FIG. 1). The MMSI behavior profile in vessel MMSI profile database 514 may be associated with the unique vessel identifier.

At 515, MMSI anomaly (or abnormal behavior event) detection may be performed. The MMSI anomaly detection may compare the MMSI history from MMSI history database 512 for a vessel against the determined vessel profile from vessel MMSI profile database 514. This may involve, for example, comparing one or more data points from a vessel to the lower MMSI change limit, the upper MMSI change limit. This may further involve determining whether the number of MMSI changes falls within a lower quartile and an upper quartile. Outlier detection may be used in order to identify anomaly events within the one or more segments of a vessel in the MMSI history.

The anomaly events may be identified and stored in MMSI anomaly detection history database 516. The MMSI anomaly detection history database 516 may be provided by database 110 (see FIG. 1). The MMSI anomaly history in MMSI anomaly detection history database 516 may be associated with the unique vessel identifier.

Vessel Name Anomalies

The vessel name anomaly pipeline is described in FIG. 5, and includes steps 517, 518, 519, 520, 521 and 522.

Vessel names may be changed by a vessel operator. The name change may be for legitimate reasons or the name change may to conceal the true identity of the vessel. Vessel tracking transmissions may include the vessel name.

As described above, at 510 a unique vessel identifier based on the unique vessel signature may be assigned to a vessel.

At 517, a vessel name may be identified or decoded from the one or more data points received from 510. The vessel name may be decoded from the vessel tracking data in the one or more segments.

The identified vessel name from the one or more data points may be stored in a vessel name history database 518. The vessel name history database may be provided by database 110 (see FIG. 1). The vessel name history in vessel name history database 518 may be associated with the unique vessel identifier.

At 519, a vessel name behavior profile may be generated based on the vessel name history received from vessel name history database 518. The profile may be a statistical model, such as a distribution related to the changing of vessel name. The profile may further include an upper limit, lower limit, upper quartile and lower quartile related to the vessel name. The profile may include statistics such as the maximum, minimum, mean, median, standard deviation, and the 10th, 25th, 75th and 90th percentiles for the vessel name changes for each vessel and at different ocean regions. The vessel profile may include upper limit, lower limit, upper quartile and lower quartile related to changes to the vessel name, for example, a upper limit threshold may be 2 changes of the vessel name and the lower limit threshold may be 0 changes of the vessel name.

For example, the vessel name behavior profile may define an expected number of vessel name changes calculated using the equation:

$$\text{Expected name changes} = \left[(2*\text{Interquartile range } (IQR)^6) + 75\text{th Percentile}\right]$$

The determined vessel name behavior profile may be stored in vessel name profile database 520. The vessel name profile database 520 may be provided by database 110 (see FIG. 1). The name behavior profile in vessel name profile database 520 may be associated with the unique vessel identifier.

At 521, vessel name anomaly (or abnormal behavior event) detection may be performed. The vessel name anomaly detection may compare the vessel name history from vessel name history database 518 for a vessel against the determined vessel profile from vessel name profile database 520. This may involve, for example, comparing one or more data points from a vessel to the lower name change limit, the upper name change limit. This may further involve determining whether the number of name changes falls within a lower quartile and an upper quartile. Outlier detection may be used in order to identify anomaly events within the one or more segments of a vessel in the vessel name history.

The anomaly events may be identified and stored in vessel name anomaly history database 522. The vessel name anomaly history database 522 may be provided by database 110 (see FIG. 1). The vessel name anomaly history in vessel name anomaly history database 522 may be associated with the unique vessel identifier.

Port Visit Anomalies

The port visit anomaly pipeline is described in FIG. 5, and includes steps 524, 525, 527, 528, 529 and 530. Additionally, the vessel visit duration anomaly pipeline is described in FIG. 5 and include steps 531, 532, 533, and 534.

Vessel movement anomalies can include anomalies based on destination and visit duration.

As described above, at 510 a unique vessel identifier based on the unique vessel signature may be assigned to a vessel.

At 523, data points are classified. The classification can include classification into "moving", "port", "anchorage", and "hop". The classification may assigns labels to the data points. The classification may be implemented using a finite state machine. The vessel tracking data may include positional information (latitude, longitude) which may be used to generate inferred states of the vessel (i.e. that the vessel is either in a static or transition state). For a grouping of vessel tracking data (i.e. a segment) to be considered static, a plurality of vessel tracking data showing the vessel position remaining within a small squared area is required. Once the vessel tracking data has been labelled as static or transition the inferred states may be further labelled based on the probability of switching between a static and transition state. This may permit further vessel movement classification states such as 'anchor', 'port', 'hop', and 'moving'. From these states a hop may be a small distance transition that takes place in between two static groups of messages. This may include identifying several sequential data points corresponding to movement during a vessel trip, i.e. "moving" classification where the vessel is underway between its origin and its destination. The "moving" classification may be based on the location of the vessel and its speed, which may be decoded from the vessel tracking data in the one or more segments. Port classifications may be determined by identifying sequential data points corresponding to the vessel arriving at and sitting docked in port, i.e. the "port" class. Anchorage classifications may be made by identifying sequential data points corresponding to the vessel parked in anchorage, i.e. the "anchorage" class, where the vessel is anchored. Hop classifications may be a short port visit between the port of origin and the final destination port or anchorage.

At 524, a port visit may be identified or detected from the one or more segments received from 523. This may involve determining from the one or more segments, the location of the port, the duration of the stay, and other relevant data based on the vessel's stay at the port. A port visit is characterized by the final destination port of a vessel trip.

The identified port visits from the one or more segments may be stored in a vessel visit history database 525. The vessel visit history database may be provided by database 110 (see FIG. 1). The vessel visit history in vessel visit history database 525 may be associated with the unique vessel identifier.

At 527, a vessel destination behavior profile may be generated based on the vessel visit history received from vessel visit history database 525. The profile may be a statistical model, such as a distribution related to the number of destinations the vessel visits. The profile may include statistics such as the maximum, minimum, mean, median, standard deviation, and the 10th, 25th, 75th and 90th percentiles for vessel destinations (i.e. how frequently the destination changes) for each vessel and at different ocean regions. The profile may further include an upper limit, lower limit, upper quartile and lower quartile related to the vessel destinations. The vessel profile may include upper limit, lower limit, upper quartile and lower quartile related to changes to the vessel destinations, for example, an upper limit threshold may be 8 visits to a particular destination and the lower limit threshold may be 1 visit to the particular destination. For example, a vessel visits the port of Vancouver every month. If there is a change of this destination visit frequency, an anomaly may be determined. The vessel profile may be determined for a vessel, a type of vessel, for a geographic zone, or a combination thereof.

For example, the vessel destination behavior profile may define an expected number of visits to a destination calculated using the equation:

$$\text{Expected visits} = \left[(2*\text{Interquartile range } (IQR)^6) + 75\text{th Percentile}\right.$$

The determined vessel destination behavior profile may be stored in vessel destination profile database 528. The vessel destination profile database 528 may be provided by database 110 (see FIG. 1). The destination behavior profile in vessel destination profile database 528 may be associated with the unique vessel identifier.

At 529, vessel destination anomaly (or abnormal behavior event) detection may be performed. The vessel destination anomaly detection may compare the vessel visit history from vessel visit history database 525 for a vessel against the determined vessel profile from vessel destination profile database 528. This may involve, for example, comparing one or more segments from a vessel to the lower destination visit limit, the upper destination visit limit. This may further involve determining whether the number (or the change in the number) of visits to a destination falls within a lower quartile and an upper quartile. Outlier detection may be used in order to identify destination anomaly events within the one or more segments of a vessel in the vessel visit history. The vessel profile may define statistics based on the number of visits by the vessel to a particular destination.

The anomaly events may be identified and stored in vessel destination anomaly history database 530. The vessel destination anomaly history database 530 may be provided by database 110 (see FIG. 1). The vessel destination anomaly history in vessel destination anomaly history database 530 may be associated with the unique vessel identifier.

At 531, a vessel visit duration behavior profile may be generated based on the vessel visit history received from vessel visit history database 525. The profile may be a statistical model, such as a distribution related to the length of a visit by the vessel. The profile may include statistics such as the maximum, minimum, mean, median, standard deviation, and the 10th, 25th, 75th and 90th percentiles for the visit duration for each vessel and at different ocean regions. The profile may further include an upper limit, lower limit, upper quartile and lower quartile related to the vessel visit duration. The vessel profile may include upper limit, lower limit, upper quartile and lower quartile related to the length of vessel visit, for example, a upper limit threshold may be 31 days in visit length, and the lower limit threshold may be 3 days in visit length. The vessel visit duration profile may include a tolerance of, for example 1-2 days. The vessel profile may be determined for a vessel, a type of vessel, for a geographic zone, or a combination thereof.

The determined vessel visit duration behavior profile may be stored in vessel visit duration profile database 532. The vessel visit duration profile database 532 may be provided by database 110 (see FIG. 1). The vessel visit duration behavior profile in vessel visit duration profile database 532 may be associated with the unique vessel identifier.

For example, the vessel visit behavior profile may define an expected number of vessel trip visit duration changes calculated using the equation:

Expected trip visit
$$\text{duration} = [(2*\text{Interquartile range } (IQR)^6) + 75\text{th Percentile}]$$

At 533, vessel visit duration anomaly (or abnormal behavior event) detection may be performed. The vessel visit duration anomaly detection may compare the vessel visit history from vessel visit history database 525 for a vessel against the determined vessel profile from vessel visit duration profile database 532. This may involve, for example, comparing one or more segments from a vessel to the lower visit duration limit, the upper visit duration limit. This may further involve determining whether the length of visit falls within a lower quartile and an upper quartile. While the examples above use a number of days as the determination of visit length, another unit of time including minutes, hours, weeks, months, etc. may be used instead. Outlier detection may be used in order to identify visit duration anomaly events within the one or more segments of a vessel in the vessel visit history. The vessel profile may define statistics based on the average visit length for visits at a destination by the vessel. The vessel profile may describe visit duration for port visits or anchorage visits, either separately or in combination.

The anomaly events may be identified and stored in vessel visit duration anomaly history database 534. The vessel visit duration anomaly history database 534 may be provided by database 110 (see FIG. 1). The vessel visit duration anomaly history in vessel visit duration anomaly history database 534 may be associated with the unique vessel identifier.

Vessel Trip Anomalies

The vessel trip anomaly pipeline is described in FIG. 5, and includes steps 535, 536, 537, 538, 539 and 540.

Vessel trips may be determined based on the received vessel movement classifications from 523 of the vessel segments. Vessel trips may include a starting location, a destination location (including a port or anchorage), and one or more segments between the starting location and the destination location.

As described above, at 510 a unique vessel identifier based on the unique vessel signature may be assigned to a vessel.

At 535, a vessel trip may be identified or detected from the one or more segments received from 523. This may involve determining from the one or more segments, the location of the port of origin, the duration of the trip, the location of the destination port or anchorage, and other relevant data based on the vessel's time at sea.

Based on the data points classification of 523, the vessel trajectories may be segmented into trips at 535. Trips are a set of data points that are in-between two point classified as port.

The identified vessel trip from the one or more segments may be stored in a vessel trip history database 536. The vessel trip history database may be provided by database 110 (see FIG. 1). The vessel trip history in vessel trip history database 536 may be associated with the unique vessel identifier.

At 537, a vessel trip duration behavior profile may be generated based on the vessel trip history received from vessel trip history database 536. The profile may be a statistical model, such as a distribution related to the length of a trip by the vessel. The profile may further include an upper limit, lower limit, upper quartile and lower quartile related to the vessel trip duration. The profile may include statistics such as the maximum, minimum, mean, median, standard deviation, and the 10th, 25th, 75th and 90th percentiles for the trip duration for each vessel and at different ocean regions. The vessel profile may include upper limit, lower limit, upper quartile and lower quartile related to the length of vessel trip, for example, a upper limit threshold may be 100 days in trip length, and the lower limit threshold may be 5 days in trip length The vessel profile may be determined for a particular vessel, a type of vessel, for a geographic zone, or a combination thereof.

For example, the vessel trip duration profile may define an expected trip duration calculated using the equation:

$$\text{Expected duration} = [(2*\text{Interquartile range } (IQR)^6) + 75\text{th Percentile}]$$

The determined vessel trip duration behavior profile may be stored in vessel trip duration profile database 538. The vessel trip duration profile database 538 may be provided by database 110 (see FIG. 1). The vessel trip duration behavior profile in vessel trip duration profile database 538 may be associated with the unique vessel identifier.

At 539, vessel trip duration anomaly (or abnormal behavior event) detection may be performed. The vessel trip duration anomaly detection may compare the vessel trip history from vessel trip history database 536 for a vessel against the determined vessel profile from vessel trip duration profile database 538. This may involve, for example, comparing one or more segments from a vessel to the lower trip duration limit, the upper trip duration limit. This may further involve determining whether the length of trip falls within a lower quartile and an upper quartile. While the examples above use a number of days as the determination of trip length, another unit of time including minutes, hours, weeks, months, etc. may be used instead. Outlier detection may be used in order to identify trip duration anomaly events within the one or more segments of a vessel in the vessel trip history. The vessel profile may define statistics based on the upper and lower limit of trip length for trips at sea by the vessel.

The anomaly events may be identified and stored in vessel trip duration anomaly history database 540. The vessel trip duration anomaly history database 540 may be provided by database 110 (see FIG. 1). The vessel trip duration anomaly history in vessel trip duration anomaly history database 540 may be associated with the unique vessel identifier.

Vessel Trip Movement State Anomalies

The vessel trip movement state anomaly pipeline is described in FIG. 5, and includes steps 542, 543, 544, 545, 546 and 547.

Vessel movement anomalies may include anomalies based on the vessel's movement state i.e., stop and moving.

As described above, at 510 a unique vessel identifier based on the unique vessel signature may be assigned to a vessel.

At 541, enhanced vessel tracking data including region boundaries is received from 508, including unique vessel identifiers from 510, in addition to vessel trip history from 536 and trip movement classification is performed. The trip movement state classification may identify or detect one or more segments belonging to a particular trip of a vessel. Individual classifications of segments within the trip may include, for example, "stopped" and "moving". The trip movement state classification may add a label to each data point. For example, when the speed is below a threshold (or based on another constraints), the vessel may have stopped in the middle of a trip. In an alternate example, a fishing vessel may have a lot of stop and go(s) changes to dispatch nets or collect catch. In another alternate example, a cargo vessel has a low threshold for stop and go changes during a trip, and even a very small change may result in a detected anomaly.

Trips identified at 535 may be segmented into smaller segments that represent "moving" points connected "hops" and "anchorage" points.

At 542, trip stop and go points are detected. This may include points within one or more segments where a vessel stopped, or where a vessel began moving again.

The identified vessel stop and go points from the one or more segments may be stored in a vessel trip movement history database 543. The vessel movement history database may be provided by database 110 (see FIG. 1). The vessel movement history in vessel movement history database 543 may be associated with the unique vessel identifier.

At 544 a vessel movement behavior profile may be generated. The profile may be a statistical model, such as a distribution related to determined values of the movement along a trip by the vessel. The profile may include statistics such as the maximum, minimum, mean, median, standard deviation, and the 10th, 25th, 75th and 90th percentiles for the vessel state change frequency for each vessel and at different ocean regions. The profile may further include an upper limit, lower limit, upper quartile and lower quartile related to the vessel movements during a trip. The vessel profile may include upper limit, lower limit, upper quartile and lower quartile related to the vessel movements, for example, a upper limit threshold may be 3 stops during a trip, and the lower limit threshold may be 0 stops during a trip. The vessel profile may be determined for a vessel, a type of vessel, for a geographic zone, or a combination thereof.

For example, the vessel movement behavior profile may define an expected number of stops during a trip calculated using the equation:

$$\text{Expected stops} = \left[(2 * \text{Interquartile range } (IQR)^6) + 75\text{th Percentile}\right]$$

The determined vessel movement behavior profile may be stored in vessel movement profile database 545. The vessel movement profile database 545 may be provided by database 110 (see FIG. 1). The vessel movement behavior profile in vessel movement profile database 545 may be associated with the unique vessel identifier.

At 546, vessel movement anomaly (or abnormal behavior event) detection may be performed. The vessel movement anomaly detection may compare the vessel movement history from vessel movement history database 543 for a vessel against the determined vessel profile from vessel movement profile database 545. This may involve, for example, comparing the number of state changes in the one or more segments from a vessel to the lower and upper limit of trip state changes. The vessel movement anomalies may be identified for a trip if a vessel has more stops, hops, or other movement state changes than expected by the vessel profile.

The anomaly events may be identified and stored in vessel movement anomaly history database 547. The vessel movement anomaly history database 547 may be provided by database 110 (see FIG. 1). The vessel movement anomaly history in vessel movement anomaly history database 547 may be associated with the unique vessel identifier.

Vessel Speed Anomalies

The vessel speed anomaly pipeline is described in FIG. 5, and includes steps 548, 549, 550, 551, 552 and 553.

Vessel speed anomalies may be determined based on the reported speed information from the vessel tracking data. This may be, for example, where a vessel is travelling at a different speed that is outside their normal speed profile.

As described above, at 510 a unique vessel identifier based on the unique vessel signature may be assigned to a vessel.

At 548, a vessel speed may be identified or decoded from the one or more segments. The vessel speed may be decoded from the vessel tracking data in the one or more segments. The vessel speed determined for the one or more segments may be speed through the water, speed over ground, speed made good, or another speed value of the vessel. Speed may be determined based on the vessel tracking data (i.e. the vessel may transmit their speed), or may alternatively be determined using dead reckoning based on position.

The identified vessel speed from the one or more segments may be stored in a vessel speed history database 549. The vessel speed history database may be provided by database 110 (see FIG. 1). The vessel speed history in vessel speed history database 549 may be associated with the unique vessel identifier.

At 550, a vessel speed behavior profile may be generated based on the vessel speed history received from vessel speed history database 549. The profile may be a statistical model, such as a distribution related to the vessel speed. The profile may include statistics such as the maximum, minimum, mean, median, standard deviation, and the 10th, 25th, 75th and 90th percentiles for the vessel speed for each vessel and at different ocean regions. The profile may further include an upper limit, lower limit, upper quartile and lower quartile related to the vessel speed. The vessel profile may include upper limit, lower limit, upper quartile and lower quartile related to the vessel speed, for example, an upper limit threshold may be 20 knots and the lower limit threshold may be 2 knots. The upper limit, lower limit, upper quartile, and lower quartile may be in knots, km/hr, mph, or another speed unit as known. The vessel profile may be determined for a vessel, a type of vessel, for a geographic zone, or a combination thereof.

For example, the vessel speed profile may define an expected speed in each region is calculated by using the equation:

$$\text{Expected speed} = \left[(2*\text{Interquartile range } (IQR)^6) + 75\text{th Percentile}\right]$$

The determined vessel speed behavior profile may be stored in vessel speed profile database 551. The vessel speed profile database 551 may be provided by database 110 (see FIG. 1). The vessel speed behavior profile in vessel speed profile database 551 may be associated with the unique vessel identifier.

At 552, vessel speed anomaly (or abnormal behavior event) detection may be performed. The vessel speed anomaly detection may compare the vessel speed history from vessel speed history database 549 for a vessel against the determined vessel profile from vessel speed profile database 551. This may involve, for example, comparing the speed from one or more segments from a vessel to the lower speed limit, the upper speed limit. This may further involve determining whether the speed falls within a lower quartile and an upper quartile. Outlier detection may be used in order to identify anomaly events within the one or more segments of a vessel in the vessel speed history.

The anomaly events may be identified and stored in vessel speed anomaly history database 553. The vessel speed anomaly history database 553 may be provided by database 110 (see FIG. 1). The vessel speed anomaly history in vessel speed anomaly history database 553 may be associated with the unique vessel identifier.

Vessel Tracking Transmission Anomalies

The vessel tracking anomaly pipeline is described in FIG. 5, and includes steps 554, 555, 556, 557, 558 and 559.

Vessel tracking transmissions anomalies may be determined based on the reported vessel tracking data transmissions. This may be, for example, where a vessel is reporting vessel tracking data at a different rate, or where there are gaps in the transmissions of vessel tracking data from a vessel.

As described above, at 510 a unique vessel identifier based on the unique vessel signature may be assigned to a vessel.

At 554, vessel tracking transmissions may be identified or decoded from the one or more segments. The vessel tracking transmissions may be decoded from the vessel tracking data in the one or more segments, and may represent transmissions by a vessel tracking transceiver aboard a vessel.

The identified vessel tracking transmissions from the one or more segments may be stored in a vessel tracking transmissions history database 555. The vessel tracking transmissions history database may be provided by database 110 (see FIG. 1). The vessel tracking transmissions history in vessel tracking transmissions history database 555 may be associated with the unique vessel identifier.

At 556, a vessel tracking transmissions behavior profile may be generated based on the vessel tracking transmissions history received from vessel tracking transmissions history database 555. The profile may be a statistical model, such as a distribution related to the presence, absence, or frequency of vessel tracking transmissions. The profile may include statistics such as the maximum, minimum, mean, median, standard deviation, and the 10th, 25th, 75th and 90th percentiles for the vessel tracking transmissions for each vessel and at different ocean regions. The profile may further include an upper limit, lower limit, upper quartile and lower quartile related to the vessel tracking transmissions. The vessel profile may include upper limit, lower limit, upper quartile and lower quartile related to the vessel tracking transmissions, for example, an upper limit threshold may be 1 transmission per minute and the lower limit threshold may be 1 transmission per hour. The upper limit, lower limit, upper quartile, and lower quartile may be in transmissions per hour, transmissions per minute, Hertz, or another unit as known. The vessel profile may be determined for a vessel, a type of vessel, for a geographic zone, or a combination thereof.

For example, the vessel tracking transmissions behavior profile may define an expected number of transmissions calculated using the equation:

$$\text{Expected transmissions} = \left[(2*\text{Interquartile range } (IQR)^6) + 75\text{th Percentile}\right]$$

The determined vessel tracking transmissions behavior profile may be stored in vessel tracking transmissions profile database 557. The vessel tracking transmissions profile database 557 may be provided by database 110 (see FIG. 1). The tracking transmissions behavior profile in vessel tracking transmissions profile database 557 may be associated with the unique vessel identifier.

At 558, vessel tracking transmissions anomaly (or abnormal behavior event) detection may be performed. The vessel tracking transmissions anomaly detection may compare the vessel tracking transmissions history from vessel tracking transmissions history database 555 for a vessel against the determined vessel profile from vessel tracking transmissions profile database 557. This may involve, for example, comparing the vessel tracking transmission frequency from one or more segments from a vessel to the lower tracking transmissions limit, the upper tracking transmissions limit. This may further involve determining whether the tracking transmissions frequency falls within a lower quartile and an upper quartile. Outlier detection may be used in order to identify anomaly events within the one or more segments of a vessel in the vessel tracking transmissions history.

Vessel tracking transmission anomalies may depend on region and may change. The anomalies may be determined based upon a statistical analysis of the vessel tracking data to determine outliers. These anomalies may include whether vessel tracking data has been sent throughout a vessel's trip. Other parameters may be used in order to determine vessel tracking transmission anomalies, including how long the vessel has been known (20 years, 6 months, etc.), vessel identifiers, the age of the vessel, and other anomalous behaviors as compared to the region. For example, for a given vessel, the vessel tracking data could represent a new vessel, or a bad actor manipulating the signal and changing the vessel tracking identifier.

The anomaly events may be identified and stored in vessel tracking transmissions anomaly history database 559. The vessel tracking transmissions anomaly history database 559 may be provided by database 110 (see FIG. 1). The vessel tracking transmissions anomaly history in vessel tracking transmissions anomaly history database 559 may be associated with the unique vessel identifier.

Vessel Tracking Accordance Anomalies

The vessel tracking accordance anomaly pipeline is described in FIG. 5, and includes steps 560, 561, 562, 563, 564 and 565.

Vessel tracking accordance anomalies may be determined based on the reported position feasibility of the vessel. This may be, for example, where a vessel is reporting vessel position at an expected location as it was expected given its past trajectory. These position data points that are not in accordance with the vessel past trajectory may be referred to as glitches. For example, for a give vessel it may be determined that it would be impossible that the vessel would achieve the reported location given the speed and distance navigated. Glitches including positional points that are incorrect, may be caused intentionally or unintentionally by the vessel or a by a vessel tracking transmission problem. Glitches may be more frequent in some geographical regions than others.

As described above, at 510 a unique vessel identifier based on the unique vessel signature may be assigned to a vessel.

At 560, vessel tracking accordance may be identified or decoded from the one or more segments. The vessel tracking accordance may be decoded from the vessel tracking data in the one or more segments, and may represent accordance by a vessel tracking transceiver aboard a vessel.

The identified vessel tracking accordance from the one or more segments may be stored in a vessel tracking accordance history database 561. The vessel tracking accordance history database may be provided by database 110 (see FIG. 1). The vessel tracking accordance history in vessel tracking accordance history database 561 may be associated with the unique vessel identifier.

At 562, a vessel tracking accordance behavior profile may be generated based on the vessel tracking accordance history received from vessel tracking accordance history database 561. The profile may be a statistical model, such as a distribution related to the level of vessel tracking accordance. The profile may include statistics such as the maximum, minimum, mean, median, standard deviation, and the 10th, 25th, 75th and 90th percentiles for the vessel tracking accordance for each vessel and at different ocean regions. The profile may further include an upper limit, lower limit, upper quartile and lower quartile related to the vessel tracking accordance. The vessel profile may include upper limit, lower limit, upper quartile and lower quartile related to the vessel tracking accordance, for example, a upper limit threshold may be a 5 gliches per trip and the lower limit threshold may be 0. The upper limit, lower limit, upper quartile, and lower quartile may be accordance values such as predetermined levels of position accuracy. The vessel profile may be determined for a vessel, a type of vessel, for a geographic zone, or a combination thereof.

For example, the vessel tracking accordance behavior profile may define an expected number of transmission glitches during a trip calculated using the equation:

$$\text{Expected glitches} = \left[(2 * \text{Interquartile range } (IQR)^6) + 75\text{th Percentile}\right.$$

The determined vessel tracking accordance behavior profile may be stored in vessel tracking accordance profile database 563. The vessel tracking accordance profile database 563 may be provided by database 110 (see FIG. 1). The vessel tracking accordance behavior profile in vessel tracking accordance profile database 563 may be associated with the unique vessel identifier.

At 564, vessel tracking accordance anomaly (or abnormal behavior event) detection may be performed. The vessel tracking accordance anomaly detection may compare the vessel tracking accordance history from vessel tracking accordance history database 561 for a vessel against the determined vessel profile from vessel tracking accordance profile database 563. This may involve, for example, comparing the number of glitches from one or more segments from a vessel to the lower tracking accordance limit, the upper tracking accordance limit. This may further involve determining whether the tracking accordance falls within a lower quartile and an upper quartile. Outlier detection may be used in order to identify anomaly events within the one or more segments of a vessel in the vessel tracking accordance history.

The anomaly events may be identified and stored in vessel tracking accordance anomaly history database 565. The vessel tracking accordance anomaly history database 565 may be provided by database 110 (see FIG. 1). The vessel tracking accordance anomaly history in vessel tracking accordance anomaly history database 565 may be associated with the unique vessel identifier.

Vessel Sea Route Anomalies

The vessel sea route anomaly pipeline is described in FIG. 5, and includes steps 566, 567, 568, 569, 570 and 571.

Vessel sea route deviation anomalies may be determined based on the (geographic boundaries of) route the vessel is taking as compared with historical routes. This may be, for example, where a vessel significantly departs from a particular sea route used in the vessel trip history 536 between an origin and a destination. The deviation may be based on a geographical distance, or the selected sea route as described geographical boundaries. For example, if the vessel changes from using a "main" route to a "non-main" route from an origin port to a destination port, such a change may trigger an anomaly if it deviates from the expectation.

As described above, at 510 a unique vessel identifier based on the unique vessel signature may be assigned to a vessel.

At 566, vessel sea route may be identified or decoded from the one or more segments. The vessel sea route may be decoded from the vessel tracking data in the one or more segments, and may represent the deviation from a historical sea route between an origin and a destination.

The identified vessel sea route from the one or more segments may be stored in a vessel sea route history database 567. The vessel sea route history database may be provided by database 110 (see FIG. 1). The vessel sea route history in vessel sea route history database 567 may be associated with the unique vessel identifier.

At 568, a vessel sea route behavior profile may be generated based on the vessel sea route history received from vessel sea route history database 567. The profile may be a statistical model, such as a distribution related to the vessel sea route. The profile may include statistics such as the maximum, minimum, mean, median, standard deviation, and the 10th, 25th, 75th and 90th percentiles for the vessel route deviations for each vessel and at different ocean regions. The profile may further include an upper limit, lower limit, upper quartile and lower quartile related to the vessel sea route. The vessel profile may include upper limit, lower limit, upper quartile and lower quartile related to the deviation from the vessel sea route, for example, an upper limit threshold may be a 10 km deviation and the lower limit threshold may be 0 km. The upper limit, lower limit, upper quartile, and lower quartile may be distance values, or percentage values. The vessel profile may be determined for a vessel, a type of vessel, for a geographic zone, or a combination thereof.

For example, the vessel sea route behavior profile may define an expected deviation from a sea route calculated using the equation:

$$\text{Expected deviation} = \left[(2*\text{Interquartile range } (IQR)^6) + 75\text{th Percentile}\right]$$

The determined vessel sea route behavior profile may be stored in vessel sea route profile database 569. The vessel sea route profile database 569 may be provided by database 110 (see FIG. 1). The vessel sea route behavior profile in vessel sea route profile database 569 may be associated with the unique vessel identifier.

At 570, vessel sea route anomaly (or abnormal behavior event) detection may be performed. The vessel sea route anomaly detection may compare the vessel sea route history from vessel sea route history database 567 for a vessel against the determined vessel profile from vessel sea route profile database 569. This may involve, for example, comparing the sea route deviation for one or more segments from a vessel to the lower sea route limit, the upper sea route limit. This may further involve determining whether the sea route falls within a lower quartile and an upper quartile. Outlier detection may be used in order to identify anomaly events within the one or more segments of a vessel in the vessel sea route history.

Vessel sea route anomalies may be determined inside a particular economic zone, a maritime zone, or a port. This can be done by determining the position of a vessel, and comparing with a predicted or expected location.

A shape profile and models may be used to describe a route, a port, or any other maritime zone. A port is shown as a single point such as a dot on a map, but may have anchorage areas and specific designated areas for vessels separate from the port itself. A sea route may be a polygon that may contain other specific areas. The sea route anomaly detection may include a statistical analysis about where the port actually is, including anchorages and other designated areas for vessels. This may be done by creating a data driven route for vessels navigating from a origin port to a destination particular port.

This may be performed using a dataset to determine the historical behavior in the particular port area, including pilots coming in to park, waiting lines, and various regions in a port area. This may include determining using geofencing and data analysis, which may looks at the density of vessel traffic over time, based on historic data.

In addition to ports, marine protected areas may have their own models in order to determine anomalies as compared to expected behavior.

The sea route anomalies may be determined by generating expected vessel behaviors, and comparing the predicted behavior to the observed behavior.

The anomaly events may be identified and stored in vessel sea route anomaly history database 571. The vessel sea route anomaly history database 571 may be provided by database 110 (see FIG. 1). The vessel sea route anomaly history in vessel sea route anomaly history database 571 may be associated with the unique vessel identifier.

Vessel Crew Size Anomalies

The vessel crew size anomaly pipeline is described in FIG. 5, and includes steps 572, 573, 574, 575, 576 and 577.

Vessel crew size anomalies may be determined based on the reported crew manifests of the vessel as compared with historical trips. This may be, for example, where a vessel significantly departs from a particular crew size used in the vessel trip history 536 between an origin and a destination.

As described above, at 510 a unique vessel identifier based on the unique vessel signature may be assigned to a vessel.

At 572, vessel crew size may be identified or decoded from the one or more segments along with the vessel data 350. The vessel crew size may be decoded from the vessel data 350 and the vessel tracking data in the one or more segments. The crew size data determined from the vessel data 350 may include crew manifest changes (for example when a crew member joins or leaves a vessel), temporary crew manifest changes (for example, when a temporary captain comes aboard for navigation through a particular area), and passenger manifest changes.

The identified vessel crew size from the one or more segments may be stored in a vessel crew size history database 573. The vessel crew size history database may be provided by database 110 (see FIG. 1). The vessel crew size history in vessel crew size history database 573 may be associated with the unique vessel identifier.

At 574, a vessel crew size behavior profile may be generated based on the vessel crew size history received from vessel crew size history database 573. The profile may be a statistical model, such as a distribution related to the level of vessel crew size. The profile may include statistics such as the maximum, minimum, mean, median, standard deviation, and the 10th, 25th, 75th and 90th percentiles for the crew size for each vessel and at different ocean regions. The profile may further include an upper limit, lower limit, upper quartile and lower quartile related to the vessel crew size. The vessel profile may include upper limit, lower limit, upper quartile and lower quartile related to the deviation from the vessel crew size, for example, an upper limit threshold may be 100 crew members and the lower limit threshold may be 50 crew members. The upper limit, lower limit, upper quartile, and lower quartile may be actual crew sizes, or percentage values. The vessel profile may be determined for a vessel, a type of vessel, for a geographic zone, or a combination thereof.

For example, the vessel crew size behavior profile may define an expected crew size for a vessel calculated using the equation:

$$\text{Expected crew size} = \left[(2*\text{Interquartile range } (IQR)^6) + 75\text{th Percentile}\right]$$

The determined vessel crew size behavior profile may be stored in vessel crew size profile database 575. The vessel crew size profile database 575 may be provided by database 110 (see FIG. 1). The vessel crew size behavior profile in vessel crew size profile database 575 may be associated with the unique vessel identifier.

At 576, vessel crew size anomaly (or abnormal behavior event) detection may be performed. The vessel crew size anomaly detection may compare the vessel crew size history from vessel crew size history database 573 for a vessel against the determined vessel profile from vessel crew size profile database 575. This may involve, for example, comparing the crew size from one or more segments from a vessel to the lower crew size limit, the upper crew size limit. This may further involve determining whether the crew size falls within a lower quartile and an upper quartile. Outlier detection may be used in order to identify anomaly events within the one or more segments of a vessel in the vessel crew size history.

The anomaly events may be identified and stored in vessel crew size anomaly history database 577. The vessel crew size anomaly history database 577 may be provided by database 110 (see FIG. 1). The vessel crew size anomaly history in vessel crew size anomaly history database 577 may be associated with the unique vessel identifier.

Vessel Incident Anomalies

The vessel incident anomaly pipeline is described in FIG. 5, and includes steps 578, 579, 580, 581, 582 and 583.

Vessel incident anomalies may be determined based on the reported vessel incidents of the vessel incident data 352 as compared with historical profiles. This may be, for example, where a vessel encounters a number of incidents between an origin and a destination.

As described above, at 510 a unique vessel identifier based on the unique vessel signature may be assigned to a vessel.

At 578, the vessel incident may be identified or decoded from the one or more segments along with the vessel incident data 352. The vessel incident may be decoded from the vessel data 352 and the vessel tracking data in the one or more segments. The incident data determined from the vessel data 352 may include vessel incidents at sea as recorded by vessel logs, including non-conformity with regulations and equipment failure. Other activities that may be provided in the vessel incident data provided by the vessel incident provider 310a may include flooding, defective components or equipment failures, collisions with vessels, allisions with fixed objects, crew fatigue, maintenance issues, etc.

The identified vessel incident from the one or more segments may be stored in a vessel incident history database 579. The vessel incident history database may be provided by database 110 (see FIG. 1). The vessel incident history in vessel incident history database 579 may be associated with the unique vessel identifier.

At 580, a vessel incident behavior profile may be generated based on the vessel incident history received from vessel incident history database 579. The profile may be a statistical model, such as a distribution related to the level of vessel incident. The profile may include statistics such as the maximum, minimum, mean, median, standard deviation, and the 10th, 25th, 75th and 90th percentiles for the incidents for each vessel and at different ocean regions. The profile may further include an upper limit, lower limit, upper quartile and lower quartile related to the vessel incident. The vessel profile may include upper limit, lower limit, upper quartile and lower quartile related to the deviation from the vessel incident, for example, an upper limit threshold may be 2 incidents, and a lower limit threshold may be 0 incidents. The upper limit, lower limit, upper quartile, and lower quartile may be actual incident numbers, or percentage values. The vessel profile may be determined for a vessel, a type of vessel, for a geographic zone, or a combination thereof.

For example, the vessel incident behavior profile may define an expected number of incidents from a vessel calculated using the equation:

$$\text{Expected incidents} = \left[ (2 * \text{Interquartile range } (IQR)^6) + 75\text{th Percentile} \right]$$

The determined vessel incident behavior profile may be stored in vessel incident profile database 581. The vessel incident profile database 581 may be provided by database 110 (see FIG. 1). The incident behavior profile in vessel incident profile database 581 may be associated with the unique vessel identifier.

At 582, vessel incident anomaly (or abnormal behavior event) detection may be performed. The vessel incident anomaly detection may compare the vessel incident history from vessel incident history database 579 for a vessel against the determined vessel profile from vessel incident profile database 581. This may involve, for example, comparing the number of incidents from one or more segments from a vessel to the lower incident limit, the upper incident limit. This may further involve determining whether the incident numbers falls within a lower quartile and an upper quartile. Outlier detection may be used in order to identify anomaly events within the one or more segments of a vessel in the vessel incident history.

The anomaly events may be identified and stored in vessel incident anomaly history database 583. The vessel incident anomaly history database 583 may be provided by database 110 (see FIG. 1). The vessel incident anomaly history in vessel incident anomaly history database 583 may be associated with the unique vessel identifier.

Vessel Rendezvous Detection

The vessel trip anomaly pipeline is described in FIG. 5, and includes steps 585, 586, 587, 588, 589 and 590.

Vessel rendezvous anomalies may be determined based on unstable vessel speed, and/or proximity to other vessels transmitting vessel tracking data as compared with historical profiles. This may be, for example, where a vessel performs a number of rendezvous' with another vessel while at sea between an origin and a destination.

As described above, at 510 a unique vessel identifier based on the unique vessel signature may be assigned to a vessel.

At 584, the segments having unstable speed may be identified from the one or more segments. This may include identifying segments for a vessel underway at sea where the vessels speed falls outside of the average for the trip, or is otherwise inconsistent with other segments.

At 585, vessel rendezvous' may be identified from the one or more segments along with the identified rendezvous from 584. The vessel rendezvous may be decoded from the vessel tracking data in the one or more segments.

The identified vessel rendezvous from the one or more segments may be stored in a vessel rendezvous history database 586. The vessel rendezvous history database may be provided by database 110 (see FIG. 1). The vessel rendezvous history in vessel rendezvous history database 586 may be associated with the unique vessel identifier.

At 587, a vessel rendezvous behavior profile may be generated based on the vessel rendezvous history received from vessel rendezvous history database 586. The profile may be a statistical model, such as a distribution related to the level of vessel rendezvous. The profile may include statistics such as the maximum, minimum, mean, median, standard deviation, and the 10th, 25th, 75th and 90th percentiles for the rendezvous for each vessel and at different ocean regions. The profile may further include an upper limit, lower limit, upper quartile and lower quartile related to the vessel rendezvous. The vessel profile may include upper limit, lower limit, upper quartile and lower quartile related to the deviation from the vessel rendezvous, for example, an upper limit threshold may be 2 rendezvous, and a lower limit threshold may be 0 rendezvous. The upper limit, lower limit, upper quartile, and lower quartile may be actual rendezvous numbers, or percentage values. The vessel profile may be determined for a vessel, a type of vessel, for a geographic zone, or a combination thereof.

For example, the vessel rendezvous behavior profile may define an expected number of rendezvous calculated using the equation:

$$\text{Expected number of rendezvous} = [(2*\text{Interquartile range }(IQR)^6) + 75\text{th Percentile}]$$

The determined vessel rendezvous behavior profile may be stored in vessel rendezvous profile database 588. The vessel rendezvous profile database 588 may be provided by database 110 (see FIG. 1). The rendezvous behavior profile in vessel rendezvous profile database 588 may be associated with the unique vessel identifier.

At 589, vessel rendezvous anomaly (or abnormal behavior event) detection may be performed. The vessel rendezvous anomaly detection may compare the vessel rendezvous history from vessel rendezvous history database 586 for a vessel against the determined vessel profile from vessel rendezvous profile database 588. This may involve, for example, comparing one or more segments from a vessel to the lower rendezvous limit, the upper rendezvous limit. This may further involve determining whether the rendezvous numbers fall within a lower quartile and an upper quartile. Outlier detection may be used in order to identify anomaly events within the one or more segments of a vessel in the vessel rendezvous history.

The anomaly events may be identified and stored in vessel rendezvous anomaly history database 590. The vessel rendezvous anomaly history database 590 may be provided by database 110 (see FIG. 1). The vessel rendezvous anomaly history in vessel rendezvous anomaly history database 590 may be associated with the unique vessel identifier.

Output to Vessel identification Engine

In addition to the "simple identification" based on MMSI identified at 410 (see FIG. 4) and 510 (see FIG. 5), the present embodiments provide for "advanced identification". The "advanced identification" may be provided by the methods in FIGS. 7, 24, 25, 28, 30, 31, 32, 35, 38, 39, 40, 42, 43 and elsewhere herein. The "advanced identification" may function alongside the "simple identification", or may replace the MMSI-based vessel identification with its own unique vessel identifier for each vessel.

Figure 6:
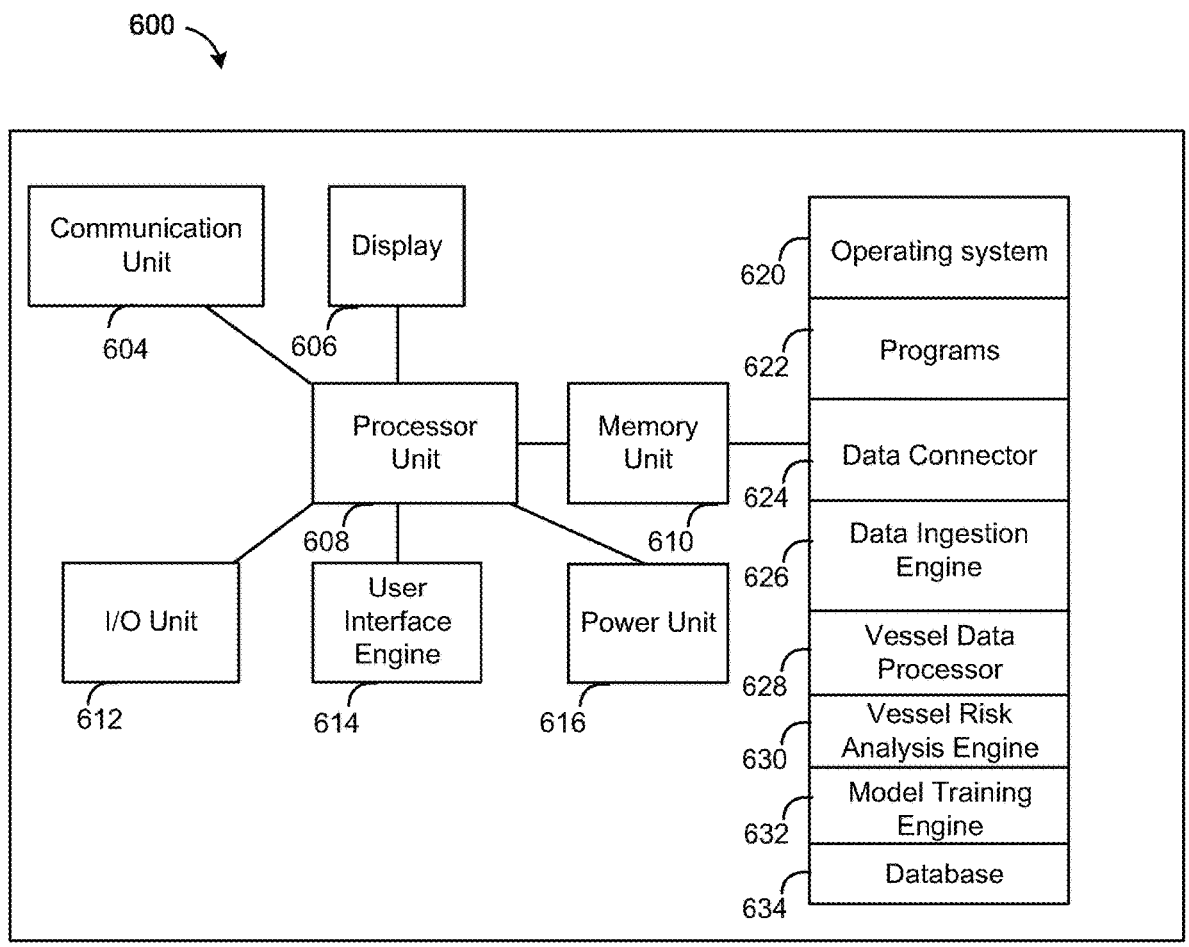
FIG. 6 shows a device diagram of a server in accordance with one or more embodiments.

Referring next to FIG. 6, a device 600 of a server is shown in accordance with one or more embodiments. The server 600 may be the server 108 of remote server 106 (see FIG. 1).

The server 600 has communication unit 604, display 606, I/O unit 612, processor unit 608, memory unit 610, user interface engine 614, and power unit 616. The memory unit 610 has operating system 620, programs 622, data connector 624, data ingestion engine 626, vessel data processor 628, vessel identification engine 630, model training engine 632, and database 634. The processing server 600 may be a virtual server on a shared host, or may itself be a physical server.

The communication unit 604 may be a standard network adapter such as an Ethernet or 802.11x adapter. The processor unit 608 may include a standard processor, such as the Intel Xeon processor, for example. Alternatively, there may be a plurality of processors that are used by the processor unit 608 and may function in parallel. Alternatively, there may be a plurality of processors including a Central Processing Unit (CPU) and a Graphics Processing Unit (GPU). The GPU may be, for example, from the GeForce® family of GPUs from Nvidia®, or the Radeon® family of GPUs from AMD®. There may be a plurality of CPUs and a plurality of GPUs.

The processor unit 608 can also execute a user interface engine 614 that is used to generate various GUIs, some examples of which are shown and described herein, such as in FIGS. 44, 45, 46 and 47. The user interface engine 614 provides for vessel identification layouts for users to configure, request, review, and respond to vessel identifications, and the information submitted using these interfaces may be processed by the data ingestion engine 626, vessel data processor 628, vessel identification engine 630, model training engine 632, and database 634. User interface engine 614 may be provided as an Application Programming Interface (API) or a Web-based application that is accessible via the communication unit 604.

I/O unit 612 provides access to server devices including disks and peripherals. The I/O hardware provides local storage access to the programs running on processing server 600.

The power unit 616 provides power to the processing server 600.

Memory unit 610 may have an operating system 620, programs 622, data connector 624, data ingestion engine 626, vessel data processor 628, vessel identification engine 630, model training engine 632, and database 634.

The operating system 620 may be a Microsoft Windows Server® operating system, or a Linux-based operating system, or another operating system.

The programs 622 comprise program code that, when executed, configures the processor unit 608 to operate in a particular manner to implement various functions and tools for the processing server 600.

Data connector 624 may provide for integration, either push or pull with one or more vessel tracking provider servers 112 (see FIG. 1), and one or more $3^{rd}$ party data providers (such as vessel data or vessel information providers, one or more mapping providers, one or more regional boundary providers, one or more vessel incident providers, and one or more environmental data providers, see 210 in FIG. 2). The integration may be an API integration as known, for example using an XML based REST API. The data connector 624 may transmit and receive requests and responses to the one or more vessel tracking provider servers and the one or more $3^{rd}$ party data providers using the communication unit 604.

Data ingestion engine 626 may receive data from the data connector 624, and may ingest and pre-process data from the one or more vessel tracking provider servers and the one or more $3^{rd}$ party data providers, as described in FIG. 3. The ingested data may be stored in database 634, and processed by vessel data processor 628.

Vessel data processor 628 may receive data from the data ingestion engine 626 and from the database 634, and may determine one or more parameters for a segment of vessel data, determine one or more profiles of the parameters of vessel data, and then may determine one or more vessel anomaly events as described in FIG. 4 and FIG. 5. The vessel data processor 628 may send the determined parameters, the vessel profiles, and the anomaly events to the vessel identification engine 630, and may store them in the database 634.

Vessel identification engine 630 may receive data from the data ingestion engine 626, the vessel data processor 628, either directly or by querying database 634. The vessel identification engine 630 may store one or more prediction models in memory, and may use the prediction models in order to create and output a vessel identification of a vessel.

Figure 7A:
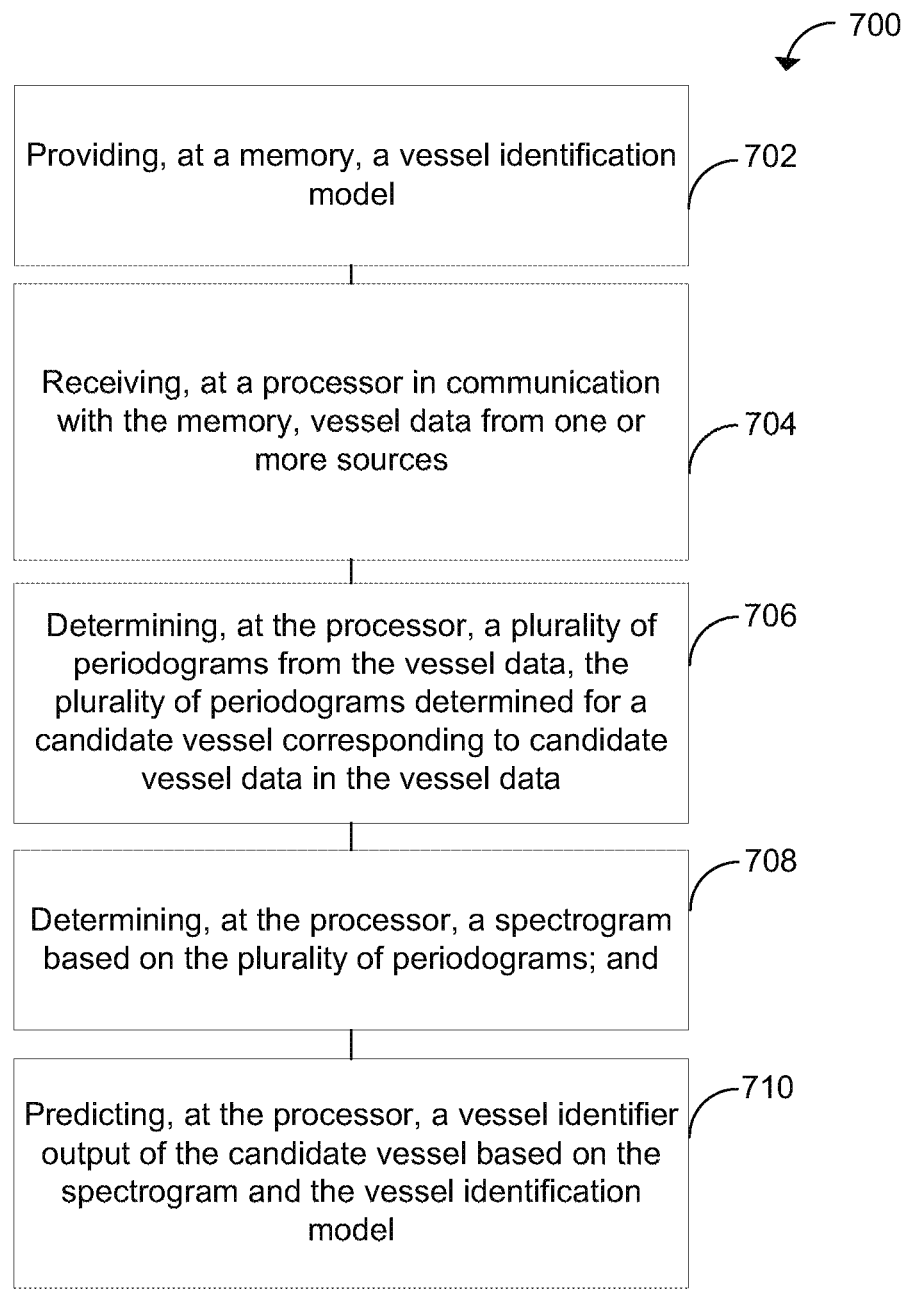
FIG. 7A shows a method diagram for vessel identification in accordance with one or more embodiments.
Figure 7B:
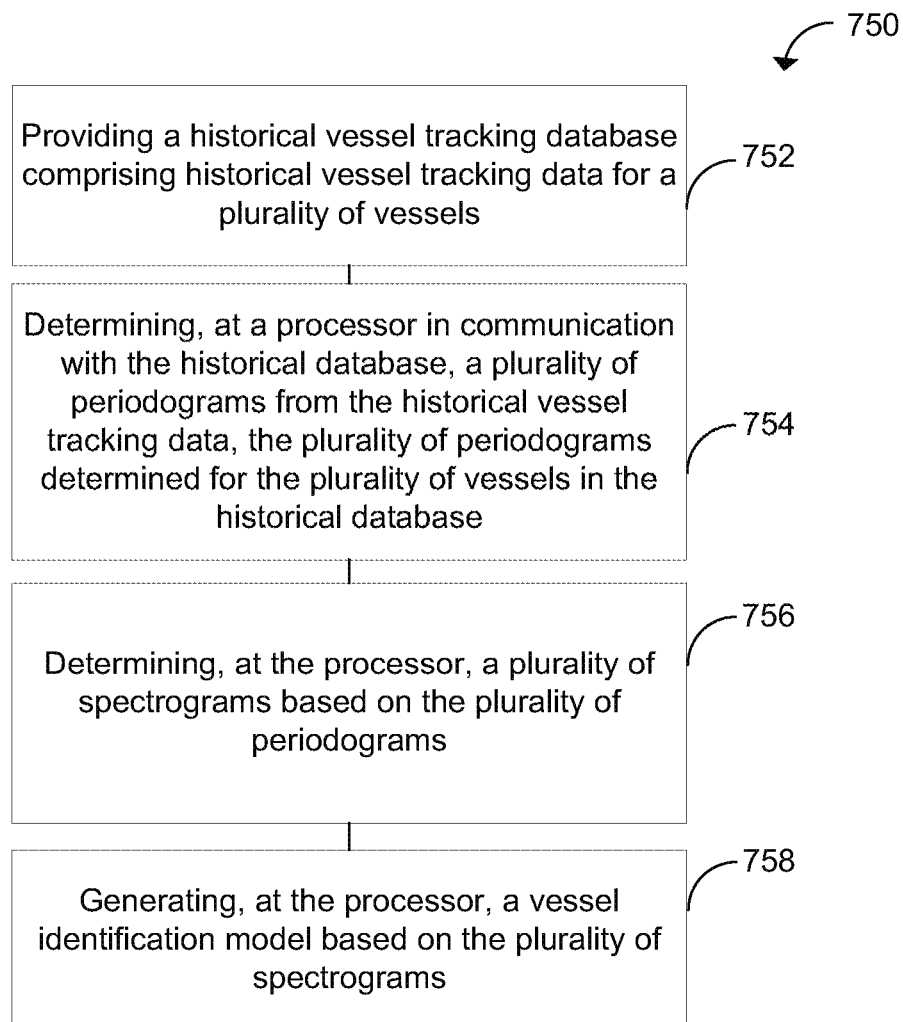
FIG. 7B shows another method diagram for vessel identification in accordance with one or more embodiments.

Model training engine 632 may generate one or more identification models as described herein, for example, FIG. 7B. The models may be stored in memory, or may be stored in database 634.

Optionally, database 634 may be hosted by server 600. The database may correspond to the database 110 (see FIG. 1). In an alternate embodiment, the database may run on a separate server from the server 600 and may be available via communication unit 604.

Referring next to FIG. 7A, there is a method 700 for determining a vessel identification in accordance with one or more embodiments.

At 702, a vessel identification model is provided at a memory. This may be provided, for example, in a database such as database 634 (see FIG. 6). The vessel identification model may take different forms, such as a classifier model, a neural network, a random forest model, etc.

At 704, vessel data from one or more sources is received at a processor in communication with the memory. The vessel data may be from one or more vessel data providers. For example, the vessel data may be processed to identify frequencies of oscillation in the vessel data.

At 706, a plurality of periodograms from the vessel data is determined at the processor, the plurality of periodograms determined for a candidate vessel corresponding to candidate vessel data in the vessel data. Frequencies of oscillations in a vessel's course over ground (COG) may be identified using floating-mean Lomb-Scargle periodograms (FMLSP). This approach is derived from discrete Fourier transforms and may translate signals from the time domain (i.e., from time series) to the frequency domain. Like discrete Fourier transforms, FMLSP may represent signals as the sum of sinusoidal functions of various amplitudes and frequencies. Periodograms may provide a discrete approximation of the frequency spectrum of a signal. Traditionally, periodograms are plotted as the square of the magnitude against frequency with peaks corresponding to the dominant sinusoids in the signal. FMLSP is designed to extract frequencies from nonuniformly sampled data, making it well-suited for analyzing SAIS transmissions. A "sliding window" may be passed over a the vessel data (such as the vessel's COG time series) and periodograms may be calculated for each interval falling within a window. This may provide a time series of periodograms.

At 708, a spectrogram based on the plurality of periodograms is determined at the processor. The spectrograms may be created as described, for example, in FIG. 9. The time series of periodograms may be translated into two-dimensional images called spectrograms. In these images, time may be shown on the horizontal axis, frequencies on the vertical axis, and the colour at each pixel may represent the magnitude of the corresponding periodogram for that time and frequency. Grayscale may be used for spectrograms.

At 710, a vessel identifier output of the candidate vessel is predicted at the processor based on the spectrogram and the vessel identification model. The vessel identifier output may be, for example, a unique number or alphanumeric identifier. The vessel identification model may be convolutional neural network (CNN), and may classify the spectrograms. There may be three types of classifiers: for vessel type, size, and identity. CNNs may be trained on a subset of data and validated using the remaining data.

Optionally, each of the plurality of periodograms may be determined for the candidate vessel using a sliding window passed over the candidate vessel data.

Optionally, the plurality of periodograms may be determined for the candidate vessel based on a time-domain to frequency-domain transformation applied to the candidate vessel data.

Optionally, the time-domain to frequency-domain transformation may comprise a floating-mean Lomb-Scargle periodogram (FMLSP) algorithm.

Optionally, the spectrogram may comprise a two-dimensional bitmap, the two dimensional bitmap comprising a time axis and a frequency axis.

Optionally, each pixel of the two-dimensional bitmap may comprise a magnitude of the corresponding periodogram for that time and frequency.

Optionally, the two-dimensional bitmap may comprise has a color depth of 1 bit per pixel, 2 bits per pixel, 4 bits per pixel, 8 bits or 32 bits per pixel.

Optionally, the vessel data may comprise at least one selected from the group of satellite AIS data from a satellite AIS data source, and vessel information data from a vessel information source.

Optionally, the vessel data may comprise at least one selected from the group of course-over-ground data, time of transmission data, magnitude of transmission power data, and phase of transmission power data.

Optionally, the method may further comprise receiving, at the processor, environmental data from the one or more sources; and wherein the vessel identifier output of the candidate vessel is predicted based on the environmental data, the spectrogram and the vessel identification model.

Optionally, the environmental data may comprise at least one selected from the group of: wind speed, wind direction, wave height, wave frequency, ocean current and sea surface temperature.

Optionally, the method may further comprise associating the environmental data with the vessel data using a spatial-temporal join.

Optionally, the environmental data may comprise at least one selected from the group of satellite-mounted moderate resolution imaging spectroradiometers (MODIS) data and Marine Environment Monitoring Service, and satellite data.

Optionally, the vessel identification model may comprise a convolutional neural network.

Optionally, the vessel identification model may comprise a vessel type classifier, a vessel size classifier, and a vessel identity classifier.

Optionally, the method may further comprise predicting, at the processor, a vessel type output of the candidate vessel from based on the spectrogram and the vessel identification model.

Optionally, the vessel type output may be one of: a cargo ship class, a fishing vessel class, a high-speed craft class, a tanker class and tug class.

Optionally, the method may further comprise predicting, at the processor, a vessel size output of the candidate vessel from based on the spectrogram and the vessel identification model.

Optionally, the vessel size output may be one of: a volume below 300 gross tonnage (GT) class, a vessel volume between 301 GT and 900 GT class, a vessel volume between 901 GT and 10000 GT class, a vessel volume between 10001 GT and 40000 GT class, and a vessel of volume above 40000 GT.

Optionally, the predicting, at the processor, a vessel identifier output of the candidate vessel may comprise:

predicting, at the processor, a plurality of candidate vessel identifiers of the candidate vessel; and selecting, at the processor, the vessel identifier output from the plurality of candidate vessel identifiers based on a voting classifier, the voting classifier electing the vessel identifier output based on vessel data.

Referring next to FIG. 7B, there is shown a method diagram 750 for generating a vessel identification model in accordance with one or more embodiments.

At 752, a historical vessel tracking database is provided comprising historical vessel tracking data for a plurality of vessels.

At 754, a plurality of periodograms from the historical vessel tracking data are determined at a processor in communication with the historical database, the plurality of periodograms determined for the plurality of vessels in the historical database.

At 756, a plurality of spectrograms are determined at the processor based on the plurality of periodograms.

At 758, a vessel identification model is generated at the processor based on the plurality of spectrograms.

Optionally, the method may further include: providing an environmental database comprising environmental data corresponding to the historical vessel tracking data of the plurality of vessels; and wherein the generating the vessel identification model further comprises generating the vessel identification model based on the historical vessel tracking data and the environmental data.

Optionally, the environmental database may comprise at least one selected from the group of: wind speed data, wind direction data, current speed data, current direction data, sea surface temperature data and significant wave height data; and wherein the method further comprises performing a spatial-temporal join of the environmental data and the historical vessel tracking data.

Optionally, the method may further comprise: providing a historical vessel metadata database comprising vessel metadata corresponding to the plurality of vessels in the historical vessel tracking database; and wherein the generating the vessel identification model further comprises generating the vessel identification model based on the historical vessel tracking data and the vessel metadata.

Optionally, the generating the vessel identification model may comprise: generating, at the processor, a vessel type model; generating, at the processor, a vessel size model; and generating, at the processor, a vessel identity model.

Optionally, the determining the plurality of periodograms from the historical vessel tracking data may comprise selecting the historical vessel tracking data based on one or more vessel tracking data filters.

Optionally, the determining the plurality of periodograms from the historical vessel tracking data may comprise: identifying one or more vessel passes for each of the plurality of vessels in the historical vessel tracking data; splitting each vessel pass into a plurality of subsections; and wherein the plurality of periodograms may be determined for each of the plurality of subsections for each of the plurality of vessels.

Optionally, the determining each of the plurality of periodograms may be determined using a Lomb-Scargle (LS) algorithm.

Optionally, each vessel pass may be split into five subsections.

Figure 8:
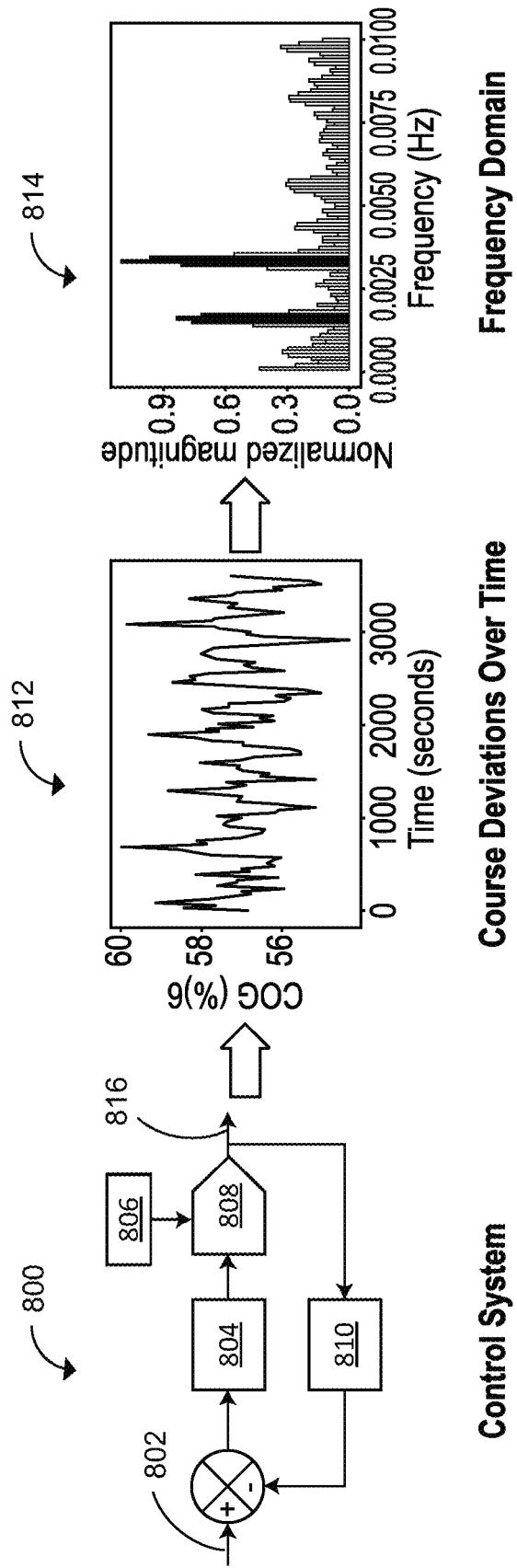
FIG. 8 shows an analysis diagram for vessel identification in accordance with one or more embodiments.

Referring next to FIG. 8, there is shown an analysis diagram 800 for vessel identification in accordance with one or more embodiments. The vessel system 800 generates course deviations 810 and course corrections 816 over time. These course deviations and corrections 812 may be transformed to the frequency domain representation 814 for example, using a Fourier transform, or generating a floating-mean Lomb-Scargle periodogram.

To understand the control system adjustments observed, it is first necessary to quantify the environmental conditions experienced by the vessel. The present systems and methods are directed to predictive algorithms and analysis of the acquired vessel data and environmental data.

When a vessel is at sea and underway, its control system 800 may be used to ensure safe sailing and maintain the vessel on the desired course. Vessel dynamics are extensively influenced by external forces and environmental disturbances. These include winds, waves and ocean currents, with waves playing an especially important role. Environmental disturbances 806 may cause vessels to continually deviate from their desired course. The purpose of a vessel's control system 800 is to maintain the vessel 808 desired course or set point 802 in the presence of external forces (such as environmental forces) 806 by using a controller or autopilot 804 and constantly providing control input to adjust and correcting the vessel's 808 heading 816 based on measured heading feedback 810.

Once a change is made by the vessel's steering controls 804, a feedback heading 810 may be observed or measured aboard the vessel. Due to the large size of vessels, their relative turning inertia, and delays in the measurement of feedback 810, oscillations 812 may be introduced in the ship's heading as it makes way.

Oscillations 812 in a vessel's trajectory are manifestations of the control system 800 responding to environmental perturbations 806 and can be observed as fluctuations in the vessel's course over ground (COG) over time. In the absence of external forces, a vessel would not deviate from its desired course and, consequently, a control system 800 would not need to change its heading to achieve its desired course. In reality though, a vessel's control system continuously responds to environmental perturbations resulting in persistent variations in COG over time.

A vessel's constant course deviations caused by environmentally induced forces 1006 and the corrections applied by the control system cause the vessel trajectory to vary back and forth across the ideal trajectory that would have been achieved in the ab-sence of such external forces (i.e., it causes induced oscillatory motions). The character-istics of the induced motion in frequency and amplitude differ depending on the vessel's control system, its unique hydrodynamic (hull shape, bow shape) and kinematic proper-ties (e.g., speed, turning radius, maneuverability) and the environmental conditions en-countered. Marine vessels' control systems are formalized by mathematical models (e.g., dynamics model, disturbance model and steering model) that are derived from the vessel profile (e.g., vessel size, overall length, rudders dynamics) and consider (nonlinear) environmental disturbance that could affect the control process. Here, every vessel (profile type) is represented with its own model, based on the expectation that each vessel tends to respond differently in response to environmental conditions. Vessel-specific attributes (i.e., autopilot control system, hydrodynamic and kinematic properties) can be revealed when the vessel's trajectory oscillations are interpreted in the context of the environment in which it was observed. These vessel-specific attributes can then be used to identify the vessel.

Likewise, a vessel's trajectory could change due to manual inputs or changes in the vessel itself, such as load adjustments. These are transient disturbances which are infrequent and episodic. These are essentially stepwise changes. Consider, for example, a captain changing the heading set point of her vessel from 80° to 85° or the uptake or release of ballast water.

Here, systems and methods to generate can be provided that use a machine learning model that can identify and make inferences based on continuous fluctuations in trajectory produced by control systems which constantly correct vessels' headings in re-sponse to persistent environmental forces, as these oscillations are idiosyncratic and can thus be used to characterize and identify a vessel.

Vessel motions described in the course correction graph 812 may be represented in the form of a signal. Signals may then translated into the frequency domain 814. The frequency-domain graph 814 shows how much of the signal lies within each given frequency band over a range of frequencies.

Figure 9:
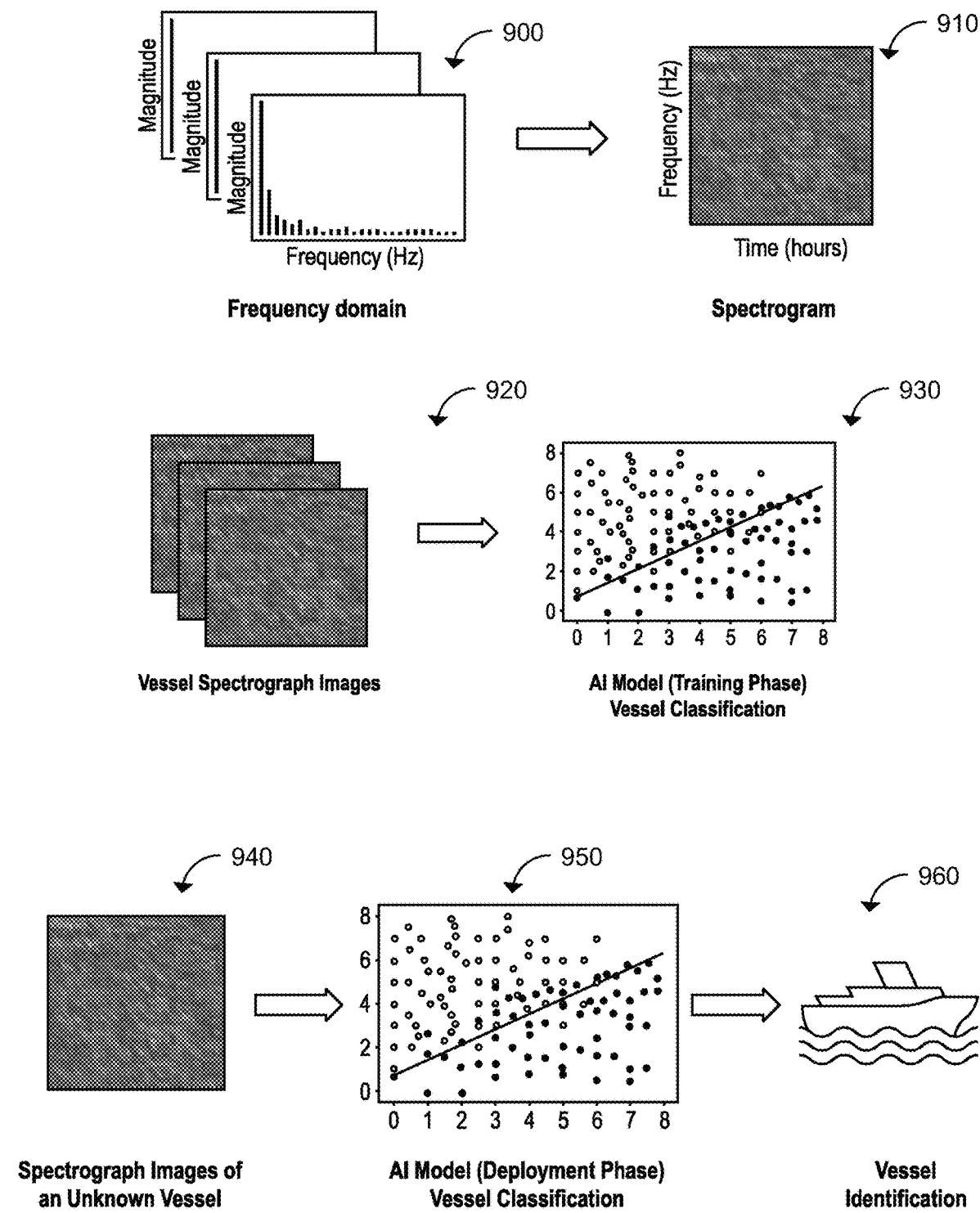
FIG. 9 shows another analysis diagram for vessel identification in accordance with one or more embodiments.

FIG. 9 shows another analysis diagram for vessel identification in accordance with one or more embodiments. The frequency domain representations 900 (see also e.g. 814 in FIG. 8) may be generated based on vessel data such as course deviations, including generation based on a sliding window.

The frequency domain representations 900 of vessel tracking data may be used to create one or more corresponding spectrogram images 910. The spectrograms may be generated by using the frequencies and absolute magnitude of the frequencies generated from the sliding window Floating Mean Lomb-Scargle periodograms determined for a vessel. The spectrogram may be grayscale, with each pixel based on a shade of grey. The spectrogram may alternatively be a colour image having the colour of each pixel representing the absolute magnitude of frequency at a given time.

The vessel identification model may receive a time series of spectrogram images as input. The model may learn from the features extracted from the images. Once trained, the model may be used to classify a vessel from a given spectrogram. There may be three classifiers: for vessel type, size and identity. The classifiers may be trained on a subset of data and validated using the remaining data.

In the inference phase, a spectrogram image of an unknown vessel may be used as input to the trained model to develop one or more classifications 950, and a vessel identification 960. The model receives the spectrogram image of an unknown vessel and it may respond with a set of probabilities for each vessel type, size and identification out of the possible set.

In the training phase, a plurality of spectrogram images 920 from a plurality of vessels may be used as input as well as vessel information such as size, characteristics, vessel type etc. may be used. The model training may learn from the features extracted from the images 930. Once trained, the generated model may classify a vessel from a given spectrogram. There may be three classifiers: for vessel type, size and identity. The classifiers may be trained on a subset of data and validated using the remaining data.

To identify how a vessel is responding to various environmental conditions, vessel tracking data describing the course deviation of a vessel are translated into the frequency domain (for example, using Fast Fourier Transforms— FFTs) to determine frequencies characteristic of that vessel. A "sliding window" transform approach may be used (see e.g. 900) that determines characteristic frequencies for an interval of fixed duration (i.e., a window), which is passed over a vessel's time series thus providing characteristic frequencies as a function of time over a vessel's journey. Using this approach, periods with steady characteristic frequencies may be identified, which may correspond to relatively constant environmental conditions. A sensitivity analysis may be used to examine the impact of the window size on the characteristic frequencies.

Applying FFT-based analysis to steady course trajectories may show peaks in the frequency domain can be readily identified during these periods in the frequency range in which is expected to observe control system corrections (i.e., high frequencies). The dominant peaks generated may be correlated with the corresponding environmental conditions.

Vessel tracking messages may be associated with a suite of state variables that characterize the environment encountered when these messages were transmitted and, as a result, characteristic frequencies determined by the transform analysis may be interpreted in the context of environmental conditions.

Referring back to FIG. 16, the trip 1602 of the Maple Gas is shown on map diagram 1600 as an example. To place the resolution and availability of environmental data in the context of vessel trajectories, here a time series of environmental data along with the speed over ground (SOG) and course over ground (COG) for the vessel named Maple Gas (MMSI: 431648000, IMO: 9800491) is shown. The Maple Gas is a tanker vessel that carries Liquified Petroleum Gas (LPG). SOG gives the speed at which the vessel is moving in knots, while COG represents direction of travel relative to True North in degrees) (°).

For this analysis, a 16-hour segment of a trip was examined that began in Port of Prince Rupert, Canada, with a final destination of Port of Imari, Japan, through the AOI. The trajectory considered for the analysis can be seen in FIG. 16 and is a subset of the entire voyage. Please note that only the considered 16-hour segment is shown and the rest of the voyage is omitted from the figure.

Referring to FIG. 17, an analysis of the behavior of the vessel Maple Gas is shown, in accordance with one or more embodiments.

To examine the behavior of the vessel during this period, COG 1700 and SOG 1702 were plotted over time, as these metrics play a vital role in identifying a vessel's characteristics. As shown in FIG. 17, it can seen that the vessel is initially moving at an average SOG 1702 of approximately 17 knots, which begins to increase with time after 9 hours. Over the 16-hour segment, COG 1700 shows relatively rapid fluctuations, but remains between 267° and 271° for the most part. Using linear regression, the mean of COG 1700 over this interval was calculated at approximately 269°, which is represented by a red line 1704. The linear model has a gradient close to zero, showing the vessel may be trying to maintain a steady course through various environmental conditions.

Figure 18:
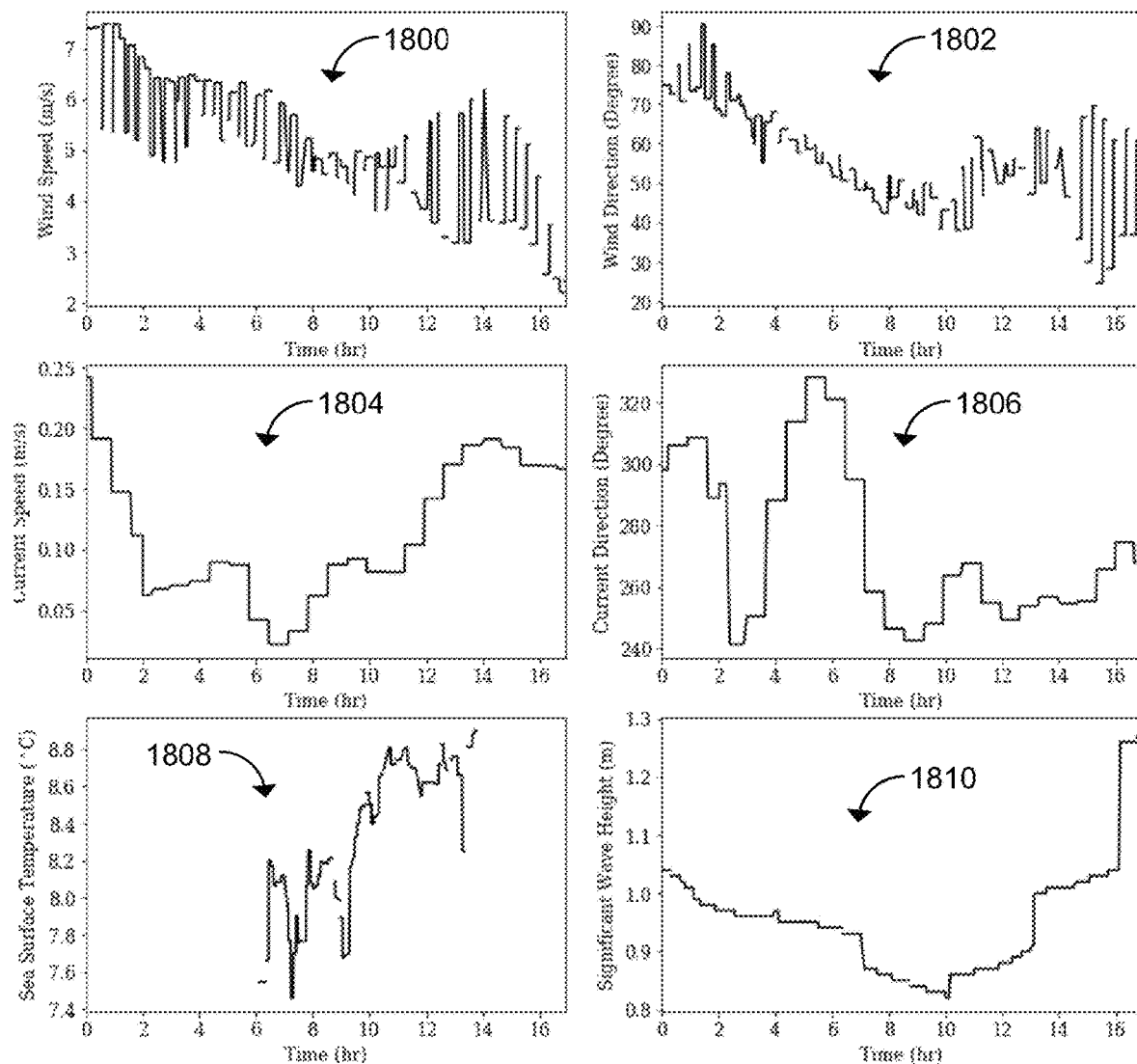
FIG. 18 shows another analysis diagram in accordance with one or more embodiments.

To quantify the various environmental conditions experienced by the vessel, wind speed (m/s), wind direction) (°, current speed (m/s), current direction) (°, sea surface temperature (° C.) and significant wave height (m) were appended to vessel location data using a spatial-temporal join. Time series of these environmental variables demonstrate that the vessel has been travelling through a variety of conditions as shown in FIG. 18, which explains the observed oscillations in COG around a mean value 269° and an increase in SOG. The faster a vessel moves, the easier it is to maintain a given COG. A vessel's rudder may play a critical role in steering the vessel. For any given rudder angle, the rudder force increases with increasing speed, which in turn reduces the response time of a vessel and thus helps maintain a steady trajectory.

The sharp step-like changes in environmental conditions shown in FIG. 18 demonstrate that some metrics (e.g., current direction) may show marked shifts in magnitude between the cells, highlighting poor spatial-temporal resolution. Gaps in these time series (e.g., sea-surface temperature) indicate times when no data is available for a given location and time, demonstrating environmental data sets that have limited availability.

The time-series of wind speed and direction present during the vessel's trip can be seen in FIG. 18 (top row 1800 and 1802). From the figure, it is clear that there are sharp changes between cells, showing a poor spatial resolution relative to variability in wind conditions. These marked shifts also highlight that the vessel is travelling through highly variable winds, resulting in similarly variable COG values.

The current speed and direction time-series is shown in FIG. 18 (middle row 1804 and 1806). From the figure, it is evident that this data set has a low resolution leading to the step-like changes, meaning that the resolution of the data is low in space and time. Though these data do not give near to real-time information about what the vessel is experiencing, it can still be seen that the vessel is moving through regions that exhibit variability in both current speed and direction, which will have contributed towards the observed variability in COG.

The sea-surface temperature (SST) across the vessel's trajectory is shown in FIG. 18 (bottom-left 1808). Of all the data sets, SST has the poorest data availability, which is apparent from the large sections of the trajectory for which there is no data plotted. Significant wave height (SWH) experienced by Maple Gas is shown in FIG. 18 (bottom-right 1810). In contrast to SST, there is complete data availability for SWH; however, it can be seen that occasionally there is a large difference between neighboring cells- manifested by a step-like changes-indicating that the resolution is insufficient to characterize shifts in SWH in these regions. Nevertheless, for the most part changes in SWH are gradual (e.g., between 0 and 7 hours) and the resolution of the data set is adequate.

Overall, it is seen that the Maple Gas vessel encountered a broad range of environmental conditions, which elicited the observed variability in COG in an effort to maintain a constant trajectory.

Figure 19:
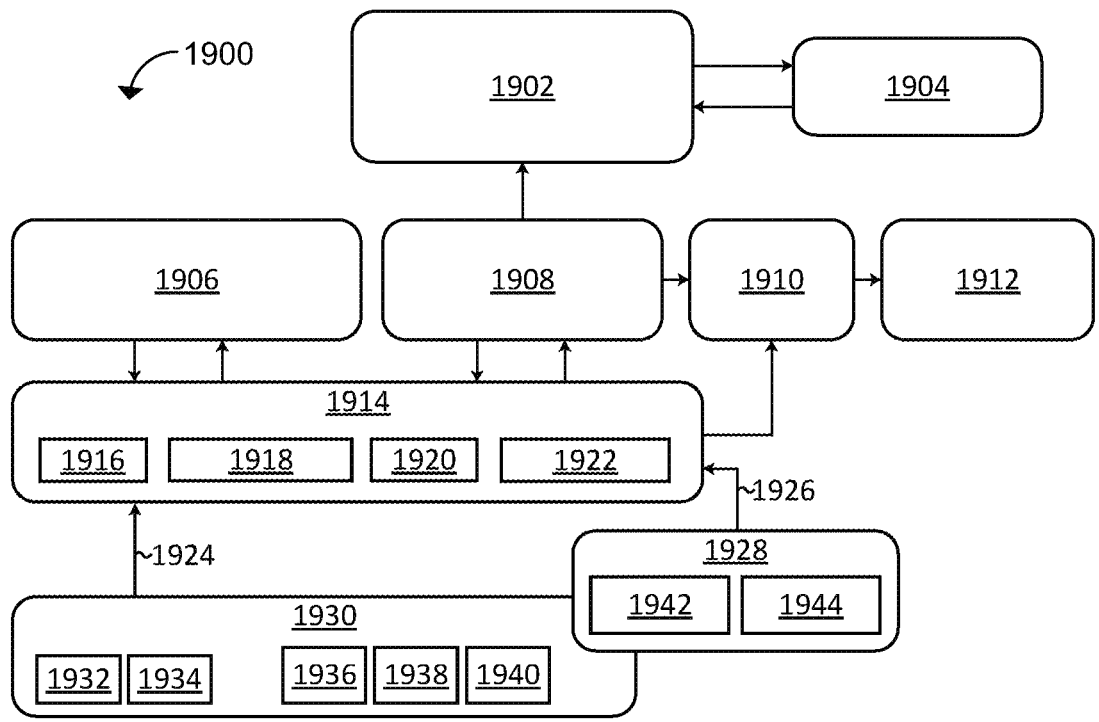
FIG. 19 shows another method diagram in accordance with one or more embodiments.

FIG. 19 shows another method diagram 1900 in accordance with one or more embodiments. The method 1900 provides for a data management layer for the vessel identification systems and methods herein. The data management layer may be developed and implemented a cloud-based architecture to handle data sets and offer the ability to use computing resources while maintaining efficiency as requirements change and technologies evolve.

The data management layer may be used to ingest archival and real-time geo-spatial temporal data collected by satellites, i.e., sequence of historical and most current observations regarding vessels, ocean wind, ocean surface temperature, ocean wave height and ocean current (e.g. as described in FIG. 3).

The data follow pipeline: data from different sources 1930 are ingested 1924 in real-time into a data lake 1914. The different sources may include the different data providers described herein, such as vessel tracking providers such as S-AIS providers 1932 and T-AIS providers 1934. Environmental data sources may similarly provide environmental data sets for ingestion, such as wind data provider 1936, ocean current provider 1938 and ocean climate provider 1940. Other data providers can include static data providers 1928 such as vessel information provider 1942 and geographical information provider 1944. Subsequently, raw data 1920 may be aggregated and pre-processed (i.e., cleaned and extrapolated) into enhanced data 1922, and promptly forwarded to enrichment algorithms and AI models 1916. The data sets may also be labelled and stored as labelled data sets 1918. The results of the algorithms and model 1916 may again be stored in the data lake 1914, which serves as a persistent storage layer and includes both all archival and the most current observations. Data in a data lake 1914 may coexist in different formats, which can be structured and unstructured. The data lake 1914 may store a high volume of information from a variety of sources. Relational data to the application may be fed into a database system 1902. Due to the nature of the data, a spatial database—PostgreSQL/PostGIS—may be used since it allows for manipulate spatial objects like any other object in the database. Furthermore, the database 1902 may provide functions used for querying of spatial properties and relationships, as well as multi-dimensional spatial indexing.

A web application layer 1904 may be a web server or application server providing application access for users.

An AI/ML layer 1906 may include functionality related to data labelling, model training and model deployment.

A data transformation layer 1908 may be provided.

A metadata catalog 1910 may be provided.

A data analysis and reporting layer 1912 may be provided, such as, for example, an API.

Data Relational Tables

The relational tables in database 1902 may describe the input data used by and the output data generated by the algorithms.

The data input to database 1902 corresponds to the vessel tracking data streams and the ocean environmental data. The tables used to model vessel tracking data include: a Vessel_Position table that describes vessel positions broadcast by vessel for the last 6 months. The vessel tracking messages my be enriched with an internal Vessel ID. A Vessel_Info table that describes the static information (e.g., vessel name, type, dimensions) for each vessel. The Vessel_Info table may include attributes Vessel_Advanced_ID, Vessel_MMSI, Vessel_IMO, Vessel_Callsign, Ship_Name, Ship_Type, AIS_Version, To_Bow, To_Stern, To_Port, To_Starboard, Epfd, ETA_Month, ETA_Day, ETA_Hour, ETA_Minute, Draught, Destination, DTE, and Message_Received_Time. A Vessel_Stats table that is a summary of the vessel position behaviour (e.g., how often the vessel has been underway or stopped, how often it has transmitted vessel tracking messages) extracted from the vessel position data. The Vessel_Stats table includes attributes Vessel_GSTS_ID, First_Message, Last_Message, and Total_Messages.

The Table Vessel_Position may contains geographic information about any vessels of interest. This table may provide the application with information about the most current as well as the historical position information about any vessel globally. The Vessel_Position table may include attributes such as Vessel_GSTS_ID, Vessel_Type, Vessel_MMSI, Latitude, Longitude, Speed_Over_Ground, Course_Over_Ground, Rate_Of_Turn, Heading, Message_Received_Time, and RegionID.

Furthermore, users may navigate vessel history at different levels of granularity using the Vessel_Position and the Vessel_Stats table. The Vessel_Position table may provide granular positional historical information and therefore the user can, step-by-step, trace back the position of the vessel in the past. The Vessel_Stats table may provide summaries of vessel activities.

The three tables used to model ocean areas and ocean environmental conditions data may include: The Region_Information table may describe spatial features per region (e.g., an EEZ, port boundaries). The region spatial features may be described using shapefiles. A shapefile commonly refers to a collection of files with .shp, .shx, .dbf and other extensions on a common prefix name. The Region_Information table may include the following attributes Region_ID (or MRGID), Geometry, Region_Name, Longitude, Latitude, Min_X, Min_Y, Max_X, and Max_Y.

Area Integer. The Region_Stats table may provide a summary of the vessel position behaviour per region (e.g., how often the vessel has been in a specific region and for how long) extracted from the vessel position data correlated with information from the Region_Pol table. The Region_Stats table may include the attributes Vessel_Advanced_ID, EEZ_ID, First_Entry, Last_Entry, Total_Time and Total_Entries.

The {Observation} _Information tables may be provided for observations such as: Surface Wind Speed and Wind Direction, Ocean Surface, Temperature, Significant Wave Height, Ocean Currents. The {Observation} _Information tables may describe the features extracted from raster files such as ocean current and wind observations. The environment files may be in Network Common Data Format (netCDF). NetCDF is an open standard format, widely used for scientific applications, that can contain multiple raster datasets, each composed of a spectrum of bands. Each band, according to the information derived by its metadata, may represent the measurements for a given time-interval.

The Tables Region_Information, and Raster_DT may contain geographic information about the vessel positions and area of interest. All spatial data will be stored and manipulated using a spatial database. For example, a user might want to check if a vessel visited a specific area in a given time interval.

The system may join the vessel tracking data points (from the Vessel_Postion table) with the given area (from the Region_Information table). Likewise, the user may use the Raster_DT table to check for ocean observation values and cross reference them with vessel positional data.

The Region_Stats table may provide summaries of the vessel activities for each region of interest.

In terms of output tables, a Vessel_Characterization table may be provided that describes the expected vessel navigation behaviour for each vessel and for each combination of environmental conditions.

Figure 20:
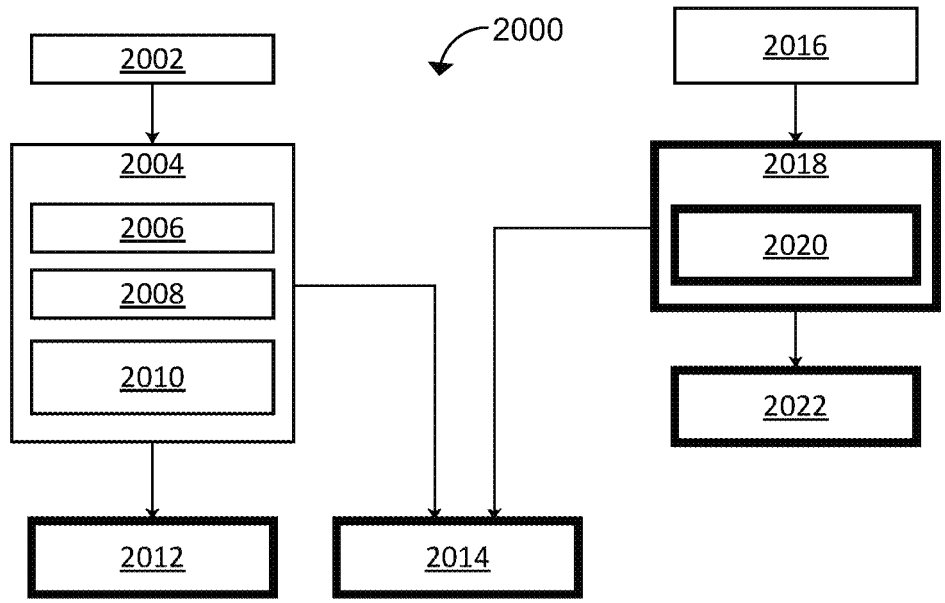
FIG. 20 shows another method diagram in accordance with one or more embodiments.

FIG. 20 shows another method diagram in accordance with one or more embodiments. This data processing workflow may correspond to elements of those found in FIG. 4 and FIG. 5 which includes the data processing of the vessel tracking data as well as the environment data.

At 2002, vessel tracking data is ingested from one or more vessel tracking data providers.

At 2004, the vessel tracking data is processed. This may include vessel tracking data decoding 2006 that may decodes the AIS data from NMEA format to human-readable format, vessel tracking data cleansing 2008 (which may include algorithms that handle missing and invalid data) including simple vessel identification, and vessel tracking data transformation such as AIS position data interpolations. The interpolations may include linear interpolations between sets of vessel position points.

At 2012, vessel tracking data may be loaded into to the database.

At 2016, environmental data may be ingested from one or more environmental data providers.

At 2018 environmental data processing may be performed, including environmental data format transformation 2020 (transform to a proper data format for further analysis). This may include transforming the NetCDF files into machine readable data frames.

At 2014, the environmental data and vessel tracking data may be correlated (for example, using a spatial-temporal join as described herein). This may include merging the environment data points with the vessel tracking data points. The merged data may be stored in a database.

Figure 21:
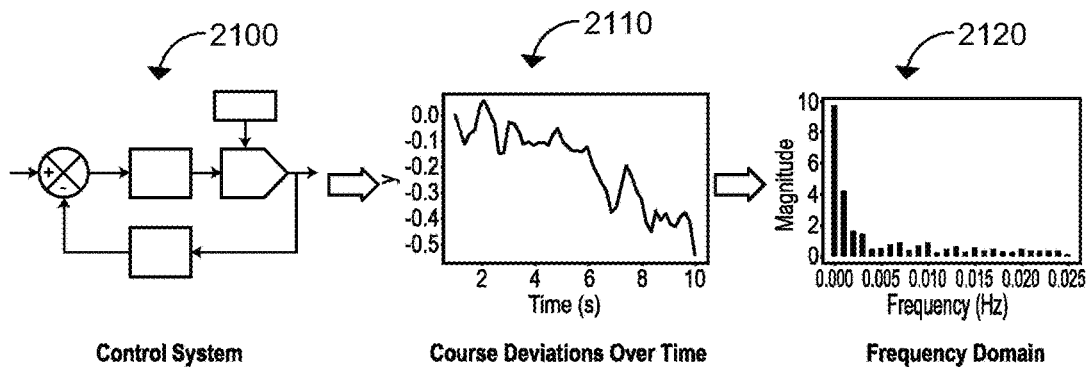
FIGS. 21, 22 and 23 show additional analysis diagrams in accordance with one or more embodiments.

Referring next to FIG. 21 there is shown an additional analysis diagram in accordance with one or more embodiments. To identify how a vessel (i.e. it's control system) is responding 2100 to various environmental conditions. The vessel tracking data describing the course deviation of a vessel over time 2110 are translated into the frequency domain, for example using a Fast Fourier Transform (FFT) to determine frequencies characteristic of that vessel 2120.

As described, a "sliding window" approach may be used that determines characteristic frequencies 2120 for an interval of fixed duration (i.e., a window), which is passed over a vessel's time series thus furnishing characteristic frequencies as a function of time over a vessel's journey. This may allow for periods with steady characteristic frequencies to be isolated, which may coincide with relatively constant environmental conditions.

The frequency range 2120 within which corrections are made based on course deviations 2110 by the control system 2100 in response environmental perturbations (i.e., corresponding to time scales of 30 minutes or less). Applying an analysis to steady course trajectories shows peaks in the frequency domain that may be identified during these periods in the frequency range in which we expect to observed control system 2100 corrections (i.e., high frequencies). The dominant peaks generated may be correlated with the corresponding environmental conditions.

Vessel tracking messages may be associated with a suite of state variables that characterize the environment encountered when these messages were transmitted and, as a result, characteristic frequencies determined by this analysis may be interpreted in the context of environmental conditions.

Figure 22:
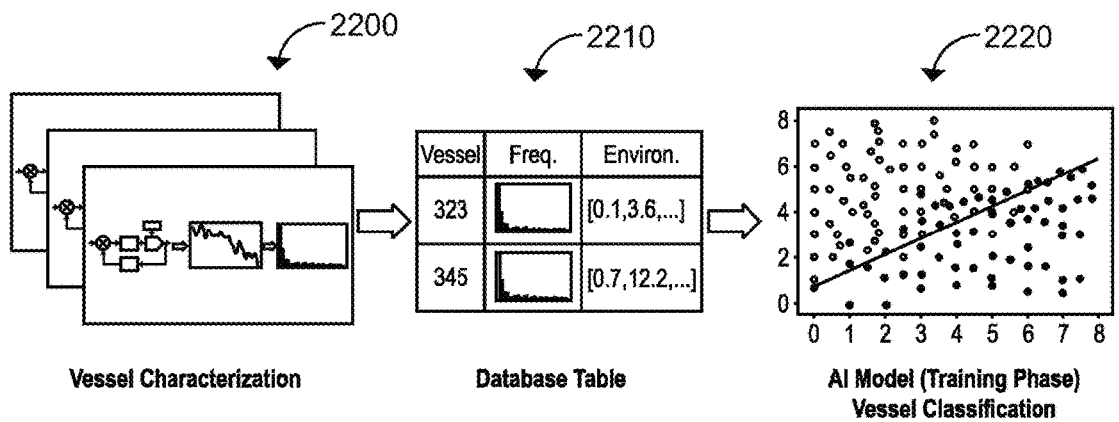

Referring next to FIG. 22 there is shown an additional analysis diagram in accordance with one or more embodiments. The vessel identification database may be populated in an automated fashion by extracting characteristic frequencies from periods of steady trajectory and associating these frequencies with environmental conditions. By building a database of characteristic frequencies for different vessels subject to a variety of environmental conditions, machine learning classification algorithms (e.g., random forest, k-nearest neighbour) may be trained to establish the identity of a given vessel.

The determined vessel characterization 2200 (see e.g. FIG. 9 and FIG. 21) based on the one or more frequency domain representations of a vessel's tracking data messages may be stored in a table such as the Vessel_Characterization table (see e.g. FIGS. 19 and 20).

The contents of the Vessel_Characterization table may be further used as a training data set for model training 2220 of a vessel classifier as described herein.

Figure 23:
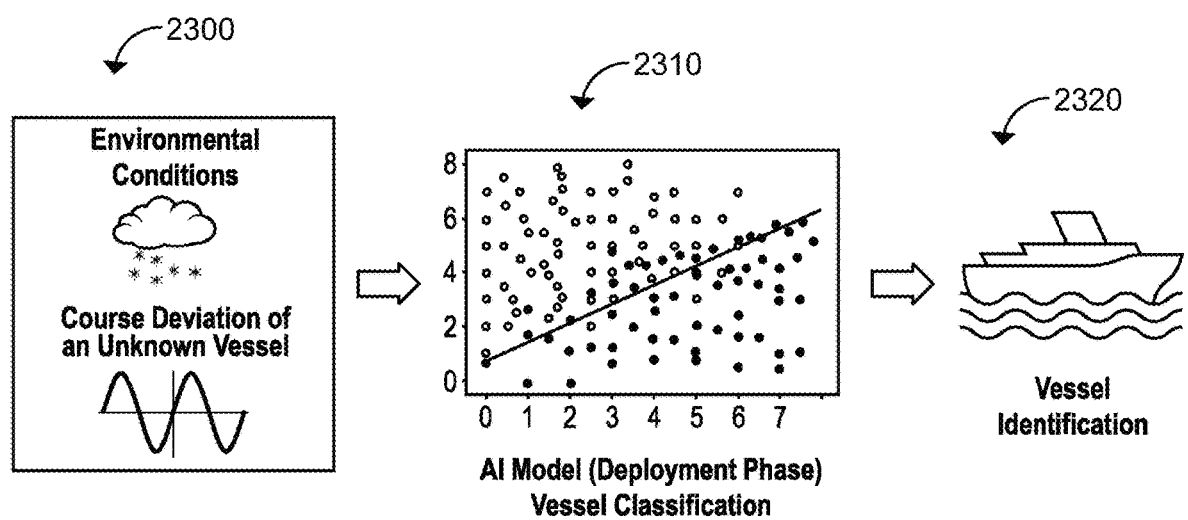

Referring next to FIG. 23, there is shown an additional analysis diagram in accordance with one or more embodiments. As described herein, an ML classification model will be trained based on a training data set and may be used for inference.

The input data 2300 to the ML classification model 2310 may include environmental data and course deviation information based on vessel tracking data. The ML classification model 2310 may classify one or more attributes of the unknown vessel. One or more ML models may provide different classification information about the unknown vessel. The output vessel attributes from the ML classification model 2310 may be used to determine an advanced identifier of the vessel 2320.

Figure 24:
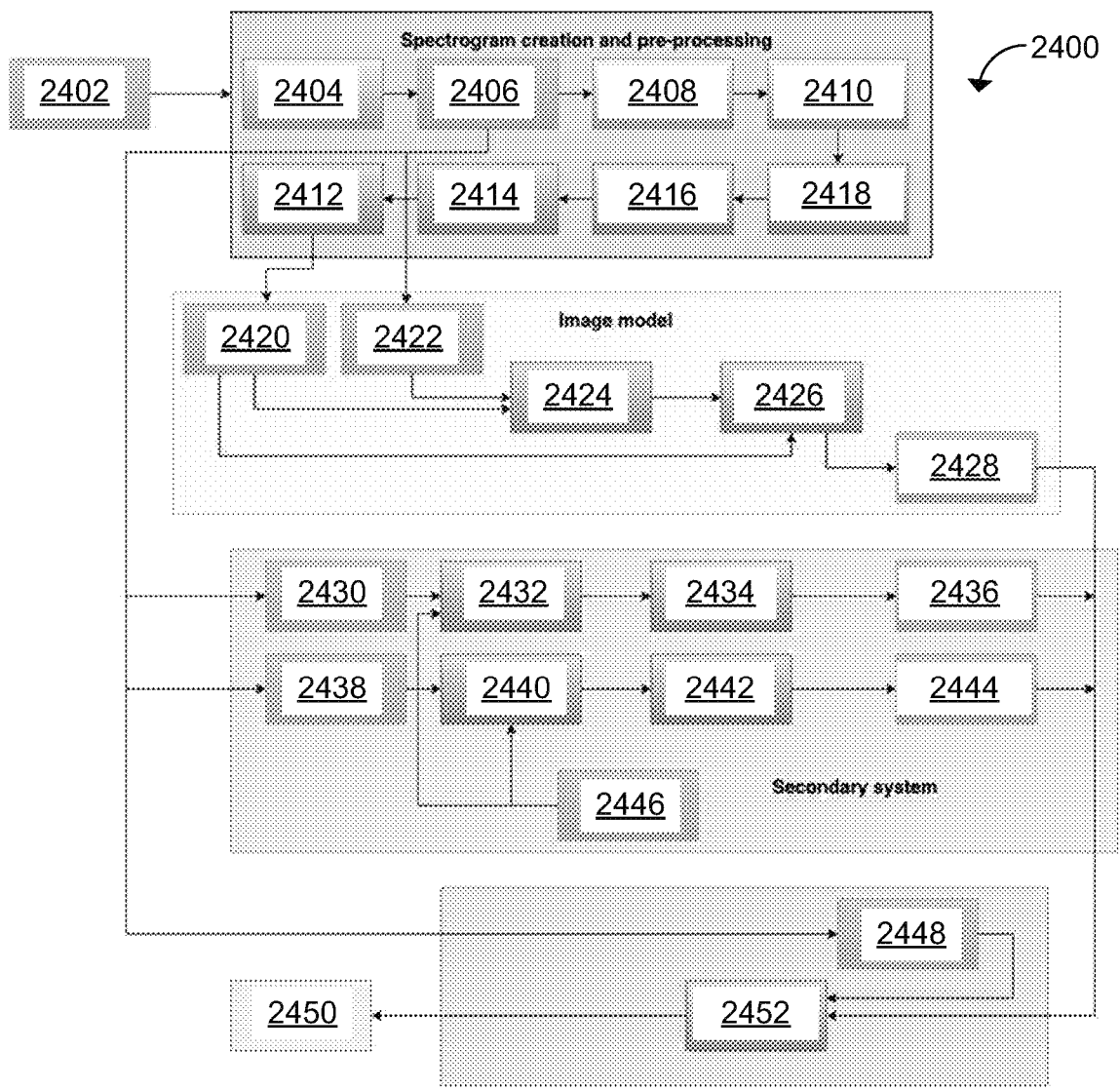
FIGS. 24 and 25 show additional method diagrams in accordance with one or more embodiments.
Figure 25:
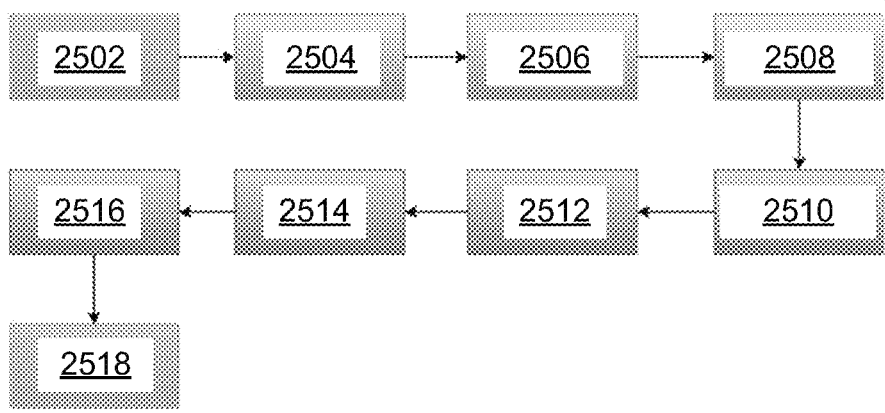

Referring to FIGS. 24 and 25 together, there is shown additional method diagrams in accordance with one or more embodiments. Method diagram 2400 refers to a vessel identification in accordance with one or more embodiments. Method diagram 2500 refers to spectrogram creation in accordance with one or more embodiments.

In the embodiments of FIGS. 19, 20, 21, 22 and 23 one prediction algorithm was used—an image classification algorithm using a classification model applied to the spectrogram of the vessel.

In another embodiment, ensemble learning may be used. Ensemble learning uses multiple prediction algorithms as opposed to just one algorithm. Ensemble learning may improve the overall system performance since any one algorithm might not perform well in all situations.

Vessel identification such as described herein is a complex problem. For example spectrograms may be used to classify the vessels. These spectrograms may be produced from time values and COG values alone. The vessel classification procedure in the embodiments of FIGS. 19, 20, 21, 22 and 23 may not use other available datapoints from vessel tracking data such as: speed of the vessel, vessel type, vessel flag, etc. These variables may help identify a given vessel and may be referred to as 'vessel metadata' within the project. In another embodiment, spectrograms may be used to predict vessel identity, and other components of vessel metadata may be used in order to increase the accuracy of the predictions.

The reasoning behind leveraging vessels metadata, is to create a system that may make comprehensive decisions (decisions involving as many variables or datapoints as possible). This may provide more accurate model predictions in a variety of environments. An effective ensemble learning model may combine the predictions of different low-level predictors that predict errors on different inputs.

At 2402, a specified Area of Interest (AOI) is specified. The area of interest's coordinates may be used to pull data from vessels traveling within the area.

From this specified AOI 2402, specific criteria may be applied 2404 to maximize the data cleanliness.

At 2406, the vessel tracking messages for vessels in the AOI may be retrieved. The vessels used for training set creation may have a quantity of vessel tracking messages between a minimum and maximum criterion. Vessels that contain over 5000 messages or occupy more than 5 geohashes may be filtered out. The maximum number of vessel tracking messages may be used to limit gathering stationary vessels that stay within the AOI.

Figure 26:
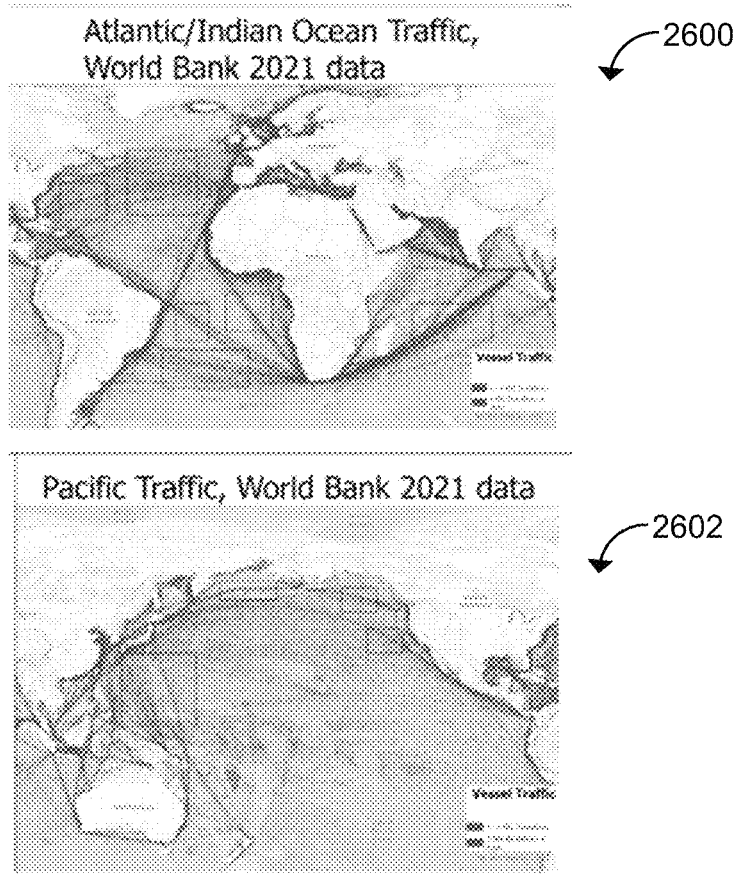
FIGS. 26 and 27 show additional analysis diagrams in accordance with one or more embodiments.

Some example AOIs are shown in FIG. 26, including Atlantic/Indian ocean traffic 2600 and Pacific traffic 2602. To create a training dataset, selected vessel trips may be selected. The vessel trips may be selected based on distance criteria 2408 such as whether the trips cover 25% of the AOI's longest dimension. Due to the difference in the size of AOIs, a defined value may not be identified that applies equally to all trips. Instead, a filtering criterion based on 25% of the longest dimension of the AOI may be adopted to select the training data.

Additionally at 2410, vessels performing a maneuver may be filtered out. Vessels performing a maneuver may be unlikely to be using autopilot. To determine if a vessel is performing a maneuver the average COG values may be analyzed to determine if they fall outside a particular standard deviation.

Other criteria which may be used to filter vessel trips for building a training dataset may include vessels that transmit fewer than 5000 messages. This may be because the vessel path may be too short to be considered for training data. Another criteria may include vessels with fewer than 5 occupied geohashes. This may be because stationary vessels may be filtered out when they transmit the same location. Another criteria may include where vessel trips does not cover more than 25% of the distance of an AOI. This may be because the vessel trip may not suitable.

At 2418, the vessel trips a time domain signal calculation may be performed.

Figure 27:
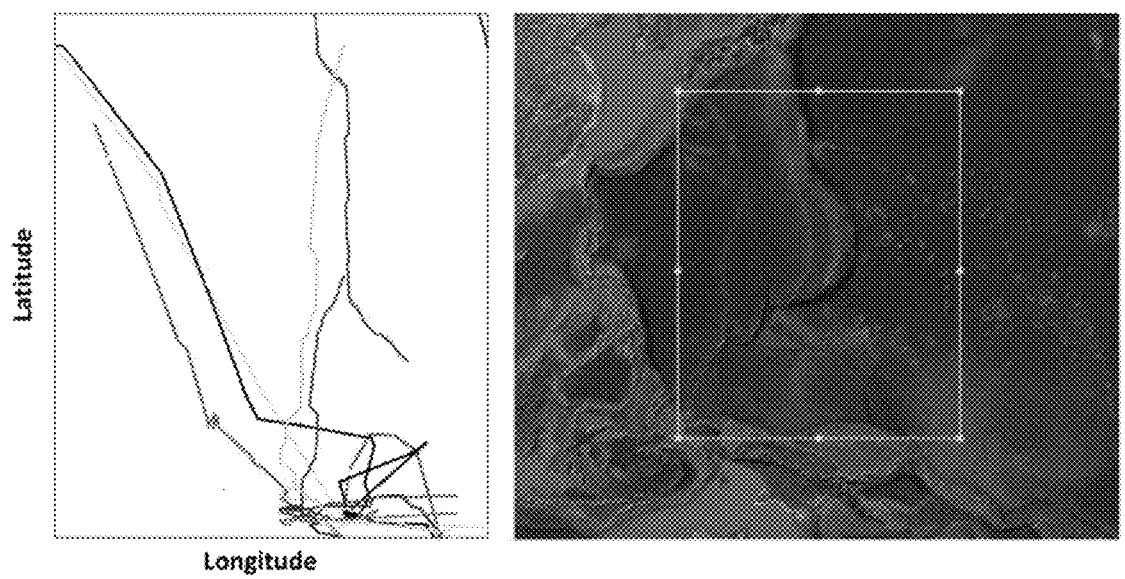

At 2416, each vessel may be split into passes. At 2416 each pass may be split into subsections. For example, FIG. 27 shows the individual passes of a vessel 2700 through an AOI 2702.

Figure 28:
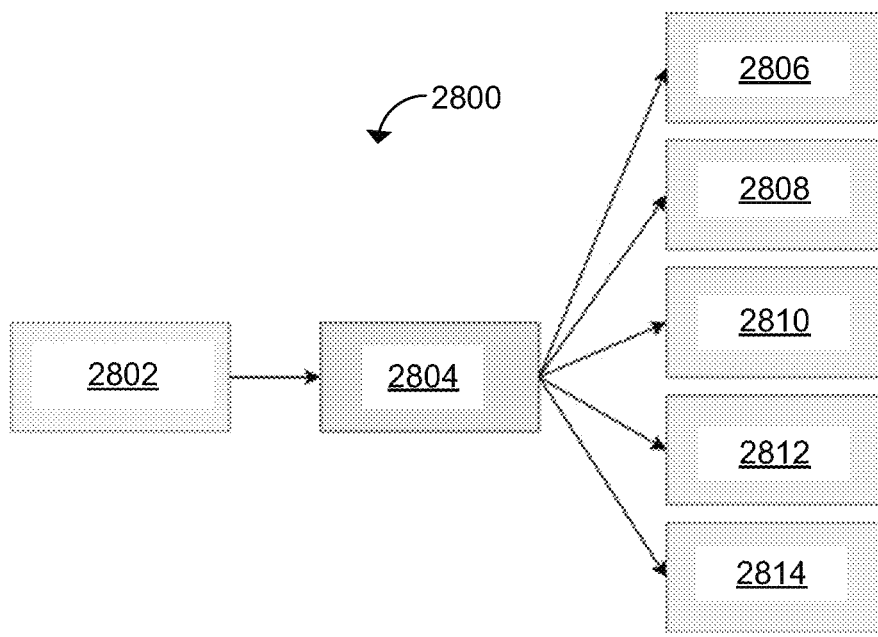
FIG. 28 shows another method diagram in accordance with one or more embodiments.

Referring to FIG. 28, each pass may be split into 5 subsections, such as a first subsection 2806, a second subsection 2808, a third subsection 2810, a fourth subsection 2812, and a fifth subsection 2814. The stability of the spectrograms may be determined by inspecting the spectrogram made over a long period of time, and comparing the spectrograms made from each of the subsections 2806, 2808, 2810, 2812 and 2814. FIG. 28 shows how the vessel tracking data for a vessel in an AOI 2802 are split into passes, and then each pass 2804 then split into subsections. Each subsection may have an equal number of datapoints. The data may be split into subsections to increase the number of images available for training the image classification model. The image classification model may learn by receiving labelled training data consisting of an image and its associated label. By seeing more examples, the image classification model may have potential patterns to recognize.

Referring back to FIGS. 24 and 25, at 2414 signal extraction in the time domain may be performed based on the subsections created at 2416. to extract the signal in the time domain. This signal may be the difference between the COG value and the heading applied to the vessel as determined in the subsection of the vessel tracking data. This time domain signal may represents the impulse of the ship when maintaining or correcting its trajectory. The time domain signal may be calculated by subtracting the heading from the COG for each datapoint. The time domain signals (difference between COG and heading) may be scaled from zero to one. This rescaling may identify patterns within the data and helps compare separate datasets.

The signal extraction at 2414 may include generating a Lomb-Scargle (LS) periodogram for each of the subsections. A Lomb-Scargle (LS) periodogram may be used in frequency analysis techniques. The LS algorithm may receive a signal and estimates the power spectral density of the signal. Here, the signal may represent the difference between the COG and heading. Prior to the LS transform the signal may be represented in the time domain. After performing the LS transform, the signal is shown as a series of frequencies and associated peaks in the frequency domain.

The LS transform may be viewed similarly to the Fourier transform. Fourier analysis is a method based on the Fourier series. The Fourier series is a method of representing a function as a sum of trigonometric functions. The Fourier transform transforms a signal from the time domain to the frequency domain. This works by decomposing the time domain signal into various sinusoidal functions at different frequencies.

The general equation for the Fourier transform is shown below. Where j is a complex number, w is a specific frequency, and x represents time.

$$f(jw) = \int_{-\infty}^{+\infty} f(x)e^{-2i\pi jx}dx$$

The LS transform may be useful for frequency analysis techniques of information that does not have regular time intervals. Traditional spectrogram creation algorithms such as the FFT require evenly spaced data. Without the LS transform, it would not be possible to analyze the time domain signal in the frequency domain since the time intervals vessels transmit AIS messages are not regular.

Figure 29:
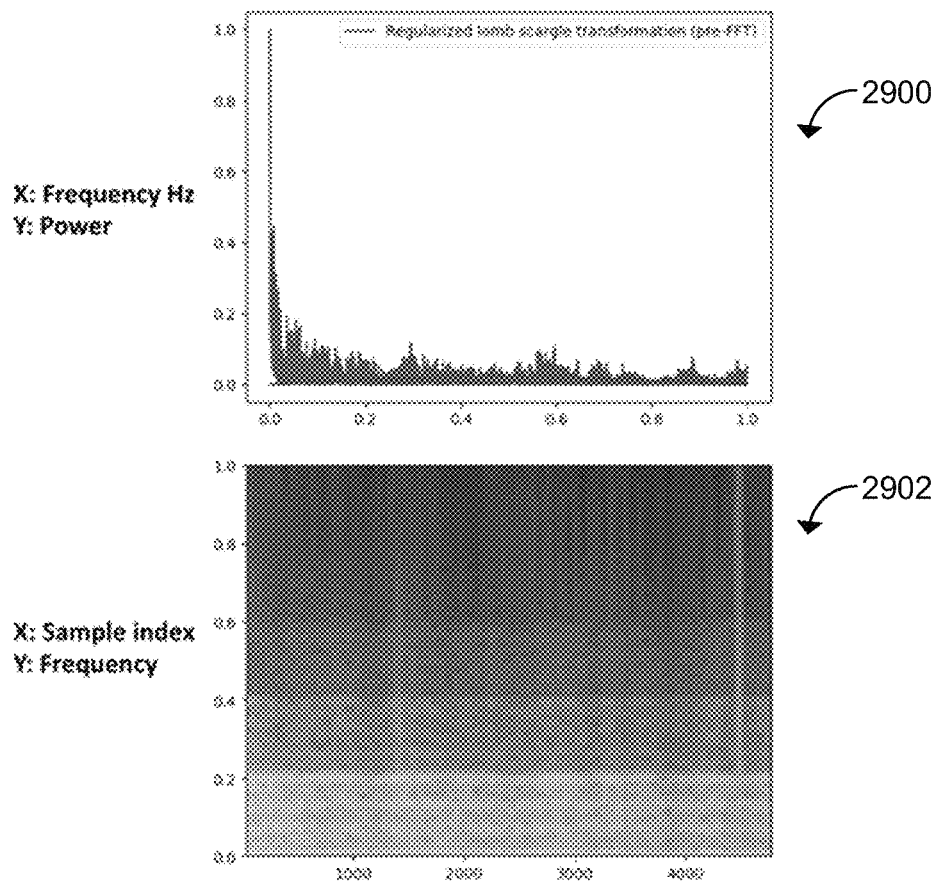
FIG. 29 shows another analysis diagram in accordance with one or more embodiments.

FIG. 29 shows an example of the results of the LS transform 2900 of a time domain signal (along with the resulting spectrogram 2902 described in the next step). The x-axis represents frequency, and the y-axis represents the normalized power.

At 2412, a frequency domain transformation of the LS output 2414 for each subsection is performed. The normalized power (y-axis of the LS periodogram) may then visualized using a spectrogram (e.g. produced using an FFT). Vessel tracking data may not be evenly-spaced in time; therefore, transforming the time series to the frequency domain using directly the FFT is not preferable. This is because the FFT requires evenly-spaced data. The LS transform may be used for cases of irregularly spaced data. Once these data have been transformed into the frequency domain, a new set is generated representing a slice of information (power) during a defined time window. This time window can be selected to maximize the information that can be obtained from the time series and is constant to generate evenly-spaced data segments. These new data segments, equally spaced in time, may then transformed into the frequency domain using directly an FFT.

This two-step process may increase the stability of the spectrograms produced. The reason behind this two-step process, is that the power of the LS periodogram (Y axis of 2900 in FIG. 29) may be a distinct variable when comparing vessels.

Figure 30:
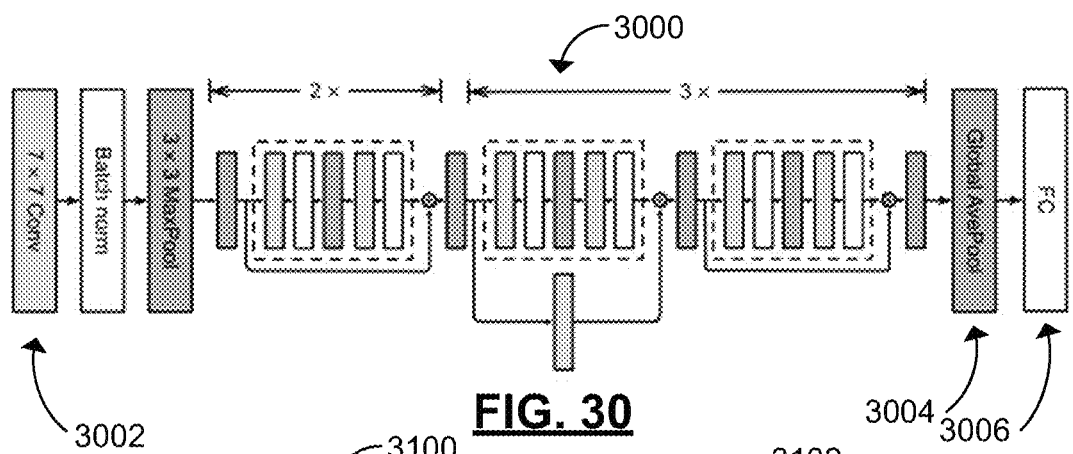
FIGS. 30, 31 and 32 show additional method diagrams in accordance with one or more embodiments.
Figure 31:
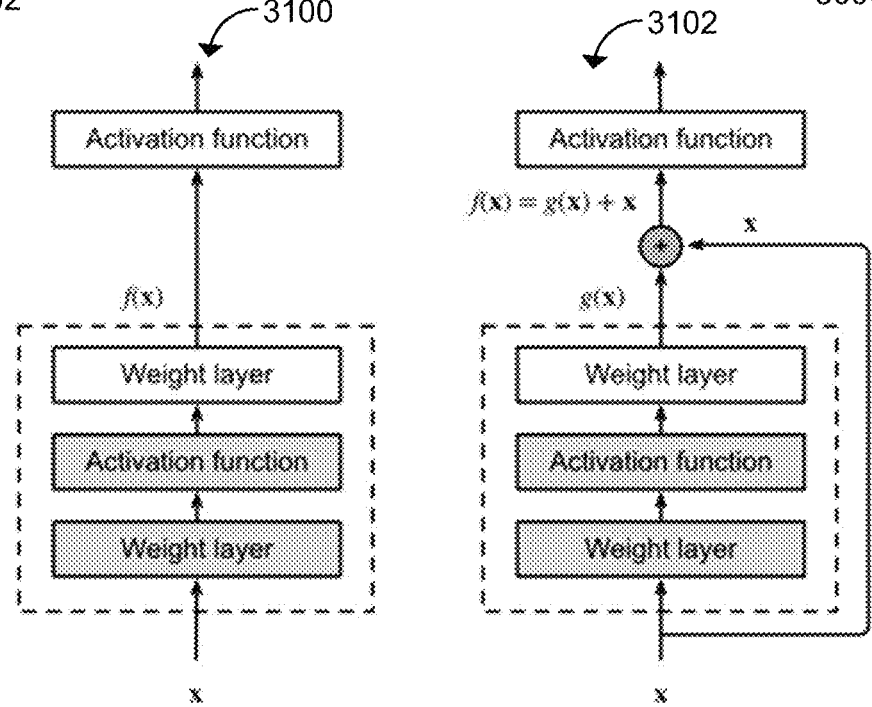
Figure 32:
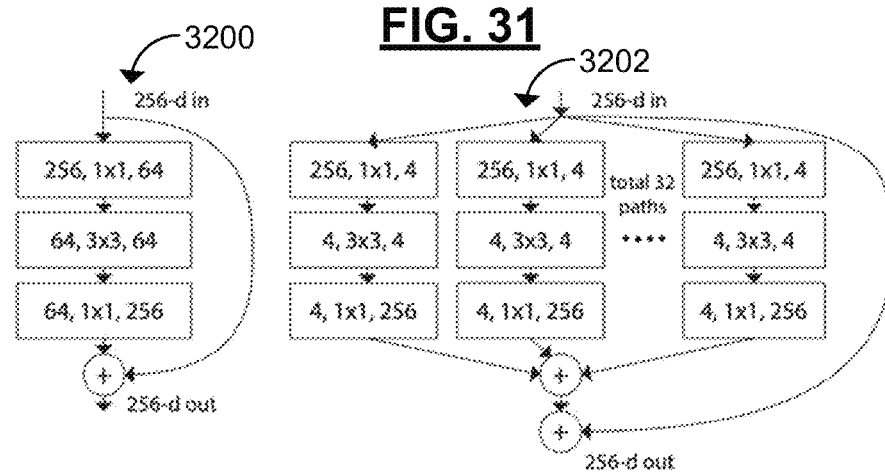

Referring next to FIGS. 30, 31 and 32 together, additional method diagrams are shown in accordance with one or more embodiments.

Image classification is an advanced task in the field of computer vision, in which images are classified based on the patterns detected by deep learning models. The objective of using image classification models may be to analyze patterns in spectrograms and accurately predict their corresponding unique vessel identifier, such as the Maritime Mobile Service Identity (MMSI) of the vessel. The focus on uniquely classifying a vessel is more complex than classifying a vessel by type or size. To ensure the integrity of the vessel identifier system, an assessment may be conducted of the vessel identifier validity by cross-reference to the International Maritime Organization (IMO) number. This process may verify the uniqueness of each vessel identifier (e.g. MMSI) and identify any vessels that may be operating without a valid vessel identifier, commonly known as "dark vessels". Afterwards, an encoded vector may be created to represent a unique class per vessel identifier. Different techniques and methods have been identified herein to detect the vessel identifier corresponding to each spectrogram.

Data Preparation

The initial stage of a Deep Learning life cycle may focus on data processing, including tasks such as gathering raw data, data cleaning, data splitting, and data augmentation. Herein, the raw data may be spectrograms. Filters may be applied during the vessel tracking data gathering process. Data cleaning may or may not be required. Next, the data may be partitioned into separate train, validation, and test sets. The spectrograms may have a uniform pixel size of (480, 640, 3) across all samples. Following this, standard image augmentation techniques such as cropping may be applied, while ensuring that the pixel intensities remain unaltered to maintain the integrity of the MMSI classification. It should be noted that color space adjustments and noise injection techniques may not utilized in order to preserve the original nature of the spectrograms.

Model Development

The development of the model may play a crucial role in achieving the desired outcome of accurately classifying unique vessel identifiers (e.g. MMSI). The utilization of networks, such as ResNets, may improve the accuracy of vessel identifier detection. Given the dataset's characteristics with relatively small size of spectrograms and the resulting large number of classes with few samples per class, a model may be required to effectively detect and distinguish patterns within each class. Deep learning models have been identified herein as a preferred embodiment, including convolutional neural networks (CNNs). Herein, models that have demonstrated performance when trained on the ImageNet dataset may be used. ImageNet is a large visual database containing 1000 classes and is specifically designed for use in Image Classification model development. The ImageNet dataset provides an excellent representation of the dataset that will be utilized herein, as it consists of 1000 distinct classes. Comparing models trained on the ImageNet dataset may offer an improved understanding of the performance of each model. These models may be based on Convolutional Neural Networks (CNNs) within the framework of deep learning, with modifications to each layer.

ResNet

The method diagram 3000 may show the operation of a ResNet model for predicting vessel identifiers. ResNet, or Residual Network, is a deep learning architecture that was first introduced in 2015 by Kaiming He, Xiangyu Zhang, Shaoqing Ren and Jian Sun. ResNet may be a type of convolutional neural network (CNN) that is known for its ability to address the vanishing gradient problem that can occur in deep neural networks. The vanishing gradient problem occurs when the gradient of the loss function with respect to the weights of the neural network becomes very small as it backpropagates through the network. This may lead to slow convergence and poor performance of the network.

ResNet 3000 addresses this problem by using residual connections, which allow the gradient to bypass one or more layers in the network. Instead of trying to learn the underlying mapping between input and output directly, ResNet learns the residual mapping between the input and output. This means that the network learns to predict the difference between the input and the desired output, rather than the output itself. This approach makes it easier for the network to learn the underlying mapping and allows for deeper networks to be trained.

ResNet may be based on the idea of residual blocks, which are composed of multiple convolutional layers and shortcut connections. The shortcut connection allows the input to be added to the output of the block, which creates a residual that can be learned by the network. The architecture shown in ResNet 3000 is as follows:

Convolutional Layers: The input to ResNet may be a series of images, which are processed by a series of convolutional layers 3002. The convolutional layers are responsible for extracting features from the input images.

Residual Blocks: A normal block 3100 is shown, as well as a residual block 3102. Residual blocks 3102 are the core building blocks of ResNet. Each residual block 3102 may consist of multiple convolutional layers, followed by a shortcut connection that bypasses one or more of the convolutional layers. The shortcut connection is used to add the original input to the output of the residual block 3102, creating a residual that can be learned by the network.

Stacking Blocks: ResNet can be made deeper by stacking multiple residual blocks on top of each other. This allows the network to learn more complex features by combining the features learned in each residual block.

Global Average Pooling: At the end of the convolutional layers and residual blocks, the feature maps are flattened and passed through a global average pooling layer 3004. This layer calculates the average of each feature map and outputs a single value for each feature.

Fully-Connected Layers: The output of the global average pooling layer is then passed through a series of fully-connected layers 3006, which are responsible for classifying the input image into one of the possible classes.

The ResNet architecture may typically denoted by a number, which indicates the number of layers in the network. For example, ResNet-18 has 18 layers, while ResNet-50 has 50 layers. The deeper versions of ResNet have been shown to achieve better performance on a variety of computer vision tasks.

ResNet 3000 has been shown to achieve good performance on a variety of computer vision tasks, including image classification, object detection, and semantic segmentation. Its ability to address the vanishing gradient problem and learn complex features has made it a popular choice for deep learning applications. The ResNet model 3000 has achieved good performance on the ImageNet dataset, which is a large-scale image recognition challenge. In the 2015 ImageNet Large Scale Visual Recognition Challenge (ILSVRC), the ResNet-152 model achieved a top-5 error rate of 3.57%, which was a significant improvement over the previous year's winner, which had a top-5 error rate of 4.9% [13]. Top-5 error represents the proportion of test images for which the model's predicted label does not match the true label, but the true label is included in the model's top-5 predicted labels. In other words, the model's top 5 predictions include the true label, but it is not the top prediction. The relationship between the top-5 error rate and accuracy is that they are both measures of how well a model is performing on a given task. However, accuracy and top-5 error rate capture slightly different aspects of model performance. A higher accuracy indicates that the model is correctly predicting the true label for a larger proportion of test examples. In contrast, a lower top-5 error rate indicates that the model is able to make correct predictions within the top 5 most likely labels for more test examples.

Since then, various versions of ResNet 3000, including ResNet-50, ResNet-101, and ResNet-152, have consistently achieved good performance on the ImageNet dataset. For example, in the 2017 ILSVRC, the ResNet-152 model achieved a top-5 error rate of 3.4%.

Furthermore, ResNet 3000 has also been shown to generalize well to other computer vision tasks beyond image classification, such as object detection and semantic segmentation. Overall, ResNet 3000 has established itself as a powerful deep learning architecture for computer vision applications, with excellent performance on large-scale datasets like ImageNet.

ResNext

ResNet block 3200 shows the block of the ResNet model 3000. ResNext block 3202 shows the block of the ResNext model.

ResNext 3202 is a deep learning architecture that was introduced in 2016 by Saining Xie, Ross Girshick, Piotr Dollar, Zhuowen Tu, Kaiming He. ResNext may based on the ResNet 3000 architecture, but it introduces a new block design that allows for increased model capacity and performance.

The main idea behind ResNext 3202 is to use a parallel combination of multiple smaller networks, called "cardinality," to form a larger network. This cardinality can be thought of as the number of parallel paths within each ResNext block 3202. By increasing the cardinality of the network, ResNext 3202 can achieve higher accuracy on image classification tasks without increasing the overall number of parameters.

Each branch in a ResNext layer may be a basic building block called a "bottleneck" block, which is similar to the residual block used in ResNet. A bottleneck block may consist of three convolutional layers: a 1×1 convolutional layer to reduce the dimensionality of the input, a 3×3 convolutional layer to apply the main convolutional operation, and another 1×1 convolutional layer to increase the dimensionality of the output.

The outputs of the branches in each layer may then concatenated and passed through a "cardinality-aggregation" layer, which aggregates the outputs from the parallel branches. This layer consists of a 1×1 convolutional layer followed by batch normalization and ReLU activation.

The outputs of the cardinality-aggregation layer may then passed to the next layer in the network. The number of branches in each layer is a hyperparameter of the network, and is typically set to a value between 32 and 64.

The ResNext 3202 architecture may also include a global average pooling layer and a fully-connected layer at the end of the network, which are used to classify the input image into one of the possible classes.

One of the advantages of ResNext 3202 is its ability to scale to larger models while maintaining high accuracy. By increasing the cardinality of the network, ResNext 3202 may increase the capacity of the model without increasing the number of parameters. This means that ResNext 3202 may achieve good performance on image classification tasks while still being computationally efficient.

ResNext 3202 may have achieve good performance based on the ImageNet dataset, which is a large-scale visual recognition challenge.

Figure 33:
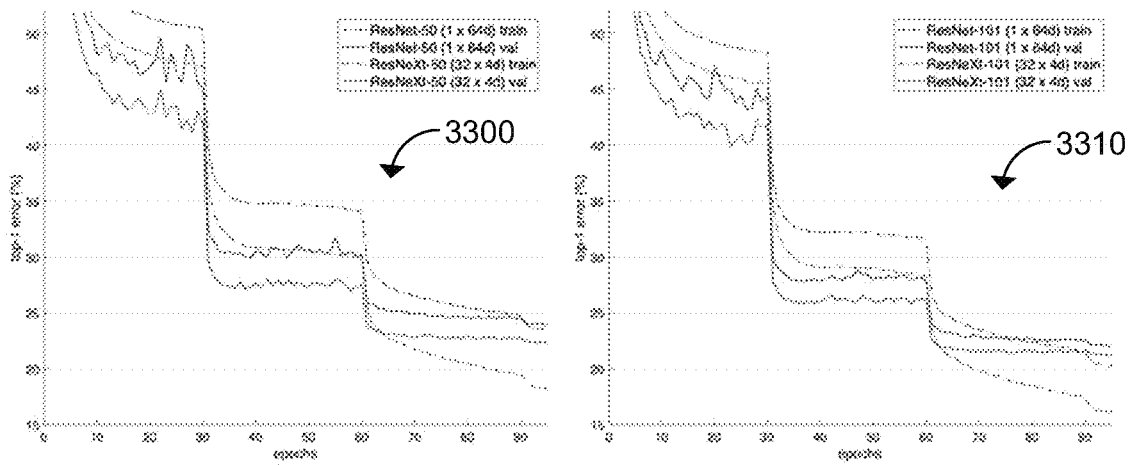
FIG. 33 shows another analysis diagram in accordance with one or more embodiments.

Referring to FIG. 33, analysis diagrams 3300 and 3310 show the performance of ResNext on the ImageNet dataset. Analysis diagram 3300 refers to the training performance of ResNext-50 model on ImageNet 1K. Analysis diagram 3310 shows the training performance of ResNext-101 model on ImageNet 1K.

ResNext-50 has achieved a top-1 error rate of 22.8% and a top-5 error rate of 6.58% on ImageNet.

ResNext-101 has achieved a top-1 error rate of 21.4% and a top-5 error rate of 5.71% on ImageNet.

ResNext-152 has achieved a top-1 error rate of 20.7% and a top-5 error rate of 5.50% on ImageNet.

The improved performance of ResNext may be attributed to the use of the cardinality parameter, which allows the network to effectively utilize the available computational resources and learn a diverse set of features.

Figure 34:
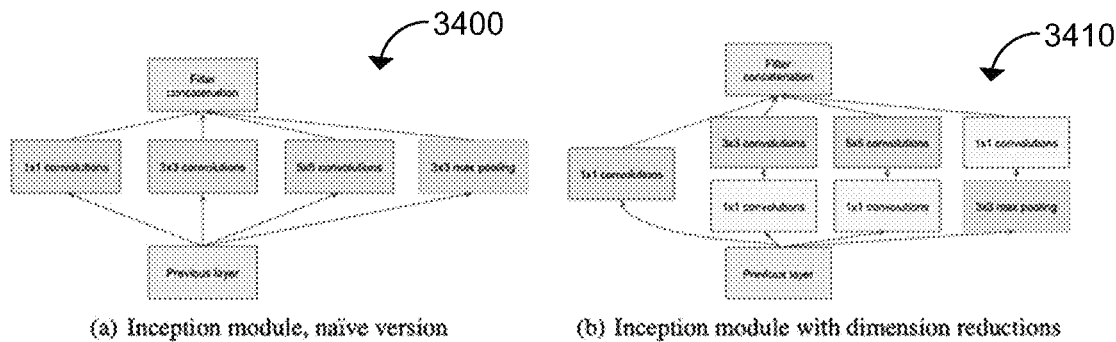
FIG. 34 shows another method diagram in accordance with one or more embodiments.

FIG. 34 shows another method diagram 3400 in accordance with one or more embodiments. Inception 3400 is a deep learning architecture for image and video classification that was first introduced in 2014 by Christian Szegedy, Wei Liu, Yangqing Jia, Pierre Sermanet, Scott Reed, Dragomir Anguelov, Dumitru Erhan, Vincent Vanhoucke, Andrew Rabinovich. The Inception architecture 3400 may be designed to be more computationally efficient than previous deep learning models while maintaining high accuracy.

The Inception architecture 3400 may be based on the idea of using multiple levels of abstraction to extract features from the input data. The architecture includes multiple parallel convolutional layers with different kernel sizes, which allows it to capture features at different scales. These parallel convolutional layers are then concatenated together to form a single output.

Inception 3400 also includes "bottleneck layers", which are used to reduce the dimensionality of the input data before applying expensive convolutional layers. This helps to reduce the computational cost of the architecture and allows it to be trained on larger datasets.

Another important component of the Inception architecture is the use of "global average pooling", which is used to reduce the dimensionality of the output of the convolutional layers. Global average pooling calculates the average value for each feature map and outputs a single value for each feature, which helps to reduce overfitting and improves generalization performance.

Figure 35:
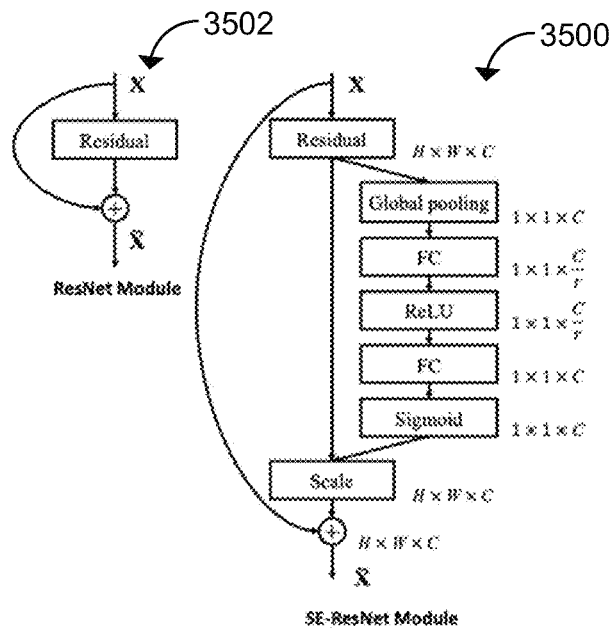
FIG. 35 shows another method diagram in accordance with one or more embodiments.

Referring next to FIG. 35, there is shown another method diagram 3500 in accordance with one or more embodiments. In particular, the method diagram 3500 shows the SENet model 3500 (or Squeeze-and-Excitation Network), which is a deep learning architecture for improving the performance of convolutional neural networks (CNNs) on a wide range of computer vision tasks, including image classification, object detection, and semantic segmentation. SENet was first introduced in 2018 by Jie Hu, Li Shen, and Gang Sun. The original ResNet Residual module 3502 and the SE-ResNet module 3500 is shown.

The main idea behind SENet 3500 is to explicitly model the interdependencies between the channels of the feature maps produced by the convolutional layers in a CNN. In a traditional CNN, each channel of the feature maps is treated as independent and is processed separately. However, this ignores the fact that channels often contain complementary information that can be used to improve performance.

SENet 3500 addresses this issue by introducing a new module called the squeeze-and-excitation block, which is added to each convolutional layer in the network. The squeeze-and-excitation block consists of two main operations: squeezing and exciting.

The squeezing operation may be a global average pooling operation that aggregates the activations of each channel of the feature maps into a single number. This creates a channel descriptor vector that captures the information in each channel. The exciting operation may then use a small fully connected neural network to generate a set of weights for each channel descriptor vector. These weights may then used to re-weight the feature maps, emphasizing important channels and de-emphasizing less important ones.

By explicitly modeling the interdependencies between the channels of the feature maps, SENet 3500 may improve the performance of CNNs on a wide range of computer vision tasks. In particular, SENet 3500 has been shown to achieve good performance on the ImageNet dataset.

Figures 36, 37:
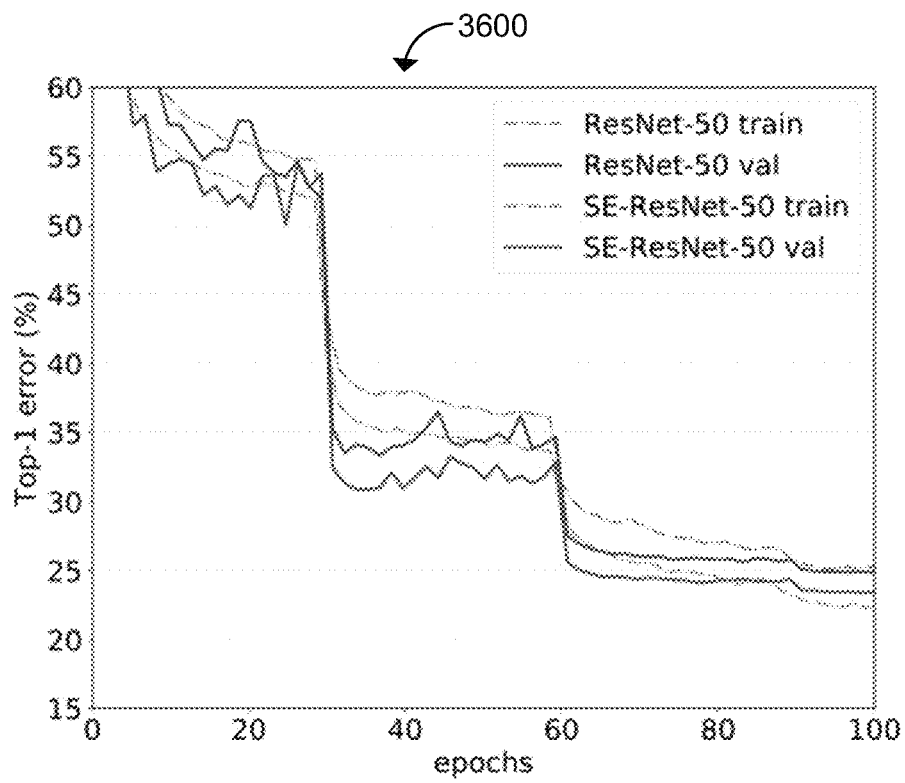
FIGS. 36 and 37 show additional analysis diagrams in accordance with one or more embodiments.

SeNet 3500 may improve the performance of ResNet and ResNext models on several image classification benchmarks. For example, on the ImageNet dataset, the top-1 error rate was reduced from 24.7% for ResNet-152 to 22.4% for SeNet-154, and from 21.8% for ResNext-101 to 20.5% for SeNet-101. Referring to FIG. 36, training curves of ResNet-50 and SE-ResNet-50 on ImageNet are shown. Referring to FIG. 37, single-crop error rates of various CNNs on ImageNet validation set.

The performance of various models was reviewed and the performance of the aforementioned models on real-world data were evaluated by analyzing the model outputs. This was be achieved through the utilization of metrics such as f1-score, plotting of confusion matrices, and generating AUC-ROC curves, among others. Next, failure cases were investigated and solutions were formulated to enhance the performance of the models.

Figure 38:
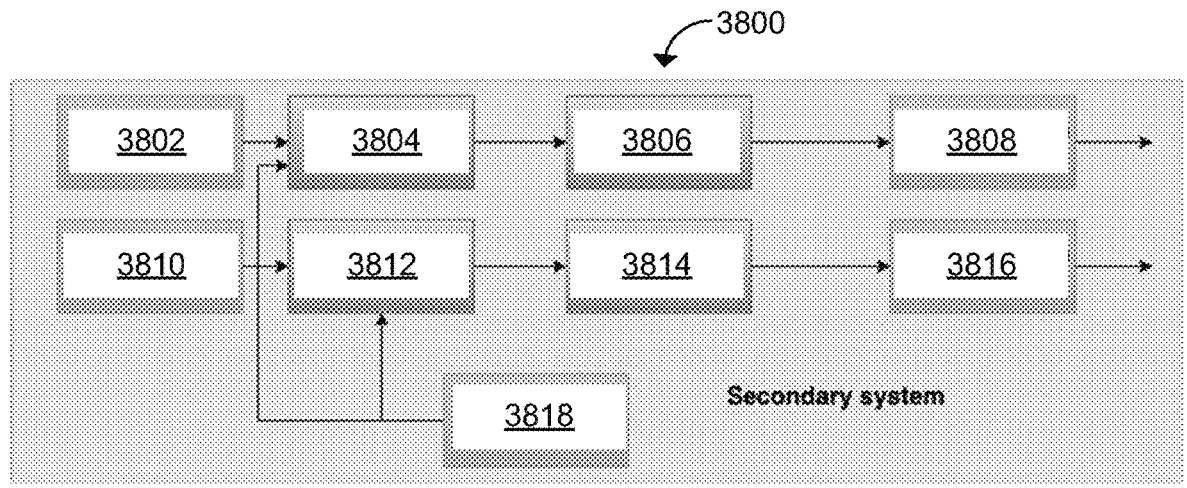
FIGS. 38 and 39 show additional method diagrams in accordance with one or more embodiments.

Referring next to FIG. 38, there is shown another method diagram 3800 in accordance with one or more embodiments. Specifically, a secondary prediction system 3800 that may be used subsequently to the image classification system.

After the image classification process, new features may be engineered to help the system make better predictions on the failure cases of image classification. Exploratory data analysis may be used on the vessels which resulted in lower accuracy vessel identifications 3818 during the image classification process. New features 3802 and 3810 from the exploratory dataset may be created, and models 3804 and 3812 may be trained to generate new trained models 3806 and 3814 respectively using these features and the prior vessel identifications 3818. The goal of these additional features 3802 and 3810 may be to explain variation in a vessel's identity that might not be represented by the spectrogram alone. These additional trained models 3806 and 3814 may themselves generate vessel id predictions 3808 and 3816 respectively.

Method 3800 shows the overall process of the secondary system. The goal of the secondary prediction system may to increase the accuracy of the image classification model. The goal of the overall system (image classification and secondary system) may be to be able to identify a vessel. Incorporating secondary features may allow the present systems and methods to have access to more data points to recognize patterns.

Predictions using these features may be used as input for the ensemble learning model.

These new features 3802 and 3810 may incorporate vessel metadata in order to improve predictions. Vessel metadata may be used to enhance the decision-making power of the primary and secondary system. Vessel metadata from vessel tracking data messages includes information such as the speed of the vessel, the reported type, and any other characteristics. This vessel metadata may allow the system to distinguish between two spectrograms in cases where the spectrograms and other features are similar for two vessels. These metadata may be used as an input to the ensemble learning system.

Figure 39:
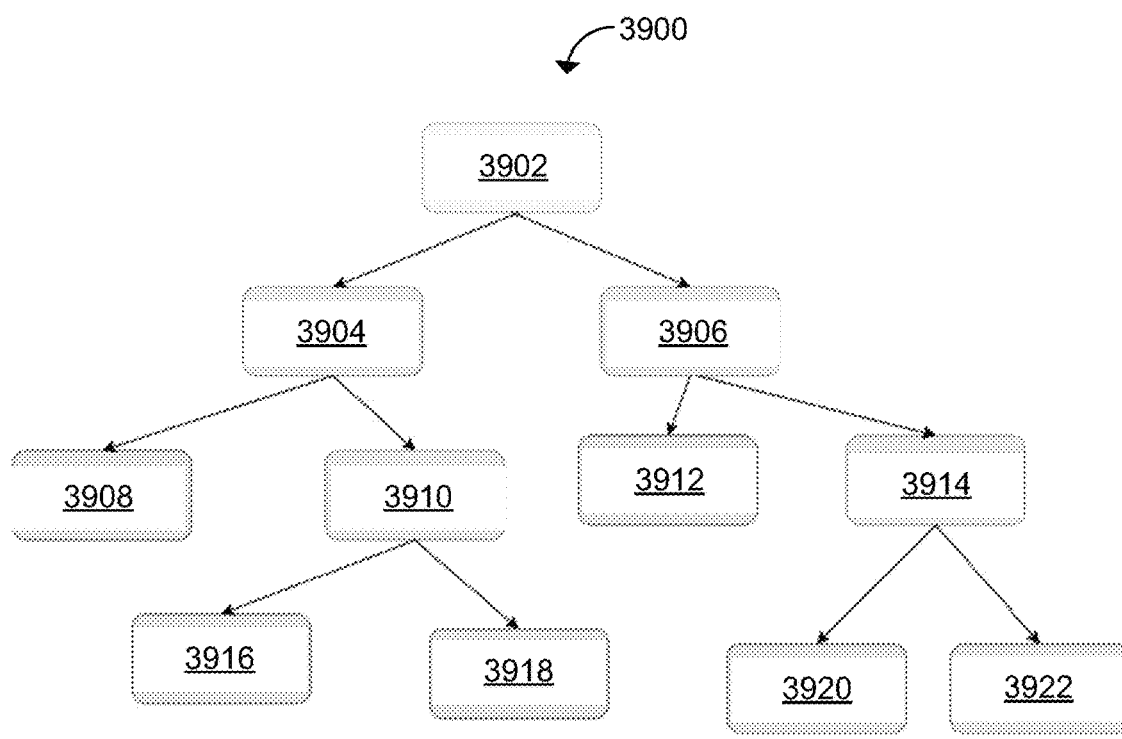

Referring to FIG. 39, there is shown an additional method diagram 3900 in accordance with one or more embodiments. Specifically, method diagram 3900 describes an ensemble learning model.

Ensemble learning model

Ensemble learning is a system where the predictions from multiple algorithms are combined, and the resulting prediction may be improved beyond any individual predictor alone. Various algorithms may be used to combine predictions. These ensemble learning methods may include random forests, voting algorithms, and boosting algorithms.

Before understanding the concept of a random forest, it is useful to first understand the concept of a decision tree.

Decision Tree Explained

In the example ensemble method 3900, a decision tree is shown. A decision tree may be a hierarchical structure having a root node 3902 that contains information about a series of decisions and the associated consequences. For example, decision nodes 3904, 3906, 3910 and 3914 may be parent nodes for other decisions or for terminal nodes 3908, 3916, 3918, 3912, 3920 and 3922. Decisions, or conditional statements may be displayed in a flowchart arrangement.

Referring next to FIG. 40 shows a random forest method diagram 4000 in accordance with one or more embodiments. The example random forest 4000 builds upon decision tree example from FIG. 39 (see e.g. decision tree 3900). A random forest 4000 uses the input data to build several decision trees that are uncorrelated. Then, the outputs of these individual decision trees may be combined, for example using a majority voting algorithm that may determine a final predicted classification based on the individual predictions of each of the decisions trees. Combining these individual decision trees together may result in a higher accuracy than any individual decision tree.

Referring next to FIG. 41, there is shown an example ensemble learning model input diagram 4100 in accordance with one or more embodiments. The input diagram 4100 may be an input diagram for a random forest model. The spectrogram classification output 4102 (i.e., the image classification output) may be used as an input to the ensemble learning model, along with the outputs of the additional features (such as the metadata-driven features) 4104 4106 that may be created. Vessel metadata from AIS messages such as the speed 4108, flag 4112, and reported type 4114 and other metadata 4110 may be used in the random forest.

The random forest model will then take this information and may fit several decision trees on these data. The decision trees may then be combined to produce the most accurate prediction model overall.

For example, if there is a certain vessel whose spectrogram has two potential identities associated, the random forest may use other decisions such as the output from feature classification, speed, and reported type to make a final decision regarding the overall predicted identity.

An advantage of random forests that make this type of algorithm suitable for this dataset is their versatility. A random forest is capable of handling numerical and categorical data. Other machine learning algorithms only function with numerical data, may not allow the system to use vessel metadata such as reported type (there is no numerical value that could be used as input for this).

Referring next to FIG. 42, there is shown another method diagram 4200 in accordance with one or more embodiments. The method 4200 may provide for a voting algorithm to be used in order to receive multiple predicted identity classifications, and establish a single combined identity based on the multiple predicted input classifications. Voting algorithms may be an ensemble learning model where different algorithms 'vote' for the overall prediction outcome. The prediction with a majority vote 'wins' and is chosen to be the overall prediction.

Referring next to FIG. 43, there is shown another ensemble method diagram 4300 in accordance with one or more embodiments. The method 4300 may provide a boosting process to enhance the predictions of a weak classification model when combined with other models. A process diagram 4300 for boosting is shown. Boosting is an ensemble learning approach where a weak classification model's prediction may be enhanced by using additional models. The incorrect predictions made by the first algorithm may be retrained on the next iteration such that a new model may pick up these previous mistakes.

Figure 44:
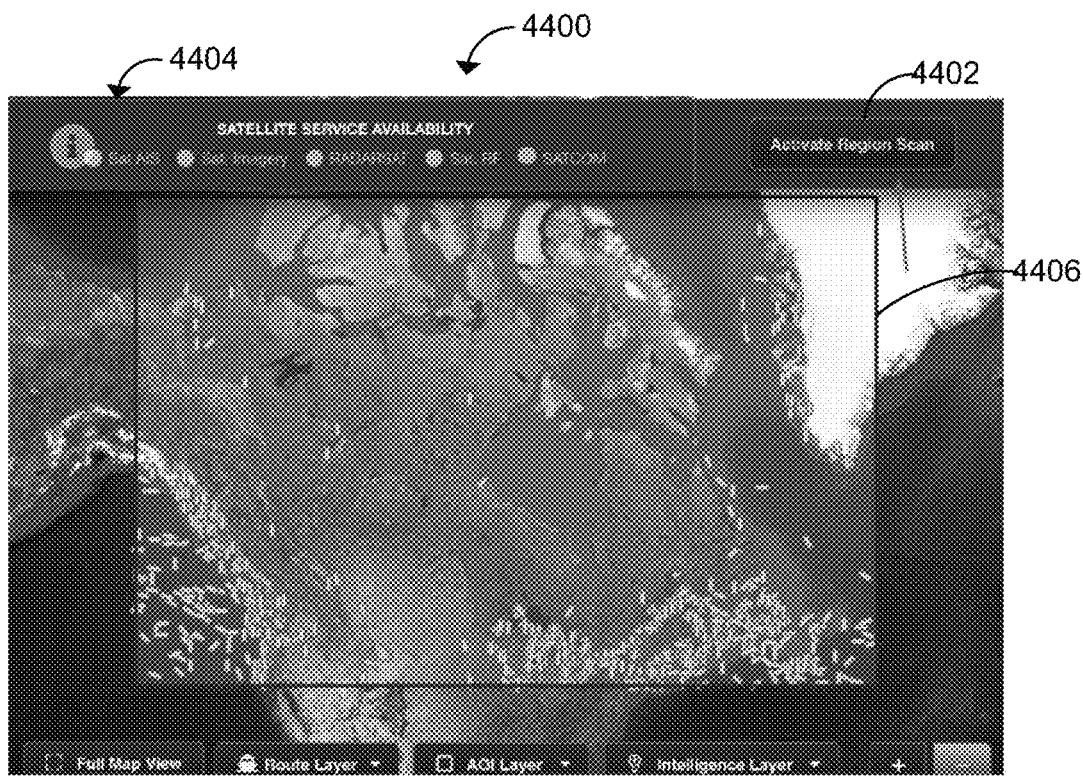
FIGS. 44, 45, 46 and 47 shows user interface diagrams in accordance with one or more embodiments.

Algorithms such as CATBoost may be designed to enable boosting of categorical data Referring next to FIG. 44, there is shown a user interface diagram 4400 in accordance with one or more embodiments. The user interface 4400 may be generated by the user interface engine 614 (see FIG. 6) and may be provided to an end user by way of a downloaded app on their user device in communication with server 108 (see FIG. 1), or by way of a web interface provided by server 108 (see FIG. 1).

The user interface 4400 may show a map including one or more maritime regions, EEZs or ports and one or more vessels. Communication status 4404 with one or more data providers may be displayed. The user may proceed by selecting the "Activate Region Scan" button 4402 which may begin vessel identification of the one or more vessels.

The user interface 4400 may include a selectable box 4406 that may enable a user to select on the map a particular region or regions for the region scan when the activate region scan button 4402 is selected.

Figure 45:
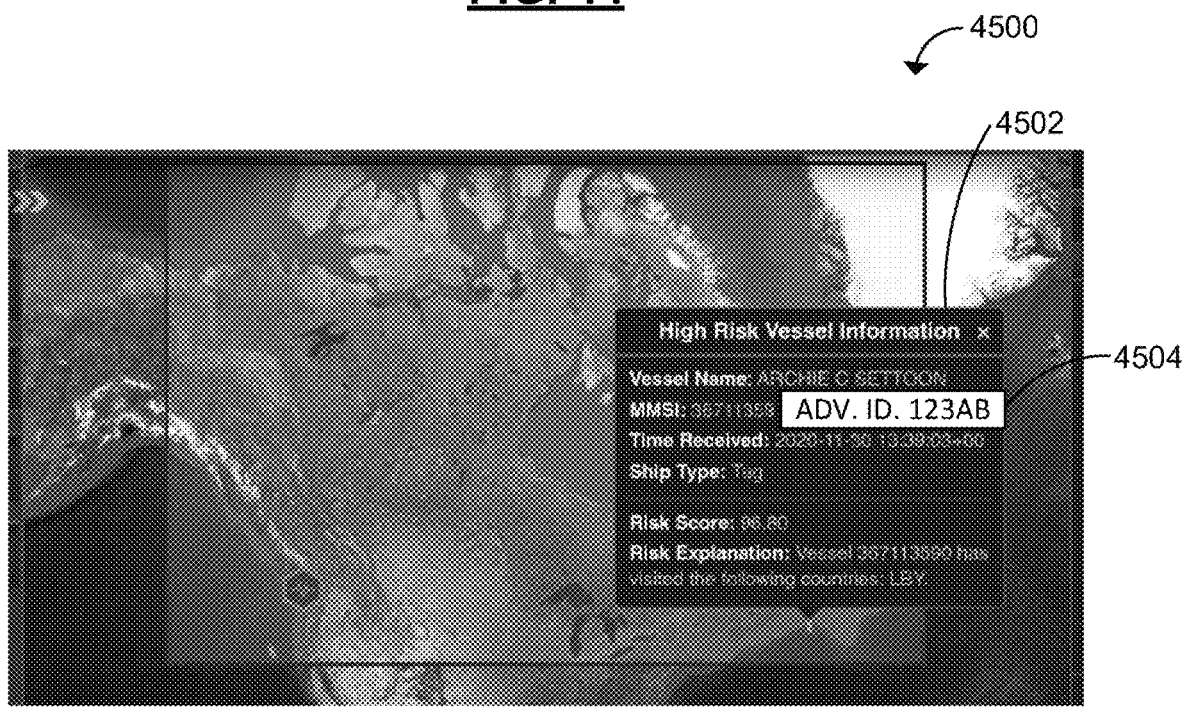

Referring next to FIG. 45, there is shown another user interface diagram 4500 in accordance with one or more embodiments. Responsive to the user's selection of the "Activate Region Scan" button 4502, vessel identifications may be performed on the one or more vessels in the selected marine region. The user interface 4500 may display any vessels in the one or more vessels having significant risk classification. The user may select a vessel, and may be presented with an identification window 4502 summarizing the reasons for the vessel identification of the vessel and corresponding vessel identification information.

For example, in the identification window 4502 as shown, a vessel name, MMSI (simple identification), vessel tracking message timestamp, ship type, risk score, and risk explanation. The identification window may show information related to the vessel tracking data, determined vessel profile information, vessel incident information, vessel information, and environmental activity.

The advanced vessel identification 4504 may be provided in identification window 4502. The vessel identification 4504 may be determined based on the predictive models described herein. The vessel identification 4504 may be provided in addition to, or instead of, the MMSI identifier in vessel identification window 4502.

Figure 46:

Referring next to FIG. 46, there is shown another user interface diagram 4600 in accordance with one or more embodiments.

The user interface diagram 4600 may be displayed when the user selects an identified vessel displayed in identification window 4502 (see FIG. 45). In response to the selection, additional summary information may be displayed in a details window 4602.

The details window 4602 may show a summary of the data associated with the vessel identified in identification window 4502, other vessels (for example, other vessels of the same type as the vessel identified in identification window 4502), and notes information.

The user may select the "Vessel Note" button 4604 in order to create, edit, or remove the entries under the Vessel Notes section of the details window 4602. The "Vessel Note" button 4604 may be used by a user of the system to identify an issue or incorrect vessel identification of the vessel identification prediction system.

Figure 47:
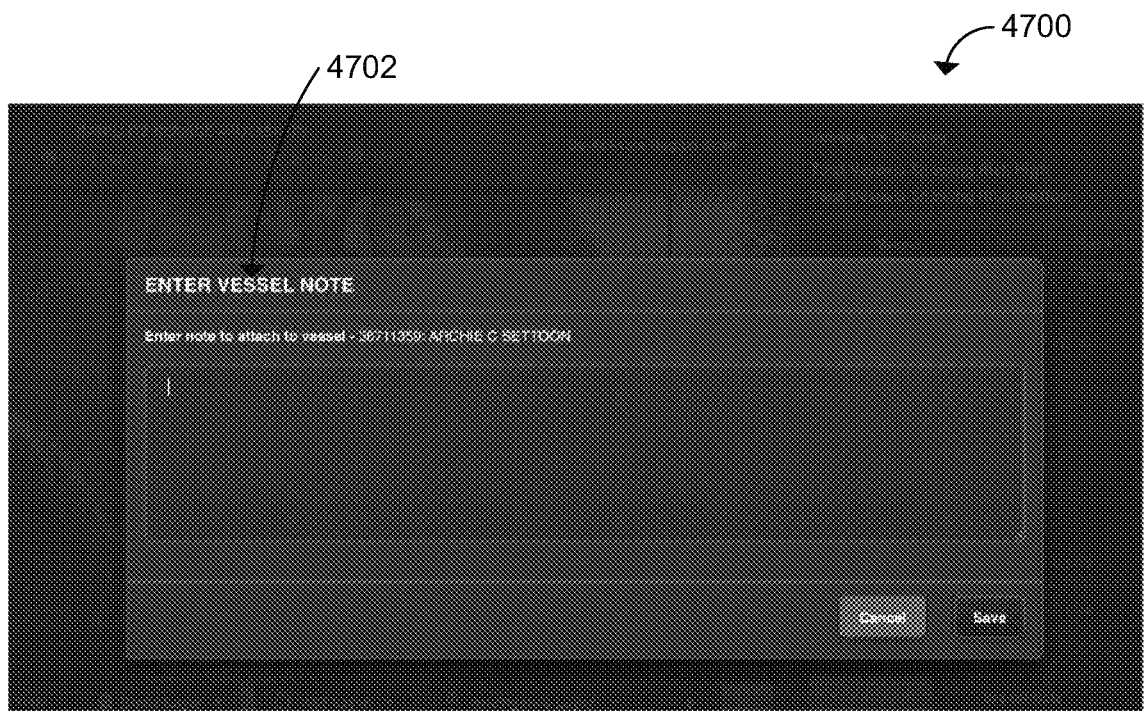

Referring next to FIG. 47, there is shown another user interface diagram 4700 in accordance with one or more embodiments.

Responsive to the user's selection of the "Vessel Note" button 4604, a Vessel Note window 4702 may be displayed. The vessel note window may allow for a variety of different user inputs with respect to the vessel identification of the vessel shown in identification window 4502. While a text box is shown in note window 4702, it is understood that a variety of user input types may be submitted by the user. This may allow a user to review the details of a vessel identification, and then submit feedback to the server 108 (see FIG. 1) that may be used by the model training method as further input. In this manner, the user interface may allow for user feedback on vessel identifications that may be used for supervised learning, and may be used during model training in order to improve the accuracy of the vessel identifications by the prediction model. The feedback data corresponding to the vessel identification may be received by server 108, and stored in database 110 (see FIG. 1).

The present invention has been described herein by way of example only. Various modification and variations may be made to these exemplary embodiments without departing from the spirit and scope of the invention, which is limited only by the appended claims.

Example 1

A sample analysis was conducting according to FIG. 9. The selected data included 45 vessels out of the SAIS stream datasets. The data streams are stored and have been processed with the system and methods described herein. A short description of the individual vessels is presented in FIG. 48.

Classifier 1-Vessel Type Classification

The selected vessels are of five different ship types: 13 cargo (including 5 passenger, 2 container and 6 roll-on/roll-off Cargo), 19 fishing vessels, 5 high-speed craft (1 military operation vessel and 4 pilots or high-speed craft), 3 tankers and 5 tugs.

In order to evaluate the quality of the vessel type classifier predictions, the validation dataset containing 2152 images of the five distinct vessel types was used. The model reached an accuracy of 70.3%. The accuracy describes the proportion of correct classifications by the model, i.e., more than 70% of vessels could be correctly identified by vessel type using our model.

Figure 49:
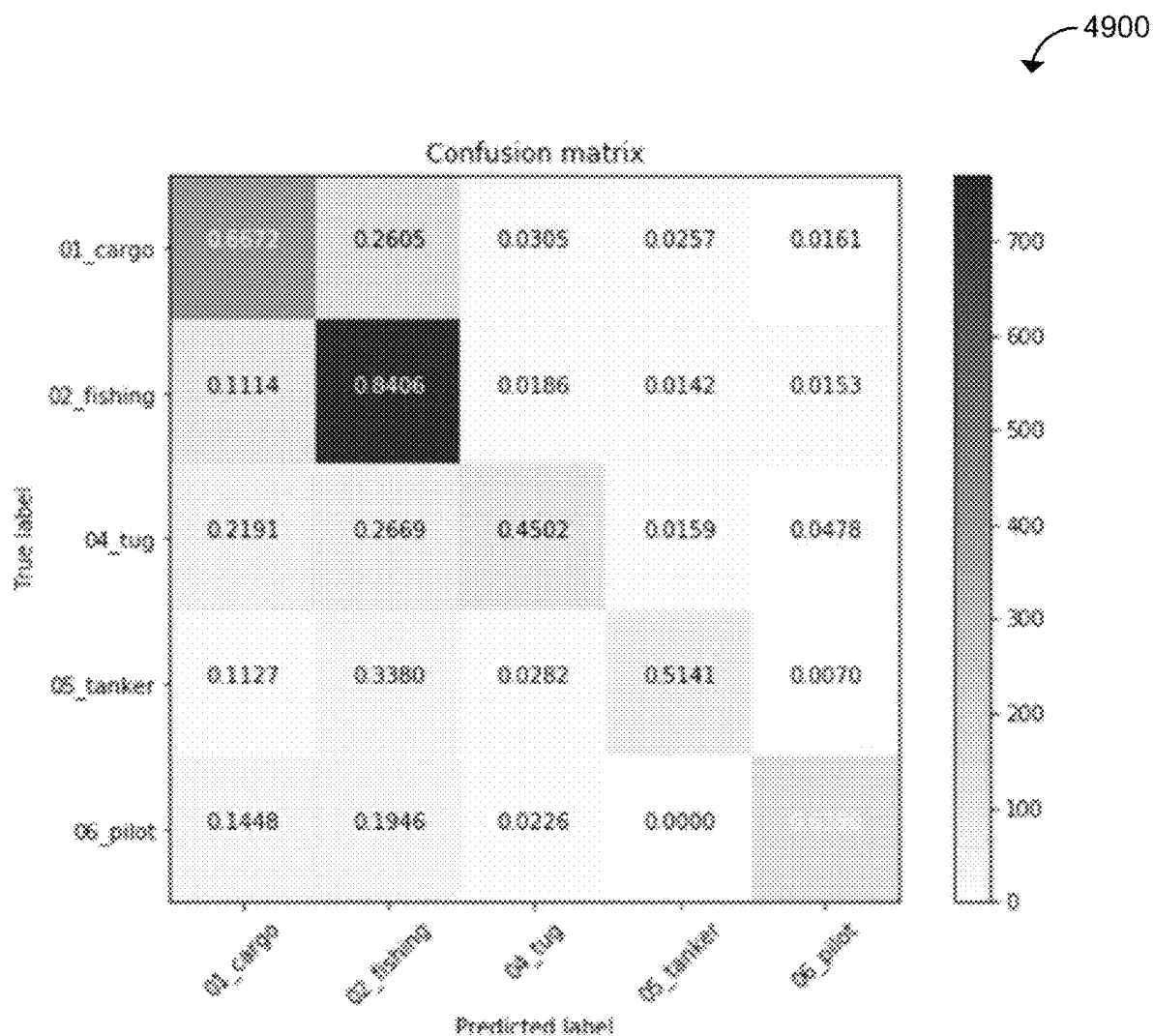
FIG. 49 shows a confusion matrix for a validation dataset of a vessel type classifier in Example 1 in accordance with one or more embodiments.

FIG. 49 shows the confusion matrix for a validation dataset. A confusion matrix is a table used to describe the performance of a classification model on a set of test data for which the true values are known. Each row of the matrix represents the instances in a predicted class while each column represents the instances in an actual class (or vice versa). This allows more detailed analysis than mere proportion of correct classifications (accuracy). Each cell of the matrix shows the prediction of accuracy for the given class. The accuracy normalized between 0 and 1, the colour of the box is based on the number of images which were correctly identified.

As shown in FIG. 49, the classification of fishing boats is the most accurate, with 84% (770 out of 916) of the fishing boats in the validation dataset correctly identified (see FIG. 49 in the second cell and second row of the confusion matrix). The second most accurate classification was cargo vessel, where 67% (415 out of 622) of cargo vessels were correctly identified.

Classifier 2-Vessel Size (Internal Volume) Classification

The selected vessels are of five ship size ranges: vessels of volume below 300 gross tonnage (GT), vessels of volume between 301 GT and 900 GT, vessels of volume between 901 GT and 10000 GT, vessels of volume between 10,001 GT and 40,000 GT, and vessels of volume above 40,000 GT. To evaluate the quality of our vessel size classifier's prediction, the validation dataset containing 2083 images of the five distinct vessel size ranges was used. The model reached an accuracy of 73.1%. The accuracy describes the proportion of correct classifications, i.e., more than 73% of vessels could be correctly identified in the correct size range using our model.

Figure 50:
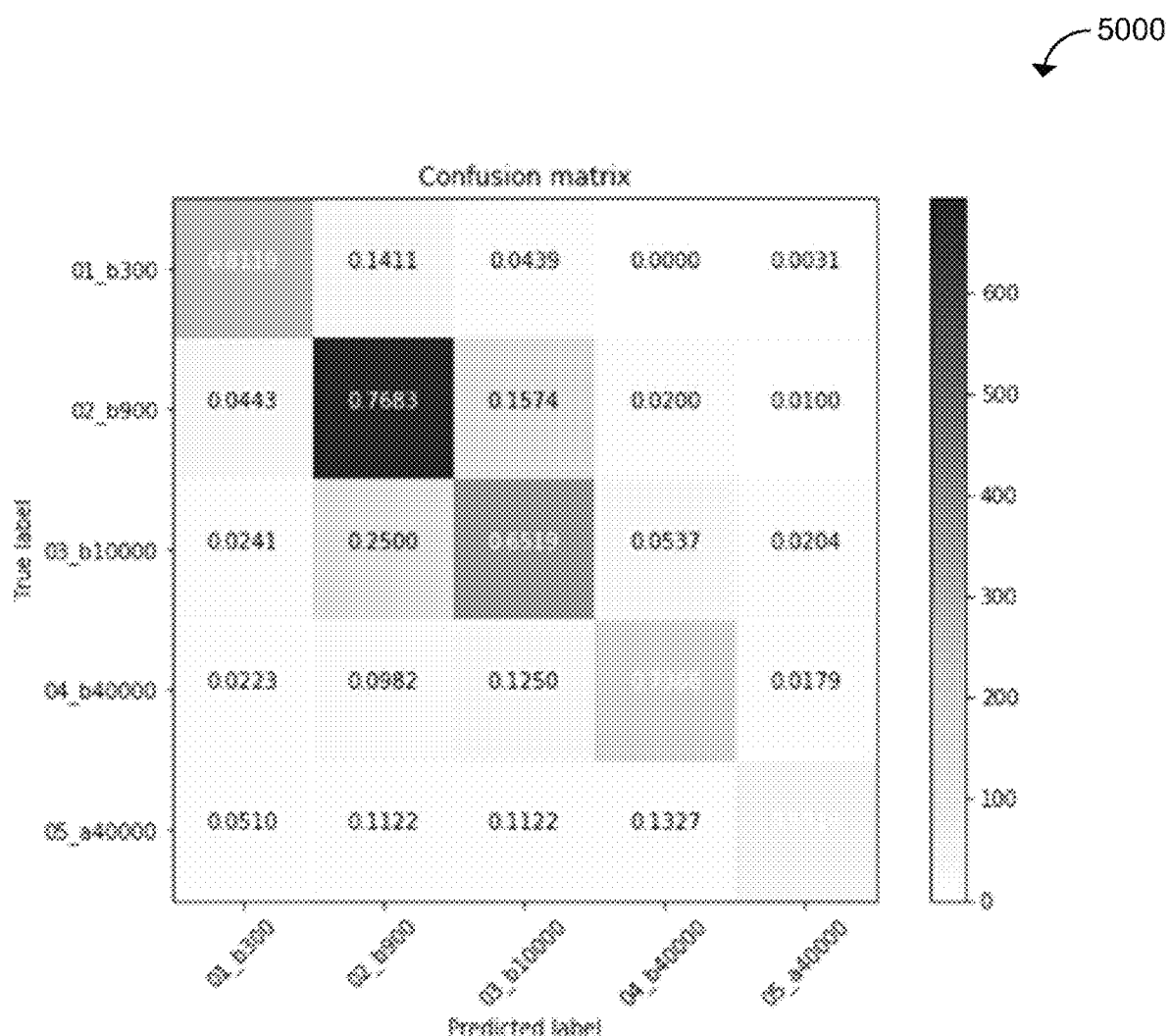
FIG. 50 shows a confusion matrix for a validation dataset of a vessel size (internal volume) classifier in Example 1 in accordance with one or more embodiments.

FIG. 50 shows the confusion matrix for a validation dataset. The confusion matrix allows more detailed analysis than mere proportion of correct classifications (accuracy). For instance, the classification of small vessels (bellow 300 gt) is the most accurate one with 81% (259 out of 319) of small vessels in the validation dataset correctly identified (see FIG. 50, in the first cell and first row of the confusion matrix). The second most accurate classification was small-medium vessels, where 67% (693 out of 902) of the small-medium correctly identified, followed up by 73% (165 out of 224) accuracy for medium-large vessels.

Classifier 3-Vessel Identification

The selected data includes 45 vessels out of the SAIS stream datasets. Each vessel represents one class. The validation dataset containing 2066 images of the 45 distinct vessels to evaluate the quality of the vessel identification model's predictions was used. The model reached an accuracy of 58.3%. The accuracy describes the proportion of correct classifications, i.e., more than 58% of vessels could be uniquely identified using our model.

Figure 51:
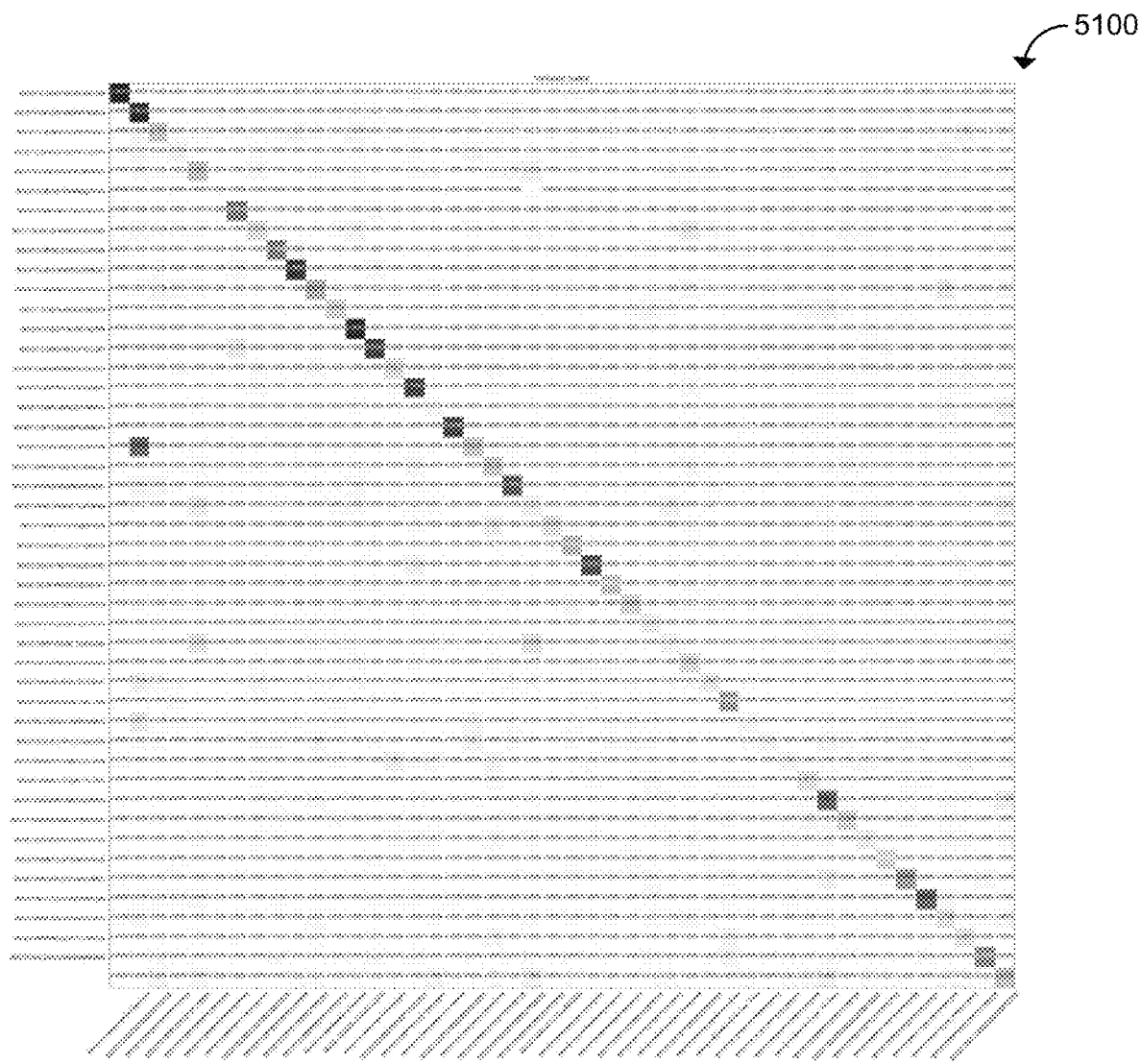
FIG. 51 shows a confusion matrix for a validation dataset of a vessel identification classifier in Example 1 in accordance with one or more embodiments.

FIG. 51 shows the confusion matrix for a validation dataset. Some the vessels could be correctly identified with accuracy above 95%, such the ZHOU YUAN YU 2601 (a fishing vessel) and the SEAROAD TAMAR (Dry Cargo/Ro-Ro Cargo). The identification accuracy is over 60% for 6 out of 16 fishing vessels, 8 out of 13 cargo vessels, 2 out of 5 tugs and 4 out of 4 pilots or high-speed craft.

These early results of the proof-of-concept have shown that the method of extracting the characteristic frequencies of a vessel's signal in the frequency domain as input to an AI model can be used to good results.

These results show that it is possible to develop a powerful decision support system that makes extensive use of AI techniques to classify and in many cases, uniquely identify vessels.

Data Sparsity Sensitivity Analysis

Lastly, it was investigated how data sparsity affects the classification of vessels. Data sparsity varies globally depending on the region, the satellites collecting the data, the vessel traffic density, the vessel's transponder itself, and other factors. It is therefore important to examine the sensitivity of the techniques to the sparsity of the data. Our original dataset with the selected 45 vessels used exactEarth data and this was treated as the optimum, or baseline. The assumption is that the sparser the data are, i.e. the fewer SAIS messages are observed by the satellites per second, the less accurate the models are. The impact of the data sparsity on our three classifiers was analyzed. For that, the original data was used as a baseline, and five sub-sets were created by randomly sub-sampling the baseline messages. Each of the 5 subsets (e.g. 50, 60, 70, 80, and 90%) contain a randomly sampled percentage of the original data. For instance, the first dataset contains only 50% of the original set, the second only 60% and so on.

Figure 52:
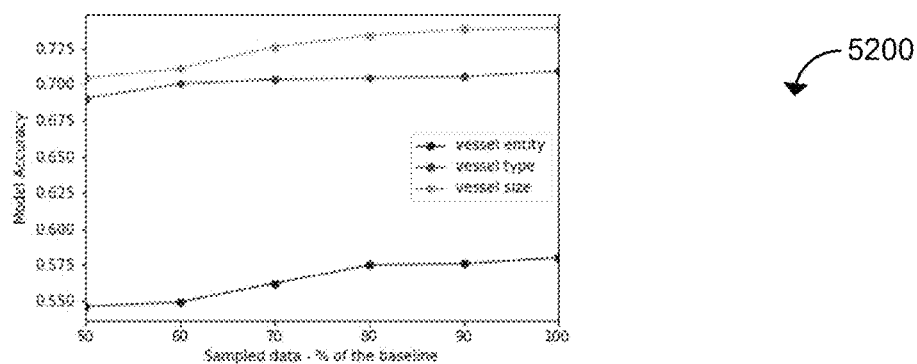
FIG. 52 shows a graph of accuracy vs. data sparsity as described in Example 1 in accordance with one or more embodiments.

We re-ran the experiments using the data subsets for all models. As FIG. 52 shows, the accuracy improves for all classifiers as data get less sparse. Nevertheless, with 70% of the original data or higher, there is no significant increase in accuracy. Furthermore, all classifiers perform reasonably well even when data sparseness is 50% of the original data baseline, indicating a strong initial level of robustness with respect to data sparsity in the absence of any compensating techniques.

REFERENCES

Fossen, T. I. (2000). *A survey on Nonlinear Ship Control: from Theory to Practice*. IFAC Proceedings Volumes, Volume 33, Issue 21.
Greidanus H., A. M. (2013). *Basin-Wide Maritime Awareness From Multi-Source Ship Reporting Data*. TransNav, the International Journal on Marine Navigation and Safety of Sea Transportation, Vol. 7, No. 2, doi: 10.12716/1001.07.02.04, pp. 185-192.
Harati-Mokhtari, A. W. (2007). *Automatic Identification System (AIS): Data Reliability and Human Error Implications*. Journal of Navigation, 60 (3), 373-389. doi: 10.1017/S0373463307004298.
Liu, Z. (2017). *Ship Adaptive Course Keeping Control With Nonlinear Disturbance Observer*. IEEE Access, vol. 5, pp. 17567-17575, 2017. doi: 10.1109/Access.2017.2742001.
NASA Jet Propulsion Lab. (2019, 09 19). *MODIS Sea Surface Temperature (SST) Products*. Retrieved from Physical Oceanography Distributed Active Archive Centre: https://podaac-tools.jpl.nasa.gov/drive/files/allData/modis/L3/docs/modis sst.html
Perez, T. I. (2009). *Kalman Filtering for Positioning and Heading Control of Ships and Offshore Rigs. Estimating the Effects of Waves, Wind, and Current*. IEEE Control System Magazine.
Tomera, M. (2010). *Nonlinear controller design of a ship autopilot. Applied Mathematics and Computer Science*. 20. 271-280. 10.2478/v10006-010-0020-8.
Union, I. T. (2014). *M.1371: Technical characteristics for an automatic identification system using time-division multiple access in the VHF maritime mobile band*. https://www.itu.int/rec/R-REC-M.1371-5-201402-I/en.
Westerdijk, L. (2019). *Classifying vessel types based on AIS data*. Vrije Universiteit Amsterdam, Master Thesis. Business Analytics.
S.-L. Hsieh, "Design Ensemble Machine Learning Model for Breast Cancer Diagnosis," Springer Science, 3 Aug. 2011.
D. Optitz, "Popular Ensemble Methods: An Empirical Study," Journal of Artificial Intelligence Research, pp. 169-198, August 1999.
J. S. D. Opitz, "Generating Accurate and Diverse Members of a Neural-Network Ensemble," Advances in Neural Information Processing Systems, MIT Press, pp. 535-543.
J. T. VanderPlas, "Understanding the Lomb-Scargle Periodogram," The Astrophysical Journal Supplement Series, Volume 236, Number 1, 11 May 2018.
E. Cheever, "Introduction to the Fourier Transform," Linear Physical Systems Analysis Swathmore College, 2005. [Online]. Available: https://lpsa.swarthmore.edu/Fourier/Xforms/FXformIntro.html.
B. P. F. S. A. T. W. T. V. William H. Press, "Numerical Recipes in C: The Art of Scientific Computing," October 1992.
N. M., J. H., a. J. K. K. Rehfeld1, "Comparison of correlation analysis techniques for irregularly sampled time series," 5 Apr. 2011.
D. L. &. Q. Weng, "A survey of image classification methods and techniques for improving classification performance," vol. 28:5, no. 823-870, 2007.
C. K. T. Shorten, "A survey on Image Data Augmentation for Deep Learning," J Big Data, vol. 6, p. 60, 2019.
B. Z. J. a. S. T. Leitner, "Audio Recognition using Mel Spectrograms and Convolution Neural Networks.," 2019.
Z. A. M. Aslan, "Automatic detection of schizophrenia by applying deep learning over spectrogram images of EEG signals," Traitement du Signal, vol. 37, pp. 235-244, 2020.
Standford Vision Lab, 2020. [Online]. Available: https://www.image-net.org/index.php. K. H. a. X. Z. a. S. R. a. J. Sun, "Deep Residual Learning for Image Recognition," arXiv, 2015.
J. F. Kolen and S. C. Kremer, ""Gradient Flow in Recurrent Nets: The Difficulty of Learning LongTerm Dependencies," in A Field Guide to Dynamical Recurrent Networks," IEEE, pp. 237-243, 2001.
Dive Into Deep Learning, [Online]. Available: https://d2l.ai/chapter_convolutional-modern/resnet.html.
"Papers With Code," [Online]. Available: https://paperswithcode.com/sota/image-classification-on-imagenet.
S. a. G. R. a. D. P. a. T. Z. a. H. K. Xie, "Aggregated Residual Transformations for Deep Neural Networks," arXiv, 2016.
C. a. L. W. a. J. Y. a. S. P. a. R. S. a. A. D. a. E. D. a. V. V. a. R. A. Szegedy, "Going Deeper with Convolutions," arXiv, 2014.
J. a. S. L. a. A. S. a. S. G. a. W. E. Hu, "Squeeze-and-Excitation Networks," arXiv, 2017.
R. M. David Opitz, "Popular Ensemble Methods: An Empirical Study," Arxiv, p. https://arxiv.org/pdf/1106.0257.pdf, 8 1999.
S. Learn, "Scikit learn documentation," [Online]. Available: https://scikit-learn.org/stable/modules/tree.html.
IBM, "What is a random forest IBM," 2023. [Online]. Available: https://www.ibm.com/topics/random-forest.
Yandex, "CATBoost," 2023. [Online]. Available: https://catboost.ai/en/docs/. [Accessed March 2023].
B. A. Tama, "An extensive empirical evaluation of classifier ensembles for intrusion detection task," Computer Systems Science and Engineering, vol. March 2017.
Sirakorn, Artist, Boosting illustration. [Art]. Wikimedia, 2020.

The invention claimed is:
1. A computer implemented method for predicting a vessel identifier, the method comprising:
providing, at a memory, a vessel identification model generated based on historical vessel tracking data for a plurality of vessels;
receiving, at a processor in communication with the memory, vessel data from one or more sources;

determining, at the processor, a plurality of periodograms from the vessel data, the plurality of periodograms determined for a candidate vessel corresponding to candidate vessel data in the vessel data;

determining, at the processor, a spectrogram based on the plurality of periodograms; and predicting, at the processor, a vessel identifier output of the candidate vessel based on the spectrogram and the vessel identification model, wherein the vessel identifier output associates the candidate vessel with at least one of the plurality of vessels.

2. The method of claim 1, wherein each of the plurality of periodograms is determined for the candidate vessel using a sliding window passed over the candidate vessel data.

3. The method of claim 1, wherein the plurality of periodograms are determined for the candidate vessel based on a time-domain to frequency-domain transformation applied to the candidate vessel data.

4. The method of claim 3, wherein the time-domain to frequency-domain transformation comprises a floating-mean Lomb-Scargle periodogram (FMLSP) algorithm.

5. The method of claim 1, wherein the spectrogram comprises a two-dimensional bitmap, the two dimensional bitmap comprising a time axis and a frequency axis and optionally wherein each pixel of the two-dimensional bitmap comprises a magnitude of the corresponding periodogram for that time and frequency and optionally wherein the two-dimensional bitmap comprises has a color depth of 1 bit per pixel, 2 bits per pixel, 4 bits per pixel, 8 bits or 32 bits per pixel.

6. The method of claim 1, wherein the vessel data comprises at least one selected from the group of satellite AIS data from a satellite AIS data source, and vessel information data from a vessel information source and optionally wherein the vessel data comprises at least one selected from the group of course-over-ground data, time of transmission data, magnitude of transmission power data, and phase of transmission power data.

7. The method of claim 1, further comprising:
receiving, at the processor, environmental data from the one or more sources; and
wherein the vessel identifier output of the candidate vessel is predicted based on the environmental data, the spectrogram and the vessel identification model and optionally wherein the environmental data comprises at least one selected from the group of: wind speed, wind direction, wave height, wave frequency, ocean current and sea surface temperature.

8. The method of claim 7, further comprising:
associating the environmental data with the vessel data using a spatial-temporal join and optionally wherein the environmental data comprises at least one selected from the group of Marine Environment Monitoring Service and satellite data.

9. The method of claim 1, wherein the vessel identification model comprises a convolutional neural network.

10. The method of claim 1, wherein the vessel identification model comprises a vessel type classifier, a vessel size classifier, and a vessel identity classifier.

11. The method of claim 10, further comprising predicting, at the processor, a vessel type output of the candidate vessel based on the spectrogram and the vessel identification model.

12. The method of claim 10, further comprising predicting, at the processor, a vessel size output of the candidate vessel based on the spectrogram and the vessel identification model.

13. The method of claim 1, wherein the predicting, at the processor, a vessel identifier output of the candidate vessel comprises:
predicting, at the processor, a plurality of candidate vessel identifiers of the candidate vessel; and
selecting, at the processor, the vessel identifier output from the plurality of candidate vessel identifiers based on a voting classifier, the voting classifier electing the vessel identifier output based on vessel data.

14. A computer-implemented system for predicting a vessel identifier, the system comprising:
a memory comprising a vessel identification model, the vessel identification model generated based on historical vessel tracking data for a plurality of vessels; and
a processor in communication with the memory, the processor configured to:
receive vessel data from one or more sources;
determine a plurality of periodograms from the vessel data, the plurality of periodograms determined for a candidate vessel corresponding to candidate vessel data in the vessel data;
determining a spectrogram based on the plurality of periodograms; and
predicting a vessel identifier output of the candidate vessel based on the spectrogram and the vessel identification model, wherein the vessel identifier output associates the candidate vessel with at least one of the plurality of vessels.

15. The system of claim 14, wherein each of the plurality of periodograms is determined for the candidate vessel using a sliding window passed over the candidate vessel data.

16. The system of claim 14, wherein the plurality of periodograms are determined for the candidate vessel based on a time-domain to frequency-domain transformation applied to the candidate vessel data.

17. The system of claim 16, wherein the time-domain to frequency-domain transformation comprises a floating-mean Lomb-Scargle periodogram (FMLSP) algorithm.

18. The system of claim 14, wherein the spectrogram comprises a two-dimensional bitmap, the two dimensional bitmap comprising a time axis and a frequency axis and optionally wherein each pixel of the two-dimensional bitmap comprises a magnitude of the corresponding periodogram for that time and frequency and optionally wherein the two-dimensional bitmap comprises has a color depth of 1 bit per pixel, 2 bits per pixel, 4 bits per pixel, 8 bits or 32 bits per pixel.

19. The system of claim 14, wherein the vessel data comprises at least one selected from the group of satellite AIS data from a satellite AIS data source, and vessel information data from a vessel information source and optionally wherein the vessel data comprises at least one selected from the group of course-over-ground data, time of transmission data, magnitude of transmission power data, and phase of transmission power data.

20. The system of claim 14 wherein the processor is further configured to:
receive environmental data from the one or more sources; and
wherein the vessel identifier output of the candidate vessel is predicted based on the environmental data, the spectrogram and the vessel identification model; and optionally wherein the environmental data comprises at least one selected from the group of: wind speed, wind direction, wave height, wave frequency, ocean current and sea surface temperature.

21. The system of claim 20, wherein the processor is further configured to:
associate the environmental data with the vessel data using a spatial-temporal join; and optionally wherein the environmental data comprises at least one selected from the group of Marine Environment Monitoring Service and satellite data.

22. The system of claim 21, wherein the processor is further configured to predict a vessel type output of the candidate vessel based on the spectrogram and the vessel identification model.

23. The system of claim 21, wherein the processor is further configured to predict a vessel size output of the candidate vessel based on the spectrogram and the vessel identification model.

24. The system of claim 14, wherein the vessel identification model comprises a convolutional neural network.

25. The system of claim 14, wherein the vessel identification model comprises a vessel type classifier, a vessel size classifier, and a vessel identity classifier.

26. The system of claim 14, wherein the processor is further configured to predict a vessel identifier output of the candidate vessel comprises:
predicting, at the processor, a plurality of candidate vessel identifiers of the candidate vessel; and
selecting, at the processor, the vessel identifier output from the plurality of candidate vessel identifiers based on a voting classifier, the voting classifier electing the vessel identifier output based on vessel data.

* * * * *